US012809963B2

(12) United States Patent
Bodigutla et al.

(10) Patent No.: US 12,809,963 B2
(45) Date of Patent: Nov. 24, 2026

(54) GENERATIVE COLLABORATIVE MESSAGE SUGGESTIONS

(71) Applicant: Microsoft Technology Licensing, LLC, Redmond, WA (US)

(72) Inventors: Praveen Kumar Bodigutla, San Jose, CA (US); Suman Sundaresh, Los Altos, CA (US); Souvik Ghosh, Saratoga, CA (US); Saurabh Gupta, Bellevue, WA (US); Sai Krishna Bollam, Union City, CA (US); Arya Ghatak Choudhury, Sunnyvale, CA (US); Weiheng Qian, Santa Clara, CA (US); Jiarui Wang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 583 days.

(21) Appl. No.: 18/214,905

(22) Filed: Jun. 27, 2023

(65) Prior Publication Data

US 2024/0378424 A1 Nov. 14, 2024

Related U.S. Application Data

(60) Provisional application No. 63/501,632, filed on May 11, 2023.

(51) Int. Cl.
*G06F 21/00* (2013.01)
*G06F 21/51* (2013.01)
(Continued)

(52) U.S. Cl.
CPC ........... *G06F 21/51* (2013.01); *G06N 3/0455* (2023.01); *G06N 3/08* (2013.01)

(58) Field of Classification Search
None
See application file for complete search history.

(56) References Cited

U.S. PATENT DOCUMENTS 8,589,407 B2 11/2013 Bhatia
10,860,629 B1 * 12/2020 Gangadharaiah ... G06F 16/3329
(Continued)

FOREIGN PATENT DOCUMENTS

WO 2015184013 A1 12/2015

OTHER PUBLICATIONS

"Google-Research-Datasets / Clang8", Retrieved From : https://github.com/google-research-datasets/clang8, Retrieved Date : Mar. 14, 2022, 4 Pages.

(Continued)

*Primary Examiner* — Andrew J Steinle
(74) *Attorney, Agent, or Firm* — NICHOLSON DE VOS WEBSTER & ELLIOTT LLP

(57) ABSTRACT

Embodiments of the disclosed technologies include configuring a first machine learning model to generate and output suggested message content based on first correlations between message content and message acceptance data, where the first machine learning model includes a first encoder-decoder model architecture, configuring a second machine learning model to generate and output message evaluation data based on second correlations between the message content and the message acceptance data, where the second machine learning model includes a second encoder-decoder model architecture, coupling an output of the first machine learning model to an input of the second machine learning model, and coupling an output of the second machine learning model to an input of the first machine learning model.

18 Claims, 20 Drawing Sheets

(51) Int. Cl.
*G06N 3/0455* (2023.01)
*G06N 3/08* (2023.01)

(56) References Cited

U.S. PATENT DOCUMENTS

| | | | | |
|---|---|---|---|---|
| 11,252,114 | B2 | 2/2022 | Braun | |
| 2016/0224524 | A1 | 8/2016 | Kay | |
| 2018/0240014 | A1 | 8/2018 | Strope et al. | |
| 2019/0043063 | A1 | 2/2019 | Johnsen | |
| 2019/0286451 | A1* | 9/2019 | Awadallah | G06F 8/30 |
| 2021/0011919 | A1 | 1/2021 | Lu | |
| 2021/0157974 | A1 | 5/2021 | Xie et al. | |
| 2022/0253647 | A1 | 8/2022 | Perkins | |
| 2023/0097438 | A1* | 3/2023 | Cella | G05D 1/0297 |
| 2023/0206096 | A1 | 6/2023 | Paiement | |
| 2023/0306049 | A1 | 9/2023 | Shah | |
| 2023/0316307 | A1 | 10/2023 | Hirate | |
| 2024/0378425 | A1 | 11/2024 | Bodigutla | |

OTHER PUBLICATIONS

"Hire and Retain a Diverse Team", Retrieved From : https://textio.com/, Retrieved Date : Mar. 14, 2022, 1 Page.

"LanguageTool", Retrieved From : https://languagetool.org/, Retrieved Date : Mar. 14, 2022, 12 Pages.

"Pointwise Mutual Information", Retrieved from: https://en.wikipedia.org/wiki/Pointwise_mutual_information, Retrieved Date: Mar. 14, 2022, 5 Pages.

Lewis, et al., "BART: Denoising Sequence-to-Sequence Pre-training for Natural Language Generation, Translation, and Comprehension", In Repository of arXiv:1910.13461v1, Oct. 29, 2019, 10 Pages.

Radford, et al., "Improving Language Understanding by Generative Pre-Training", In Publication of OpenAI, 2018, 12 Pages.

Raffel, et al., "Exploring the Limits of Transfer Learning with a Unified Text-to-Text Transformer", In Repository of arXiv:1910.10683v4, Sep. 19, 2023, 67 Pages.

Sellam, et al., "BLEURT: Learning Robust Metrics for Text Generation", In Repository of arXiv:2004.04696v5, May 21, 2020, 12 Pages.

Tay, et al., "Unifying Language Learning Paradigms", In Repository of arXiv:2205.05131v2, Oct. 8, 2022, pp. 1-37.

Yuan, et al., "BARTScore: Evaluating Generated Text as Text Generation", In Repository of arXiv:2106.11520v2, Oct. 27, 2021, 18 Pages.

Zhang, et al., "BERTScore: Evaluating text generation with BERT", In Repository of arXiv:1904.09675v3, Feb. 24, 2020, pp. 1-43.

Amatriain, et al., "Transformer models: an introduction and catalog", arXiv preprint arXiv:2302.07730, Mar. 31, 2024, 67 pages.

International Search Report and Written Opinion received for PCT Application No. PCT/US2024/025902, Aug. 29, 2024, 12 pages.

International Search Report and Written Opinion received for PCT Application No. PCT/US2024/025900, Sep. 5, 2024, 13 pages.

U.S. Appl. No. 18/214,939, filed Jun. 27, 2023.

Non-Final office Action mailed on Apr. 13, 2026, in U.S. Appl. No. 18/214,939, 17 pages.

Amatriain, Xavier, "Transformer Models: An Introduction and Catalog", In Repository of arXiv:2302.07730v2, Feb. 16, 2023, 36 Pages.

First Examination Report Received for Indian Application No. 202517088739, mailed on Jul. 14, 2026, 11 Pages.

Final office Action mailed on Jul. 31, 2026, in U.S. Appl. No. 18/214,939, 16 pages.

* cited by examiner

1200

GENERATIVE COLLABORATIVE MESSAGE SUGGESTIONS

CROSS-REFERENCE TO RELATED APPLICATIONS

The present application claims the benefit under 35 U.S.C. § 119 (e) of U.S. Provisional Patent Application Ser. No. 63/501,632 filed May 11, 2023, which is incorporated herein by this reference in its entirety.

TECHNICAL FIELD

A technical field to which the present disclosure relates is the generation of digital content, such as electronic messages. Another technical field to which the present disclosure relates is automated content generation using artificial intelligence.

COPYRIGHT NOTICE

This patent document, including the accompanying drawings, contains material that is subject to copyright protection. The copyright owner has no objection to the facsimile reproduction of this patent document, as it appears in the publicly accessible records of the United States Patent and Trademark Office, for the purpose of viewing its content, but otherwise reserves all copyright rights whatsoever.

BACKGROUND

Messaging systems are computer systems that use computer networks to transmit electronic messages between or among user accounts via computing devices. For example, an electronic message is composed by a sender using the sender's account at the sender's computing device. The sender identifies one or more prospective recipients of the message, and the messaging system transmits the message to the accounts of the one or more prospective recipients.

There are many different types of messaging systems. Electronic mail (email) is a form of electronic messaging. Instant messaging, text messaging, direct messaging, in-app messaging, mobile messaging, multimedia messaging, and push notifications are forms of messaging systems that typically have fewer features than email and are often useful for short asynchronous or real-time conversations between or among users.

In-app messaging differs from email and text messaging in that, whereas a sender can attempt to send emails and text messages to any recipient as long as the recipient's handle or address is known, the prospective recipients of in-app messaging are limited to the app's user base.

Some forms of in-app messaging are public. For example, some application software systems, such as social network services and some asynchronous messaging systems, allow their users to message each other in a way that makes the messages available for viewing by other users of those systems. Direct messaging systems provide a non-public mode of electronic communication between or among users of an application software system. In direct messaging, only the sender and the recipient can see the messages exchanged between them.

Some social network-based applications further restrict direct messaging. For example, in some applications, the ability to send direct messages is limited to the sender's connections. That is, the sender can only direct message recipients with whom the sender is connected by the social network. An application may grant a sender broader access to a larger group of potential direct message recipients if the sender's user account satisfies one or more applicable criteria. For example, a sender may be granted broader access if the sender has not had any policy violations while using the application or if the sender's role qualifies the sender for broader access (e.g., if the sender is a premium user or a recruiter).

Internet-based software applications can have millions or hundreds of millions of users worldwide. In these cases, messaging systems facilitate the distribution of electronic messages between or among the app users on a very large scale. For example, messaging systems can distribute millions of messages to hundreds of millions of user devices worldwide, every day. The messages can include various different forms of digital content, including text, images, audio, and/or video content.

BRIEF DESCRIPTION OF THE DRAWINGS

The disclosure will be understood more fully from the detailed description given below and from the accompanying drawings of various embodiments of the disclosure. The drawings are for explanation and understanding only and should not be taken to limit the disclosure to the specific embodiments shown.

DETAILED DESCRIPTION

Figure 1:
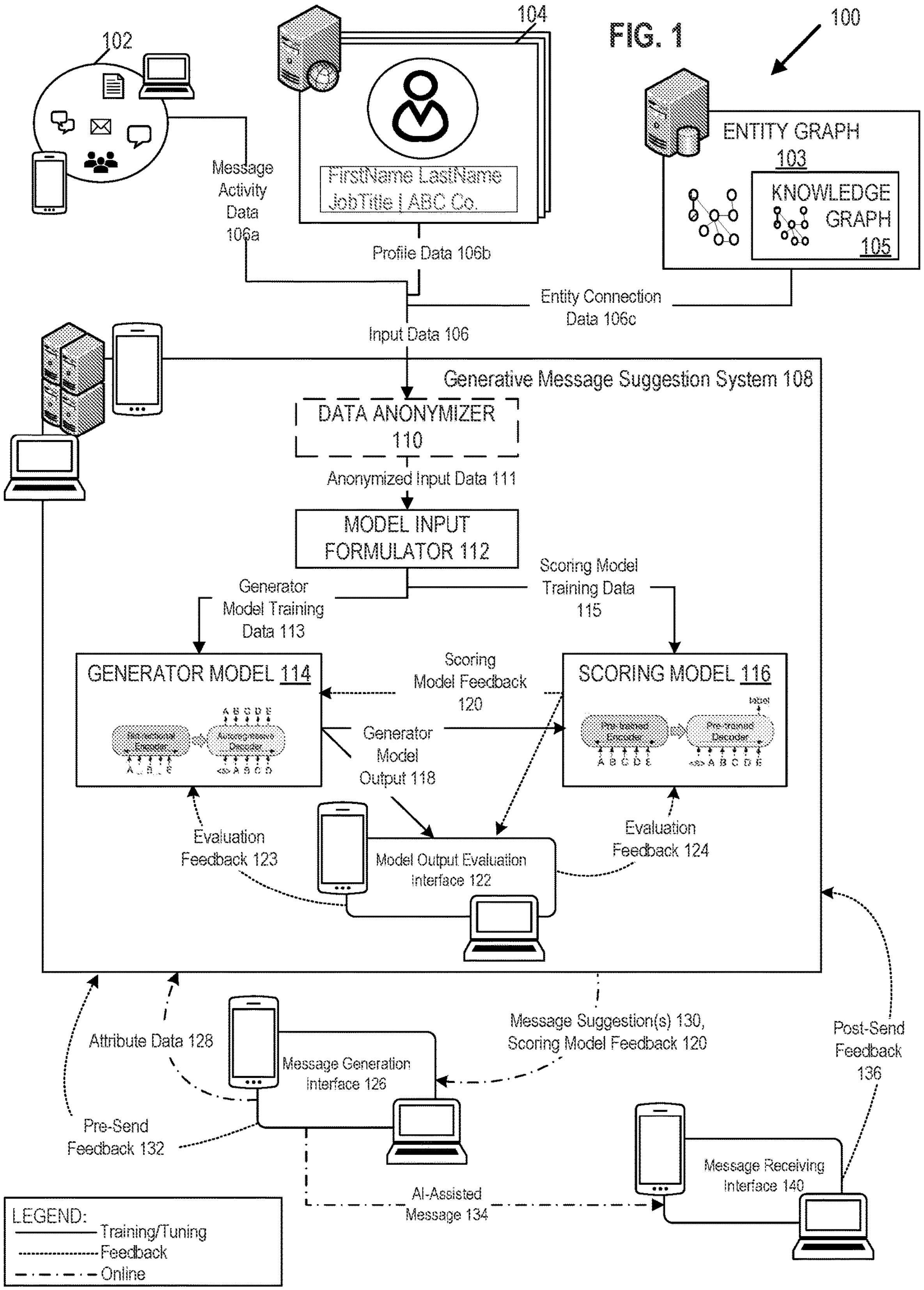
FIG. 1 is a flow diagram of an example method for automated message suggestion generation using components of a generative message suggestion system in accordance with some embodiments of the present disclosure.

When a sender of an electronic message sends the message to a prospective recipient, the message may be at least temporarily stored in a message inbox at the prospective recipient's account, but the sender has no guarantee that the message will be accepted by the prospective recipient. Thus, as used herein, prospective recipient may refer to a user to whom a sender has sent an electronic message but who has not yet accepted the message, while recipient may refer to a prospective recipient that has accepted the message. Recipient or prospective recipient may refer to one or more users who are the target of a sender's message. For example, the sender may address their message to one or more prospective recipients, and some or all of the prospective recipients may accept the message.

Accepted as used herein may refer to any action or series of actions by the prospective recipient that indicate message acceptance, including clicking or tapping on a message icon related to a message, opening a message, viewing a message, reading a message, replying to a message, etc. In contrast, actions that indicate a lack of message acceptance include explicitly rejecting a message, declining receipt of a message, ignoring a message, deleting a message, moving a message to a 'junk' folder, reporting a message as spam, or allowing a message to remain unopened or unread for an extended period of time.

Acceptance data, which indicates whether or not a sender's message has been accepted, can be logged and tracked, for example by a logging service or an analytics component of the messaging system. In some implementations, acceptance may refer to the occurrence of a specific user interface event. For example, acceptance can occur when the recipient of a message takes a specific action such as clicking on a "Yes, interested" button on the messaging interface to explicitly indicate that the recipient is interested in the topic or opportunity represented by the message. Alternative or in addition, acceptance can occur implicitly when the recipient of a message responds to the message by typing any typed free text that the system interprets as an acceptance. For example, an artificial intelligence model trained to classify sequences of clicks and/or keystrokes as an acceptance or not an acceptance (e.g., a binary classifier or other machine learning model), can be used to detect implicit acceptance.

The acceptance data can be used to compute the sender's acceptance rate. Acceptance rate as used herein may refer to a computation based on historical data that reflects a comparison of the number of the sender's messages that have been accepted in a specific time period to the total number of messages sent by the sender in that same time period. Acceptance rate can be computed for individual senders or in the aggregate for groups of senders, where a group of senders has at least one common characteristic. Acceptance rate also can be computed for various combinations of recipients and prospective recipients. For example, a sender can have different acceptance rates for different recipient groups, where a group of recipients has at least one common characteristic. Senders can use acceptance rate to measure the success of their previous messaging efforts.

Historical acceptance rate data can be used to compute an acceptance probability. Acceptance probability as used herein may refer to a computed (e.g., probabilistic or statistical) likelihood of a particular message created and sent by a particular sender being accepted by a particular prospective message recipient. Acceptance probability can be used to predict, e.g., before a message is sent, a likelihood that the message the sender is composing will be accepted by the prospective recipient.

Composing a message that has a high acceptance probability can be challenging for many message senders. Finding the right words and organizing them in an appealing way based on the needs, interests, or preferences of a particular prospective recipient can be very time consuming as well. Further, many message senders may be unaware of the message components and/or message writing techniques that can lead to a high likelihood of acceptance. These barriers to effective message composition can be exacerbated by the limitations of conventional user input devices. For example, smaller form factor touch-based keypads and touchscreens make typing error prone and conventional auto-correct mechanisms are often inaccurate. Speech-based input mechanisms can facilitate the input of message text by enabling the sender to use their voice to input the message content, but conventional speech-to-text and speech-to-image technologies still produce transcription errors that need to be manually corrected using the touchscreen. As a result of these and other limitations of conventional input devices, senders are often required to perform labor-intensive reviews and revisions of the message they create before the message is ready to be sent to the prospective recipient. However, message senders often may not have the time or inclination to perform such reviews and revisions, resulting in sub-optimal acceptance rates for the messages that they send.

As a result of these and other issues, a technical challenge is for the messaging system to optimize acceptance probabilities while also optimizing the efficiency of the message creation process.

Conventional attempts to improve the message creation process have provided generalized message templates. While efficient, these standardized templates are impersonal and have low rates of acceptance. The conventional alternative to generalized templates is for the sender to hand-write personalized messages to each individual prospective recipient or to hand-modify the template for each prospective recipient. Hand-writing personalized messages or hand-modifying templates have resulted in higher acceptance rates but the message creation process is not efficient. For high-volume senders, the use of generalized templates is scalable but produces sub-optimal acceptance rates. On the other hand, the hand-personalization approaches produce improved acceptance rates but are not scalable.

A technical challenge, therefore, is to develop an automated process for generating message suggestions that provides an efficient user experience for the message sender, is scalable, and provides message suggestions that improve the sender's acceptance probability specifically with respect to the sender's prospective recipients.

A further technical challenge of messaging systems is efficiently determining the most relevant content for a particular recipient and focusing communications to the recipient on that most relevant content. This is an ongoing challenge because as the amount of content available from multiple different sources continues to increase, it becomes ever more challenging to distill the information for purposes of generating a message. Embodiments of the disclosed technologies can facilitate and improve the process of identifying the most relevant content for a particular user based on the user's intent or objective and then efficiently creating a message corresponding to the identified most relevant content.

Another technical challenge is how to machine-generate digital content including images, videos, and/or audio. Still another technical challenge is how to reduce the burden of user input when creating messages. Yet another technical challenge is to scale the machine generation of message suggestions to a large user base (e.g., hundreds of thousands to millions or more users) without having to increase the size of the generative message suggestion system. A further technical challenge is to improve the efficiency of message suggestion distribution over a network, including adapting the generative message suggestions to various different hardware platforms, screen sizes, and device types. An additional technical challenge is to provide a generative message system that is robust to latency issues.

To address these and other technical challenges of conventional message creation systems, the disclosed approaches leverage artificial intelligence technologies including generative models to facilitate a generative, collaborative process that can lead to the creation of messages with improved acceptance probability. As described in more detail below, this disclosure provides an artificial intelligence model architecture that is configured to recursively machine-generate message suggestions using a generator model, score messages, including messages containing the machine-generated message suggestions, using a scoring model, and tune the generator model based on the output of the scoring model.

Examples of message suggestions that can be machine-generated using the disclosed technologies include attribute values suggested to be included in a message composed by the sender, insights about which particular attribute values the sender should emphasize or deemphasize while composing the message, and suggested samples of machine-generated message content, e.g., examples of content that can form or be included in the body of the message. The message suggestions are customized based on available information about the sender and/or the prospective recipient which, in some implementations, is obtained using a dynamically-updated entity graph. The sender can further develop or modify a machine-generated suggested message to further customize a message for a particular prospective recipient.

In contrast to the conventional methods for facilitating message creation, the disclosed technologies are both generative and collaborative in that aspects can efficiently produce message suggestions that are automatically customized based on the most currently available information about the sender, the subject of the message, and/or prospective recipient. This approach facilitates the message composition process and improves the likelihood that the sender will produce a message that will be accepted by the prospective recipient while reducing the need for the sender to engage in lengthy interactions with cumbersome input mechanisms, thereby reducing the time from message creation to transmission to the prospective recipient. The disclosed approaches further enable large amounts of information to be filtered or curated into the most relevant information for specific purposes such as responding to the intent, objective, or goal of a particular audience, message, recipient user, or sender user.

As described in more detail below, embodiments of a generative message suggestion system include one or more of the following components: an input data collection subsystem, a data anonymizer subsystem, a training data formulation subsystem, a generator model subsystem, a scoring model subsystem, a message suggestion generation subsystem, a message generation interface, a message distribution service, a pre-send feedback subsystem, and a post-send feedback subsystem.

The input data collection subsystem is capable of collecting and outputting input data associated with a message sender, a prospective message recipient, and/or one or more other entities associated with the message to be created, such as a company that may be hiring or a job posting. The input data collected by the input data collection subsystem can include a historical set of messages previously created and sent by one or more message senders and the associated acceptance data, which can be anonymized and used to train the machine learning models of the generative message suggestion system. The data anonymizer subsystem is capable of identifying personally identifiable information (PII) in the input data and masking the PII so that the PII is not used in model training or other downstream processes. The training data formulation subsystem creates training data sets for the machine learning models of the generative message suggestion system based on the anonymized input data.

The generator model subsystem includes a generator model, which includes a machine learning model trained based on a training data set formulated by the training data formulation subsystem to machine-generate message suggestions. The scoring model subsystem includes a scoring model, which includes a machine learning model trained based on a training data set formulated by the training data formulation subsystem to score messages, including messages containing suggestions output by the generator model and messages created by senders without suggestions provided by the generator model.

The message suggestion generation subsystem applies the trained generator model to a particular explicit or implicit intent, goal, or objective of the sender user, the message, the recipient user, or audience. The explicit or implicit intent, goal, or objective may be represented by, for example, attribute data selected or input by a sender user, e.g., at inference time, and machine-generates and outputs one or more message suggestions based on the attribute data. One or more of the machine-generated message suggestions are presented to the sender via, e.g., a message generation interface. In response to one or more of the presented message suggestions, the sender may create a message or modify machine-generated suggested message content. The message distribution service is capable of distributing the sender's message to the prospective recipient.

The message generation interface can communicate pre-send feedback to the pre-send feedback subsystem. The message distribution service can communicate post-send feedback to the post-send feedback subsystem. The pre-send feedback subsystem and the post-send feedback subsystem each are capable of generating output that can act as proxies for the expected output of the message suggestion generation subsystem or as labels or scores for the actual output of the message suggestion generation subsystem. Pre-send feedback and/or post-send feedback can be used to measure the quality of machine-generated message suggestions output by the message suggestion generation subsystem, e.g., in terms of acceptance probability, and to improve the subsequent output of the message suggestion generation subsystem. For instance, some or all of the output of the pre-send feedback subsystem and/or the feedback generated by the post-send feedback subsystem are returned to the generator model subsystem to tune the generator model based on the feedback. Additionally or alternatively, feedback generated by the pre-send feedback subsystem and/or the post-send feedback subsystem are provided to the scoring model to tune the scoring model based on the feedback. As a result of these and other aspects of the described generative message suggestion system, at least some of the message suggestions produced by the generative message suggestion system can facilitate the efficient creation of electronic messages with improved acceptance probabilities while minimizing laborious tasks like typing with a keypad or reviewing and revising content on a small form factor device.

The components of the disclosed generative message suggestion system are configured in a way that makes personalized message suggestion generation scalable. For example, previous attempts at facilitating personalized message creation have not been successful because they were not scalable due to the amount of human labor required to manually customize the message content. In contrast, the disclosed technologies includes a machine learning model architecture that is scalable because, for example, the generator model and the scoring model are connected in a closed loop. Also, the generator model is configurable to generate multiple different or alternative message suggestions simultaneously, enabling the user to select from among the message suggestions. When multiple different message suggestions are machine-generated simultaneously for each sender, the number of potential message suggestions can scale quickly to, for example, accommodate highly active users. In environments where latency may be an issue, to reduce latency, these message suggestions can be stored in a message suggestion library for future use, reuse, or modification and reuse with each particular sender on an individualized basis. For example, when a group of message suggestions is machine-generated for a particular sender, unused or unselected message suggestions can be stored in a real-time data store or nearline data store, for instance, so that they are readily available to be suggested or modified in real time when that particular sender initiates a subsequent message creation process.

Certain aspects of the disclosed technologies are described in the context of generative models that output pieces of writing, i.e., natural language text. However, the disclosed technologies are not limited to uses in connection with text output. For example, aspects of the disclosed technologies can be used to generate message suggestions that include non-text forms of machine-generated output, such as digital imagery, videos, and/or audio.

Certain aspects of the disclosed technologies are described in the context of non-public electronic messages distributed via a user network, user connection network, or application software system, such as a direct messaging feature of a social network service. However, aspects of the disclosed technologies are not limited to direct messaging or to social network services, but can be used to improve the generation of customized electronic messages with other types of software applications. Any network-based application software system can act as user network or application software system to which the disclosed technologies can be applied. For example, news, entertainment, and e-commerce apps installed on mobile devices, enterprise systems, messaging systems, search engines, workflow management systems, collaboration tools, and social graph-based applications can all function as application software systems with which the disclosed technologies can be used.

The disclosure will be understood more fully from the detailed description given below, which references the accompanying drawings. The detailed description of the drawings is for explanation and understanding, and should not be taken to limit the disclosure to the specific embodiments described.

In the drawings and the following description, references may be made to components that have the same name but different reference numbers in different figures. The use of different reference numbers in different figures indicates that the components having the same name can represent the same embodiment or different embodiments of the same component. For example, components with the same name but different reference numbers in different figures can have the same or similar functionality such that a description of one of those components with respect to one drawing can apply to other components with the same name in other drawings, in some embodiments.

Also, in the drawings and the following description, components shown and described in connection with some embodiments can be used with or incorporated into other embodiments. For example, a component illustrated in a certain drawing is not limited to use in connection with the embodiment to which the drawing pertains, but can be used with or incorporated into other embodiments, including embodiments shown in other drawings.

FIG. 1 is a flow diagram of an example method for automated message suggestion generation using components of a generative message suggestion system in accordance with some embodiments of the present disclosure. The method is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method is performed by components of generative message suggestion system 580 of FIG. 5, including, in some embodiments, components shown in FIG. 5 that may not be specifically shown in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 1, a computing system 100 is shown, which includes a generative message suggestion system 108. The generative message suggestion system 108 of FIG. 1 includes a data anonymizer 110, a model input formulator 112, a generator model 114, a scoring model 116, and a model output evaluation interface 122. In the example of FIG. 1, the components of the generative message suggestion system 108 are implemented using an application server or server cluster, which can include a secure environment (e.g., secure enclave, encryption system, etc.) for the processing of message data. The generative message suggestion system 108 is in bidirectional communication with a message generation interface 126 via a network. Message generation interface 126 includes front end user interface functionality that is considered part of generative message suggestion system 108, in some embodiments. From time to time, messages created at the message generation interface 126 are communicated to a message receiving interface 140.

As indicated in FIG. 1, components of computing system 100 are distributed across multiple different computing devices, e.g., one or more client devices, application servers, web servers, and/or database servers, connected via a network, in some implementations. In other implementations, at least some of the components of computing system 100 are implemented on a single computing device such as a client device. For example, some or all of the generative message suggestion system 108 is implemented directly on the user's client device in some implementations, thereby avoiding the need to communicate with servers over a network such as the Internet.

To create and operate various portions of generative message suggestion system 108, input data can be collected from a number of different sources. The input data 106 can include message activity data 106*a*, profile data 106*b*, and entity connection data 106*c*. The input data 106 can be provided to generative message suggestion system 108 from potentially a variety of different data sources including user interfaces, databases and other types of data stores, including online, real-time, and/or offline data sources. In the example of FIG. 1, message activity data 106*a* are received via one or more user devices or systems, such as portable user devices like smartphones, wearable devices, tablet computers, or laptops; profile data 106*b* are received via one or more web servers; and entity connection data 106*c* are received via one or more database servers; however, any of the different types of input data 106 can be received by generative message suggestion system 108 via any type of electronic machine, device or system.

Examples of message activity data 106*a* include messages that previously have been created by senders to prospective recipients via a messaging system or an application software system operating a messaging system, such as a social network service operating a direct messaging functionality. The message activity data 106*a* includes, for a particular sender's message, data that indicates how the prospective recipient responded to the message, e.g., whether the sender's message was accepted, rejected, or ignored by the prospective recipient.

The message activity data 106*a* can also include, for a particular message, interaction data associated with the sender and/or the prospective recipient. For example, the message activity data 106*a* can include a history of interactions between the sender and prospective recipient, a history of the sender's interactions with other entities on a social network (e.g., other users, content items, job postings, company pages, skills pages, etc.), and/or a history of the prospective recipient's interactions with other entities on a social network (e.g., other users, content items, job postings, company pages, skills pages, etc.). Examples of interactions include the creation of documents, messages, posts, articles, images, video files, audio files, multimedia files, digital reactions (e.g., likes, comments, shares, etc.), requests (e.g., follow requests, connection requests, etc.), search histories, and transaction histories (e.g., online submissions of job applications, ecommerce transactions, etc.).

The message activity data 106*a* can include image or video content. The message activity data 106*a* containing text, image, audio, and/or video content can be user-created or machine-generated, e.g., by a generative model. The message activity data 106*a* can be obtained by the generative message suggestion system 108 via a user interface such as message generation interface 126 and/or retrieved from one or more data stores, such as searchable databases that store historical information about the use of the messaging system or application software system operating the messaging system. The message activity data 106*a* can include structured data, such as data entered by the user into an online form that enforces one or more input rules that constrain the values and/or format of the input, and/or unstructured data, such as natural language text, audio, or transcriptions.

Examples of profile data 106*b* include user experience, interests, areas of expertise, educational history, job titles, skills, job history, etc. Profile data 106*b* can be obtained by the generative message suggestion system 108 by, for example, querying one or more data stores that store entity profile data for the messaging system or application software system operating the messaging system.

Figure 6:
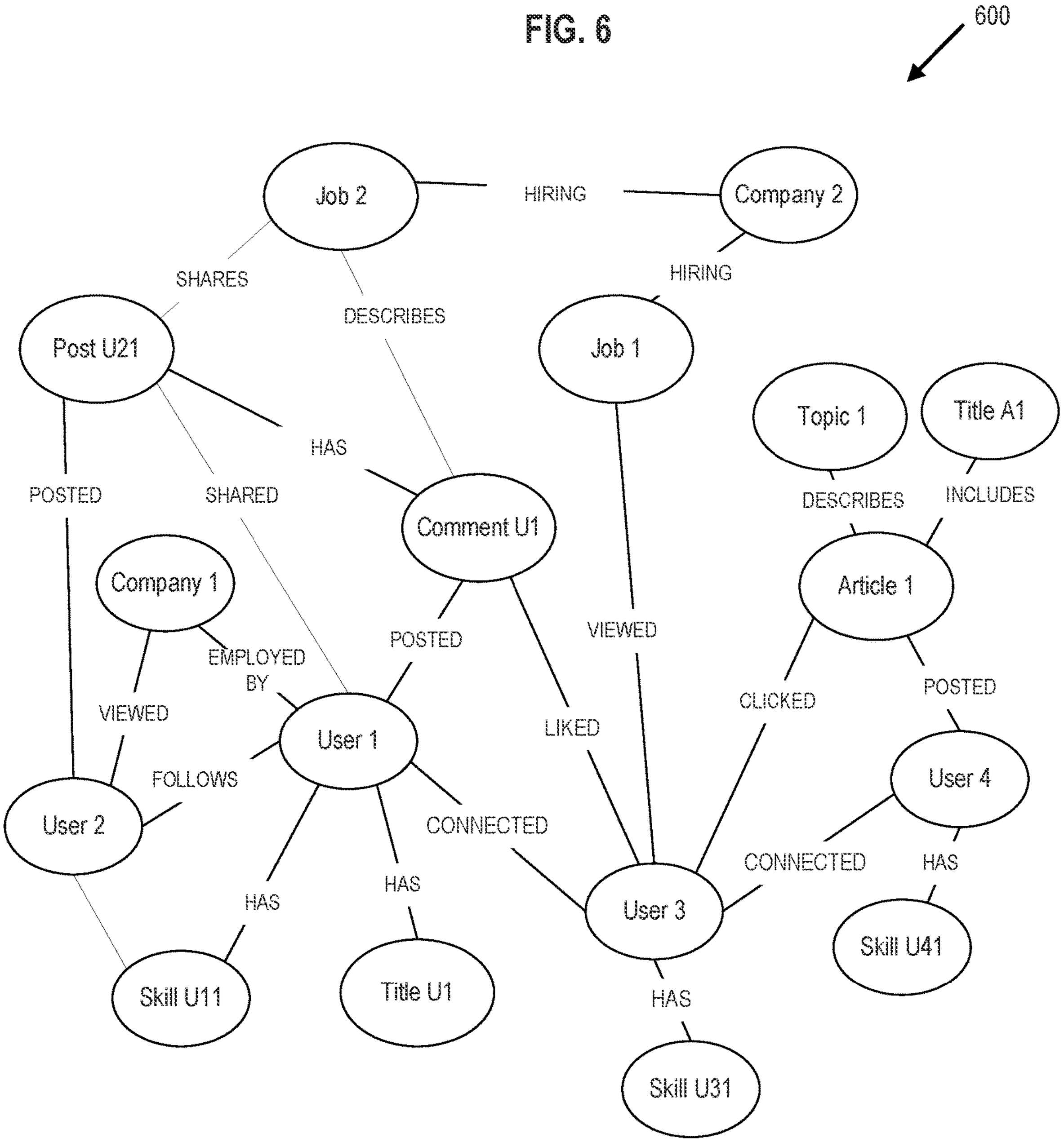
FIG. 6 is an example of an entity graph in accordance with some embodiments of the present disclosure.

Examples of entity connection data 106*c* include data extracted from entity graph 103 and/or knowledge graph 105. The entity graph 103 includes entity profile data arranged according to a connection graph, e.g., a graph of connections and relationships between users of the user connection network and between users and other entities. For example, the entity graph 103 represents entities as nodes and relationships between entities as edges between the nodes. In some implementations, entity graph 103 includes a cross-application knowledge graph 105. The cross-application knowledge graph 105 is a subset of the entity graph 103 or a superset of the entity graph 103 (e.g., a combination of multiple entity graphs) that links data from the user connection network with data from other application software systems, such as a user connection network or a search engine. An example of an entity graph or cross-application knowledge graph is shown in FIG. 6, described herein.

Entity as used herein may refer to a user of the messaging system or application software system operating the messaging system, or another type of entity, such as a company, organization, or institution, or a digital content item, such as an article, post, comment, share, or job posting. For example, in a user connection network, an entity can include or reference a web page with which a user of the user connection network can interact, where the web page is configured to display a digital content item, such as an article, post, message, another user's profile, or profile data relating to a company, organization, institution, or a job posting. In some implementations of the entity graph 103, 112, an activity is represented as an entity. Activity as used herein may refer to network activity, such as digital communications between computing devices and systems. Examples of network activity include initiating a session with an application software system by, e.g., logging in to an application, initiating a page load to load a web page into a browser, creating, editing, sending, receiving, viewing, and interacting with messages, uploading, downloading, creating, and sharing digital content items on the network, inputting or executing a search query, and executing social actions, such as connecting or following other users, adding comments and/or inputting social reactions to articles or posts on the network.

Entity connection data 106*c* are extracted from an application software system operating the entity graph 103 or knowledge graph 105 by, for example, traversing the entity graph 103 or knowledge graph 105, e.g., by executing one or more queries on one or more data stores that store data associated with the nodes and edges of the entity graph 103 or knowledge graph 105.

As indicated by the legend in FIG. 1, multiple different operational flows are shown for the generative message suggestion system 108, including training or tuning flows, feedback flows, and online flows.

The training or tuning flows configure the generator model 114 to include correlations between message elements and acceptance rates. For example, the generator model 114 includes correlations between attribute data, such as entity data, and message acceptance rates. In some implementations, historical message activity data 106*a* is anonymized using an automated process that does not involve human review of the message activity data 106*a*, and the anonymized data is used as training data. In other implementations, training data is synthesized using, for example, a large language model.

In implementations where historical message activity data 106*a* is used to formulate training data, the data anonymizer 110 anonymizes the message activity data 106*a* before it is used for training or shared with other components of the generative message suggestion system 108. In the training or tuning flows, the data anonymizer 110 pre-processes potentially sensitive input data 106 (e.g., message content and/or metadata) so that it can be used as training data for the machine learning models of the generative message suggestion system 108. The data anonymizer 110 identifies personally identifiable information (PII) in the input data 106 and replaces or masks the PII with a non-PII label using a delexicalization process based on, e.g., a named entity recognition technique. The data anonymizer 110 creates anonymized input data 111 based on the received input data 106.

In some implementations, data anonymizer 110 includes a private Named Entity Recognition (NER) model. The private NER model redacts any Personally Identifiable Information (PII), such as names, job titles, phone numbers, and email addresses, from the message data and delexicalizes any PII in the message data. Delexicalization includes a process of replacing PII values with corresponding semantic labels. For example, "John Adams" is replaced with [NAME]. As another example, an attribute identified in message text (e.g. Software Engineer) is replaced with a word that only mentions the type of attribute (e.g. TITLE replaces Software Engineer). The NER tag provides information about what entities are present in the message data without revealing PII to ensure inferences are not made based on such information. In some implementations, the delexicalization process is only applied to PII. Non-PII entity data, such as skills, are not replaced with NER tags by the data anonymizer 110. Including the raw data values for the non-PII entity data improves the generator model's ability to learn correlations between the untagged entity data and other portions of the input data. The data anonymizer 110 uses a string matching or string search technique to identify entities and attributes in message text and/or other portions of the input data 106, in some implementations.

To illustrate the operation of data anonymizer 110, Table 1 below shows an example of message data before and after processing by data anonymizer 110.

TABLE 1

Data Anonymization Example.

| | |
|---|---|
| Dear Siri,<br>Based on your background in Machine Learning, we feel you are a great fit for the Machine Learning Engineer role at LinkedIn. You can find more details about the job at www.linkedin.com/job123. LinkedIn offers an attractive pay package starting at $150,000 and other benefits such as 401k match. Find more about the company culture at www.linkedin.com. We are looking forward to hearing from you.<br>Regards,<br>GPT3 | Dear [NAME_GIVEN_1],<br>Based on your background in [OCCUPATION_1], we feel you are a great fit for the [OCCUPATION_2] role at [ORGANIZATION_1]. You can find more details about the job at [URL_1]. [ORGANIZATION_1] offers an attractive pay package starting at $[MONEY_1] and other benefits such as 401k match. Find more about the company culture at [URL_2]. We are looking forward to hearing from you.<br>Regards,<br>[NAME_GIVEN_2] |

In Table 1, the first column shows an example of message text before delexicalization by data anonymizer 110, e.g., an example of input data 106, and the second column shows the same example after delexicalization, e.g., an example of anonymized input data 111.

The data anonymizer 110 outputs the anonymized input data 111 for processing by model input formulator 112. In the training or tuning flows, the model input formulator 112 formulates training data for the machine learning models of the generative message suggestion system 108 (e.g., generator model 114 and scoring model 116) based on anonymized input data 111 and/or based on synthesized training examples of message texts.

In some implementations, model input formulator 112 maps the tags added to the input data 106 by the NER model to standardized attribute tags or labels using heuristics. The standardized attribute tags are used to create an input context for the message, which can be used to train or tune the generator model 114. For instance, the tags output by the NER model tags may include generic tags such as [NAME_1], [NAME_2]. These tags can be further mapped to, e.g., [SENDER_NAME] and [RECIPIENT_NAME] to enhance the model training so that as a result, the generator model 114 can distinguish between the two different types of names.

After mapping the NER tags to standardized tags using heuristics, model input formulator 112 extracts sections and entities from message text using a machine learning classifier such as a few-shot classifier, and includes these extracted items in the input context. The resulting input context provides an outline or summary of the message text, including its structure and semantic content. Table 2 below shows an example of an input context for the example of message text shown in Table 1.

TABLE 2

Example of input context.

[Salutation hi] RECIPIENT_NAME
[Good fit] JOB_TITLE: Machine Learning Engineer,

TABLE 2-continued

| Example of input context. |
|---|
| SENDER_COMPANY: LinkedIn<br>[Job description] JOB_URL<br>[Job benefits] MONEY<br>[About company] COMPANY_URL<br>[CTA]<br>[Salutation bye] SENDER_NAME |

In Table 2, the bracketed text indicates the message sections determined using the machine learning classifier, the text in all caps indicates the standardized tags, and the remaining text indicates untagged portions of the message text. As shown in Table 2, the input context includes section information for each line of message text, followed by the relevant attributes.

The input context preserves the order of the sections as in the original message text. During model training, the input context provides the generator model with a message structure definition that the model can use to generate message suggestions that have that same or similar message structure. Thus, for example, the generator model 114 can be trained to generate suggested message content that has the same or similar message structure as other messages that a particular sender has historically created, thereby providing a high degree of customization, e.g., sender-side personalization, with the machine-generated message suggestions. As another example, the model input formulator 112 can link the input context can be linked with the corresponding message text so that when the message text is scored by the scoring model 116, the input context is correlated with the resulting score. In this way, different input contexts (e.g., message structures and/or semantic content) can be correlated with acceptance probabilities.

To facilitate the predictions of acceptance probabilities, the model input formulator 112 extracts, from the input data 106, the historical acceptance data associated with the historical message examples. For example, the model input formulator 112 determines, based on message activity data 106*a*, whether each example of historical message text was included in a message that was accepted, rejected, or ignored by the prospective recipient. An example of an instance of training data that may be formulated by the model input formulator 112 includes anonymized message metadata (e.g., anonymized sender and recipient data), anonymized message text (e.g., the delexicalized body of the message), the input context, and the corresponding acceptance data (e.g., a value of 0 indicates message was accepted by the recipient and a value of 1 indicates that the message was rejected or ignored by the prospective recipient).

The model input formulator 112 creates and outputs training data sets for each of the generator model 114 and the scoring model 116, including generator model training data 113 and scoring model training data 115. The generator model training data 113 and scoring model training data 115 can include different training instances. For example, positive training examples (e.g., examples in which the message was accepted by the recipient) can be included in both the generator model training data 113 and the scoring model training data 115, while negative training examples (e.g., examples in which the message was rejected or ignored by the prospective recipient) may be included only in the scoring model training data 115 and not in the generator model training data 113.

In the example of FIG. 1, both the generator model 114 and the scoring model 116 are configured using an encoder-decoder model architecture, such as an architecture that includes a bidirectional encoder and an autoregressive decoder. In other implementations, other model architectures can be used, as described herein with reference to FIG. 7.

In some implementations, the generator model 114 includes an instance of a text-based encoder-decoder model that accepts a string as input and returns a single string as output. More specifically, the generator model 114 includes an auto-regressive model (e.g., a sequential model which generates an output word based on the words it already generated, until it reaches a special ending word). During training of the generator model 114, the input string includes an instance of generator model training data 113.

The generator model 114 can be trained and tuned using one or more training and tuning flows. In some implementations, the generator model 114 includes a pre-trained language model that can generate text autoregressively. The generator model 114 model can be tuned using, for example, task-agnostic and task-specific training on domain-specific datasets.

In some implementations, the generator model 114 is tuned based on Prefix Language Modeling (PLM) to improve the model's ability to generate suggested message content and understand correlations between domain-specific entities. For example, in the domain of job recruiting, PLM can be used to improve the generator model 114's ability to understand correlations between job titles and skills, such as that a machine learning engineer who works at a specific company would likely have as a skill a particular programming language or platform that is commonly used at that company. In some implementations, pre-training on downstream tasks (e.g., tasking the model with completing an incomplete message) is performed using PLM with a text-infilling denoising objective method by which the model learns to generate missing tokens by replacing spans of input text with a single sentinel token.

In some implementations, supervised fine-tuning of the domain-adapted and task-adapted generator model 114 is performed based on the input context and the delexicalized message data to configure the generator model 114 to generate customized suggested message content. This fine tuning is performed using, for example, a seq2seq training process in which the input sequence to the model consists of attribute data for the sender and attribute data for an entity that is the subject of the message the sender wants to create (e.g., a job), while the target sequence is the de-lexicalized message. To fine-tune the seq2seq model, an input context and an output sequence are used, where the output sequence is the de-lexicalized message, and the input context includes the message sections and attributes (e.g., message structure and semantic content).

During inferencing or suggestion generation by the generator model 114, the model input includes attribute data 128 and the model output includes machine-generated message suggestions 130. For example, sender preferences, prospective recipient preferences, and feature values are encoded into the input string, and the generator model 114 performs conditional content generation to output suggested message content based on the encoded preferences.

Personalization of the suggested message content to the sender, the subject of the message, and/or the prospective recipient is achieved by conditioning the model's content generation on the prospective recipient data (e.g., profile data 106*b* of the prospective recipient), the subject of the message (e.g., a job posting), the match between the subject of the message (e.g., job requirements), and the prospective recipient's background (e.g., profile data 106*b*), and the sender's preferences (based on, e.g., the sender's profile data 106*b* and/or message activity data 106*a*). In this way, the generator model 114 is configured to generate message suggestions that are personalized to specific domains and prospective recipients, including suggested message content that is personalized to specific senders (e.g., matches the sender's preferred style, structure, and tone).

Match or matching as used herein may refer to an exact match or an approximate match, e.g., a match based on a computation of similarity between two pieces of data. An example of a similarity computation is cosine similarity. Other approaches that can be used to determine similarity between or among pieces of data include clustering algorithms (e.g., k means clustering), binary classifiers trained to determine whether two items in a pair are similar or not similar, and neural network-based vectorization techniques such as WORD2VEC. In some implementations, generative language models are used to determine similarity of pieces of data.

In some implementations, generator model 114 incorporates flexible sampling methods into its decoding strategies to diversify the message suggestions that are output by the generator model 114 (e.g., so that the same or similar message suggestions are not repeatedly presented to the same sender). Sampling methods like nucleus sampling or top-k sampling can lead to diverse outputs for the same input because they randomly select tokens from a set of high-probability tokens generated by the language model rather than always choosing the token with the highest probability. This results in multiple but different sequences for the same input, leading to diverse outputs. To balance diversity and factual correctness in these sampling methods, the sampling threshold or k-value is selected to ensure that the generated outputs are grammatically and factually correct while still allowing for some diversity in the generated text.

The trained or tuned generator model 114 is made accessible to message generation interface 126, e.g., as a cloud-based hosted service for model inference. The hosting environment for the generator model 114 is configured to keep latency low to support online serving of message suggestions in real time.

The scoring model 116 is configured to generate and output scores for messages, including messages that are created by senders without the use of message suggestions and messages that include or are based on message suggestions generated by the generator model 114, where the scores indicate the likelihood of message acceptance or acceptance probability.

In some implementations, the scoring model 116 includes an encoder-decoder model architecture similar to the generator model 114 but trained differently. For example, in some implementations, the generator model 114 and the scoring model 116 are different instances of an encoder-decoder model. In some implementations, the scoring model 116 includes a transformer model. In some implementations, the scoring model 116 performs binary classification to output the probability of message acceptance for a given message suggestion generated by the generator model 114.

In some implementations, the scoring model 116 is trained on a large corpus of anonymized historical messages and their respective labels (e.g., acceptance data) to predict the probability of message acceptance and to identify key phrases and/or sentences that influence message acceptance. In some implementations, the scoring model includes a Hierarchical Attention Model that first learns to encode each sentence in the message text, and then further encodes the sequence of these sentence encodings into a final representation followed by a classifier head that predicts the probability of acceptance of the message based on the final representation. In some implementations, the scoring model 116 is trained in this way to identify key phrases within messages, e.g., attributes or snippets of text from the messages that are key determinants of acceptance probability.

In the example of FIG. 1, output of the generator model 114, e.g., generator model output 118, is connected to the scoring model 116 and output of the scoring model 116, e.g., scoring model feedback 120, is connected to the generator model 114. As such, scoring model 116 can be used to predict the probability of acceptance of a message created based on generator model output 118 by the prospective recipient and/or identify key phrases in the message suggestion text. This information can be leveraged to further tune the generator model 114. For example, if the scorer model 116 predicts a low chance of message acceptance, message suggestions specific to the particular phrases contributing to the low acceptance probability can be generated by the generator model 114 and presented to the sender. Similarly, if the scorer model predicts a high chance of acceptance for a message composed by the sender without any previous message suggestions, the generator model 114 might not be used since the high chance of acceptance indicates that message suggestions may not be needed. In this way, the scoring model 116 can be used to optimize the usage of the generator model 114 to only those scenarios in which a sender's message or a generator model output 118 has a low acceptance probability.

The trained or tuned scoring model 116 is made accessible to the generative message suggestion system 108, e.g., as a cloud-based hosted service. The hosting environment for the scoring model 116 is configured for online use so that the output from the scorer model can be used as an additional input to the generator model 114 for message suggestion generation. For example, if a score output by the scoring model 116 for a particular message suggestion generated by the generator model 114 is below a threshold value, then instead of surfacing the message suggestion to the end user, the generator model 114 can generate another message suggestion taking the score into account.

Alternatively or in addition, output of the scoring model 116, e.g., scoring model feedback 120, can be surfaced to the sender via the message generation interface 126 along with the corresponding message suggestion 130 or even as the sender is composing a message via the message generation interface 126. For example, the message generation interface 126 can display changes in the predicted acceptance probability in real time as the sender composes and edits a message.

The model output evaluation interface 122 performs post-processing on generator model output 118 and/or scoring model feedback 120 before message suggestions 130 are returned to message generation interface 126. The model output evaluation interface 122 can include automated evaluation processes and/or human review processes. For example, model output evaluation interface 122 filters generator model output 118 that includes inappropriate words or unrelated information. Alternatively or in addition, generator model output 118 can be evaluated using, e.g., heuristics and/or metrics for coherence, coverage, diversity, etc. As another example, human evaluation can be used to review and filter generator model output 118 for subjective aspects like hallucination and engagement. Results of automated and/or human evaluation can be formulated into evaluation feedback 123, 124 and passed back to generator model 114 and/or scoring model 116 to further tune those models.

The message generation interface 126 includes a front end component through which the sender can interact with the generative message suggestion system 108 at the sender's electronic device. The message generation interface 126 receives message suggestions 130 from generative message suggestion system 108 and presents message suggestions 130 along with scoring model feedback 120, in some cases, to the sender in the context of message composition for a prospective recipient. Message generation interface 126 passes attribute data 128 to generative message suggestion system 108 at the initiation of the sender. For example, the sender selects particular attributes to be included in a message (e.g., job title, skills, hiring company, location) via message generation interface 126 and message generation interface 126 passes the sender-selected attribute data 128 to generative message suggestion system 108.

In response to a message suggestion 130 and/or scoring model feedback 120, message generation interface 126 may generate pre-send feedback 132, such as the sender's interactions with the message suggestion 130, and pass the pre-send feedback 132 to generative message suggestion system 108 for the purpose of improving the generator model 114 and/or scoring model 116.

In response to a message suggestion 130 and/or scoring model feedback 120, the message generation interface 126 may initiate the sending of an AI-assisted message 134 based on a message suggestion 130 to a prospective recipient. The prospective recipient may receive and process the AI-assisted message 134 at a message receiving interface 140 at the prospective recipient's electronic device. The message receiving interface 140 may generate post-send feedback 136, such as interactions of the prospective recipient with the AI-assisted message 134 via the message receiving interface 140, and pass the post-send feedback 136 to generative message suggestion system 108 for the purpose of improving the generator model 114 and/or scoring model 116.

The examples shown in FIG. 1 and the accompanying description, above are provided for illustration purposes. This disclosure is not limited to the described examples. Additional or alternative details and implementations are described herein.

Figure 2:
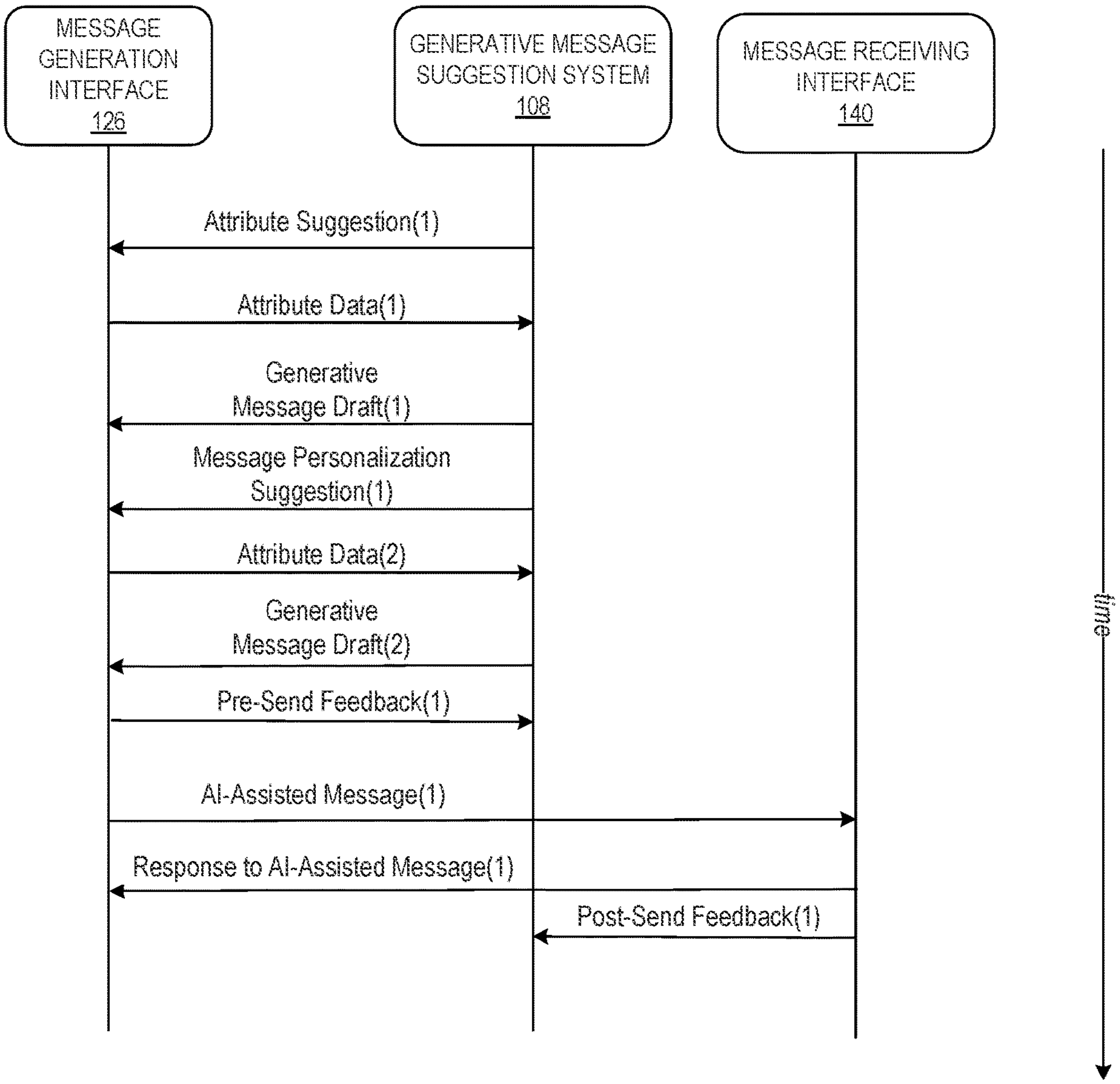
FIG. 2 is a timing diagram showing an example of communications between a message generation interface and a generative message suggestion system in accordance with some embodiments of the present disclosure.

FIG. 2 is a timing diagram showing an example of communications between a message generation interface and a generative message suggestion system in accordance with some embodiments of the present disclosure.

In FIG. 2, the communications represented by labeled arrows occur in a temporal sequence, e.g., an attribute suggestion (1) communication from generative message suggestion system 108 occurs at a first time instance, and an attribute data (1) communication from message generation interface 126 occurs at a second time instance that follows the first time instance.

The communications between components shown in FIG. 2 include, for example, network communications and/or on-device communications. For example, all or portions of the message generation interface 126, generative message suggestion system 108, and message receiving interface 140 can be implemented on a single device or across multiple devices. For instance, embodiments can generate and suggest messages on the user's client device based on attribute data (where the attribute data could be obtained from the user's device and/or one or more other devices, e.g., a server or database), and the user's client device can also receive message suggestions and/or suggestions of attribute data from, e.g., an external database that stores historical data relating to correlations between attributes and message acceptance (e.g., statistics regarding characteristics of messages that correlate with successful acceptance.)

In the example of FIG. 2, the generative message suggestion system 108 initiates an interaction flow with message generation interface 126 by communicating attribute suggestion (1) to message generation interface 126. Attribute suggestion (1) includes, for example, suggested attributes that are correlated with high acceptance probability if those attributes are included in a message. In response to attribute suggestion (1), message generation interface 126 generates attribute data (1), e.g., by receiving and processing the sender's selections from among the attribute suggestion (1), and communicates attribute data (1) to generative message suggestion system 108.

In response to attribute data (1), generative message suggestion system 108 machine-generates generative message draft (1) based on the attribute data (1) using the technologies described herein, and communicates generative message draft (1) to message generation interface 126. For example, generative message draft (1) includes a draft of a body of a message (e.g., natural language text) that includes attribute data (1) and which has been generated based on output of a generator model such as generator model 114.

Based on output of a scoring model such as scoring model 116, generative message suggestion system 108 generates message personalization suggestion (1) and communicates message personalization suggestion (1) to message generation interface 126. For example, message personalization suggestion (1) includes one or more message suggestions that are highly correlated with acceptance probability based on attribute data and/or preferences of the sender, the prospective recipient, or the subject of the message.

In response to message personalization suggestion (1), message generation interface 126 generates attribute data (2). For example, message generation interface 126 receives and processes the sender's selections from among the message personalization suggestion (1), and communicates attribute data (2) to generative message suggestion system 108.

In response to attribute data (2), generative message suggestion system 108 machine-generates generative message draft (2) based on attribute data (2) and communicates generative message draft (2) to message generation interface 126. For example, generative message draft (2) includes a revised (e.g., reworded or rephrased) version of generative message draft (1) or an alternative message draft that has been machine-generated by a generator model such as generator model 114 based on attribute data (2). For instance, generative message draft (2) may have a different tone, structure, or writing style than generative message draft (1) or may include mentions of attributes of attribute data (2) in a different order than attributes were mentioned in generative message draft (1). As an example, an attribute that was mentioned in the first paragraph of generative message draft (1) may not be mentioned until the second paragraph of generative message draft (2), or vice versa.

In response to generative message draft (2), message generation interface 126 generates and sends pre-send feedback (1) to generative message suggestion system 108. For example, message generation interface 126 receives and processes the sender's interactions with generative message draft (2), including an interaction that indicates that the sender approves a message based on generative message draft (2) for sending to the prospective recipient. The pre-send feedback (1) can include the body of the sender-approved message in addition to the sender's approval signal.

Figure 7:
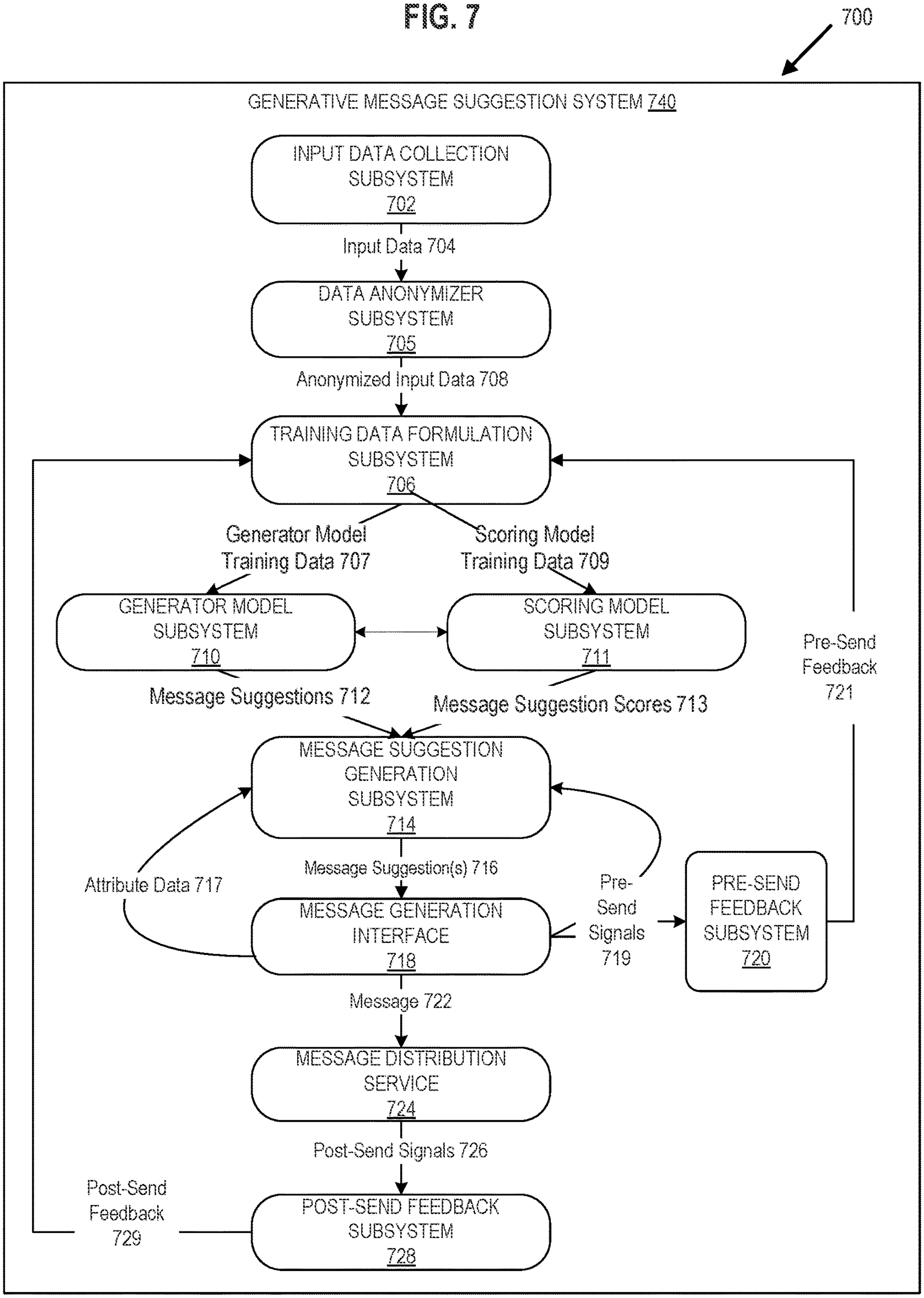
FIG. 7 is a flow diagram of an example method for automated message suggestion generation using components of a generative message suggestion system in accordance with some embodiments of the present disclosure.

In response to the pre-send feedback (1), message generation interface 126 (via a message distribution service such as message distribution service 724, described herein with reference to FIG. 7 but not shown in FIG. 2) formulates artificial intelligence (AI)-assisted message (1) and causes AI-assisted message (1) to be transmitted to a message receiving interface 146 at the prospective recipient's device.

In response to the AI-assisted message (1), message receiving interface 140 generates a response to AI-assisted message (1) and (via the message distribution service, not shown in FIG. 2) communicates the response to AI-assisted message (1) to message generation interface 126. For example, message receiving interface 140 receives an interaction from the prospective recipient indicating that the AI-assisted message (1) has been accepted and read, and communicates a notification of the message acceptance to the sender's message generation interface 126. Based on the response to AI-assisted message (1), message receiving interface 140 formulates post-send feedback (1) and communicates post-send feedback (1) to generative message suggestion system 108. For example, message receiving interface 140 formulates post-send feedback (1) by joining the response to AI-assisted message (1) with the AI-assisted message (1).

The examples shown in FIG. 2 and the accompanying description, above are provided for illustration purposes. This disclosure is not limited to the described examples. Additional or alternative details and implementations are described herein.

FIG. 3A, FIG. 3B, FIG. 3C, FIG. 3D, FIG. 3E, FIG. 3F, FIG. 3G, and FIG. 3H illustrate an example of at least one flow including screen captures of user interface screens configured to create electronic messages based on at least one AI-generated message suggestion in accordance with some embodiments of the present disclosure. The figures FIG. 3A, FIG. 3B, FIG. 3C, FIG. 3D, FIG. 3E, FIG. 3F, FIG. 3G, and FIG. 3H illustrate a user interface flow or sequence of user interface views that can be presented to a message sender to assist the sender by machine-generating and outputting one or more customized message suggestions. Each of the figures FIG. 3A, FIG. 3B, FIG. 3C, FIG. 3D, FIG. 3E, FIG. 3F, FIG. 3G, and FIG. 3H illustrates an example of a user interface screen that can be used to facilitate message composition using automated message suggestion generation technologies described herein.

In some implementations, one or more of the user interfaces shown in FIG. 3A, FIG. 3B, FIG. 3C, FIG. 3D, FIG. 3E, FIG. 3F, FIG. 3G, and FIG. 3H display predictive data associated with the machine-generated message suggestions. For example, some implementations generate and display a scoring value, such as a ranking or percentage, adjacent or in relation to a message suggestion or attribute, where the scoring value indicates to the sending user the likelihood that selection of the message suggestion or attribute will result in a successful acceptance of the message by the recipient user. As another example, some implementations generate and display a similar scoring value, such as a ranking or percentage, adjacent or in relation to a message that the user has created, while the user is drafting the message and before it is sent to the prospective recipient, where the scoring value indicates to the sending user the likelihood that the user's message will result in a successful acceptance of the message by the recipient user.

In the user interfaces shown in FIG. 3A, FIG. 3B, FIG. 3C, FIG. 3D, FIG. 3E, FIG. 3F, FIG. 3G, FIG. 3H, and FIG. 4, certain data that would normally be displayed has been anonymized for the purpose of this disclosure. In a live example, the actual data and not the anonymized version would be displayed. For example, the text "JobTitle" would be replaced with an actual job title (e.g., software engineer) and "FirstName LastName" would be replaced with a user's actual name.

The user interfaces shown in FIG. 3A, FIG. 3B, FIG. 3C, FIG. 3D, FIG. 3E, FIG. 3F, FIG. 3G, FIG. 3H, and FIG. 4 are presented by an application software system, such as a user network and/or messaging system, to a user who wants to create and send a message to a prospective recipient via a network. In some implementations, the user interfaces are each implemented as a web page that is stored, e.g., at a server or in a cache of a user device, and then loaded into a display of a user device via the user device sending a page load request to the server. The icons and the selection and arrangement of elements shown in the user interfaces are copyright 2023 LinkedIn Corporation, all rights reserved.

The graphical user interface control elements (e.g., fields, boxes, buttons, etc.) shown in the screen captures are implemented via software used to construct the user interface screens. While the screen captures illustrate examples of user interface screens, e.g., visual displays such as digital, e.g., online forms or web pages, this disclosure is not limited to online forms or web page implementations, visual displays, or graphical user interfaces. In other implementations, for instance, an automated chatbot is used in place of a fill-in form, where the chatbot requests the user to input the requested information via a conversational, natural language dialog or message-based format using text and/or spoken-language audio received via a microphone embedded in a computing device.

Figure 3A:
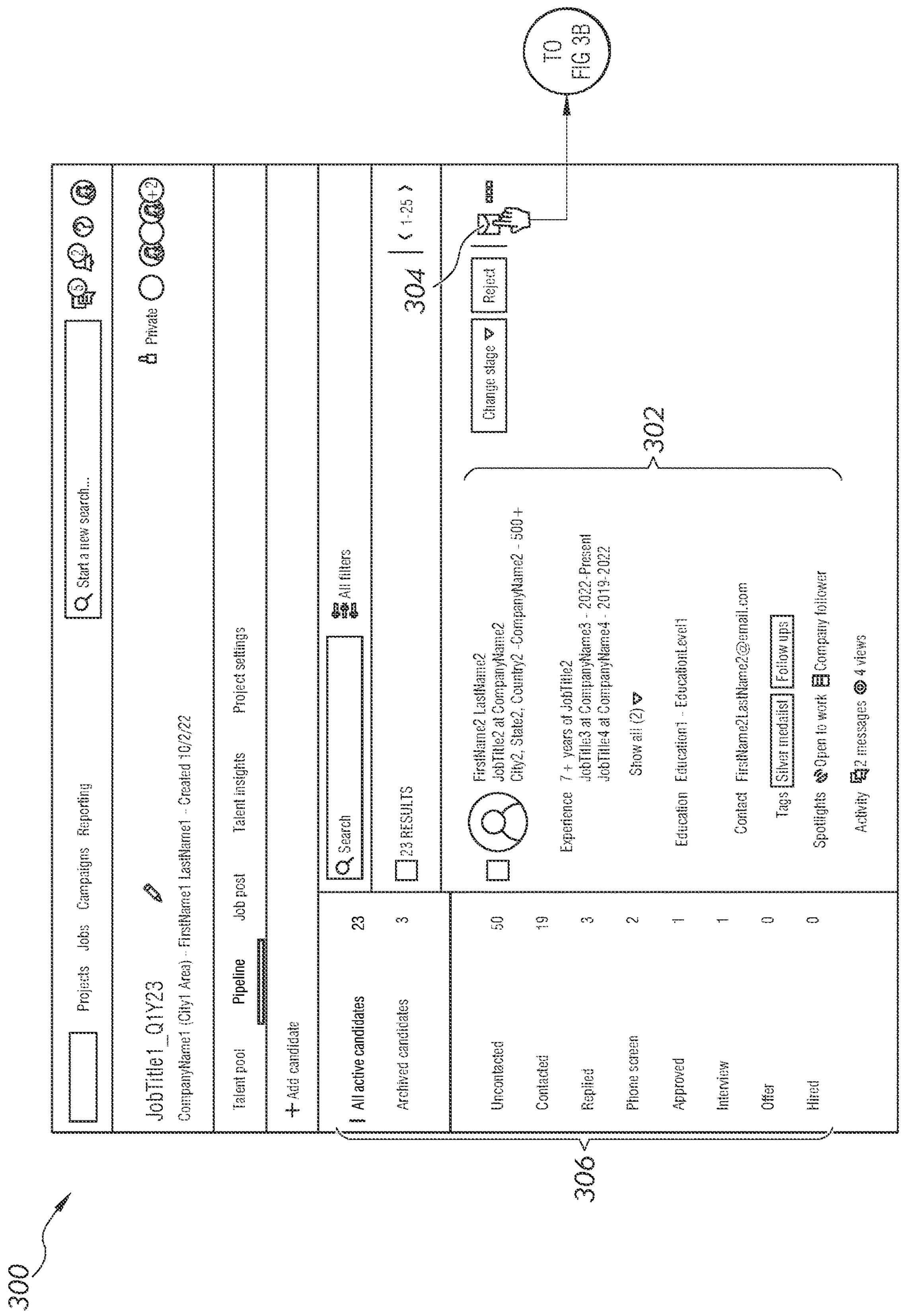
FIG. 3A, FIG. 3B, FIG. 3C, FIG. 3D, FIG. 3E, FIG. 3F, FIG. 3G, and FIG. 3H illustrate an example of at least one flow including screen captures of user interface screens configured to create electronic messages based on at least one AI-generated message suggestion in accordance with some embodiments of the present disclosure.

FIG. 3A illustrates an example of a screen capture of a user interface for viewing user profile data 302 for a prospective message recipient in accordance with some embodiments of the present disclosure. The user interface 300 of FIG. 3A enables a sender to initiate the creation and sending of a message to the prospective recipient whose profile data is displayed in user interface 300.

In the example of FIG. 3A, message sending statistics 306 are presented. For example, in the job recruiting domain, the sender may be a recruiter and message sending statistics 306 aid the recruiter in tracking the status of recruiting-related communications with job prospects. User interface 300 includes an interactive control element 304, e.g., a message initiation mechanism. User selection of the message initiation mechanism causes a transition from user interface 300 to user interface 310 shown in FIG. 3B.

Figure 3B:
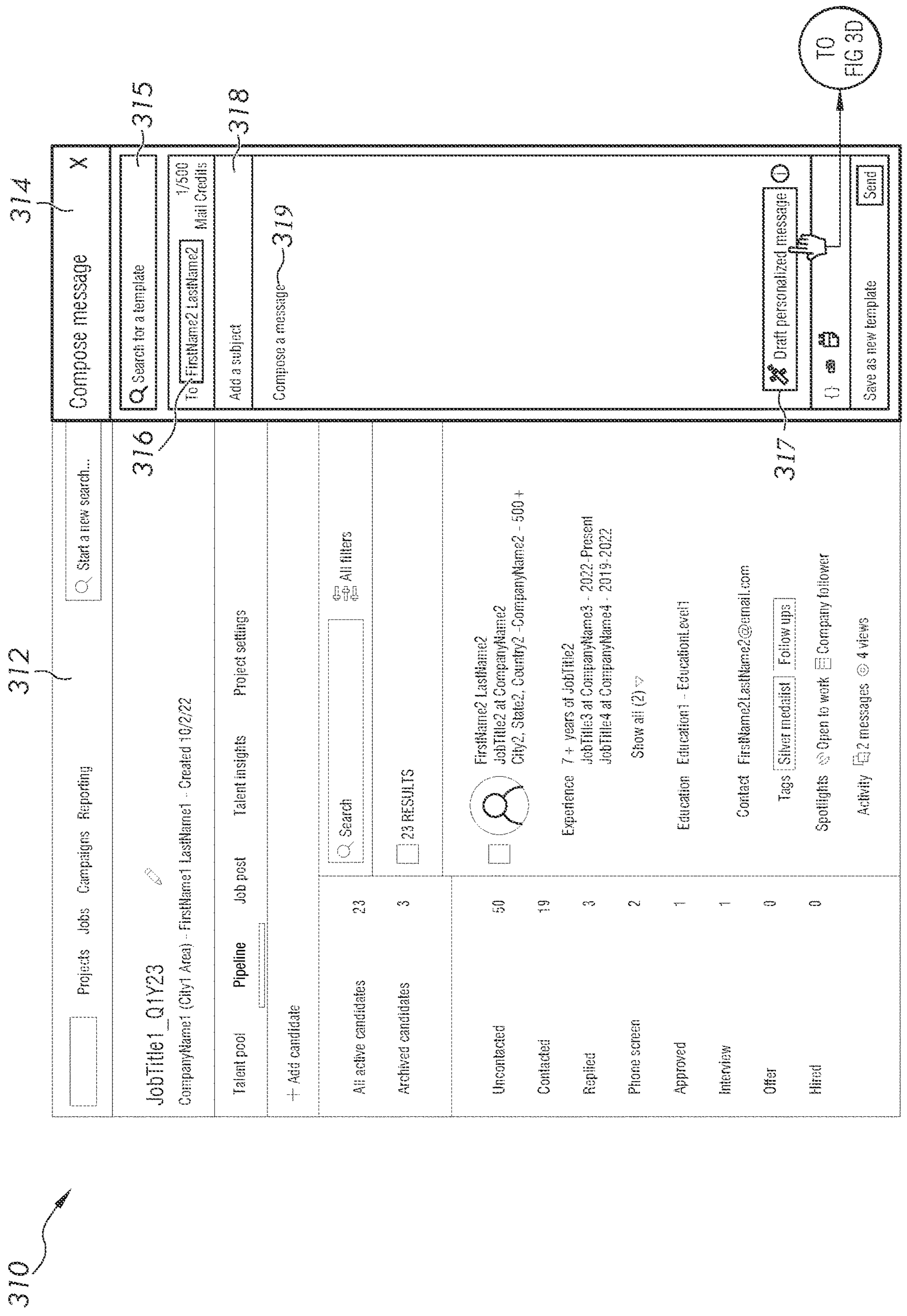

FIG. 3B illustrates an example of a screen capture of a user interface to facilitate composition of a message by the sender for the prospective recipient whose profile data is shown in user interface 300, in accordance with some embodiments of the present disclosure. FIG. 3B includes an inactive window 312, which continues to show the prospective recipient's profile data in the background while the sender is composing a message, and an active window 314, which allows the sender to compose a message to the prospective recipient while still viewing the prospective recipient's profile data in the background.

The active window 314 includes a search input mechanism 315, an address input mechanism 316, a subject input mechanism 318, and a message input mechanism 319. The search input mechanism 315 enables the sender to input one or more search criteria to search for a predefined message template. The address input mechanism 316 enables the sender to select or input the name or address of the prospective recipient. The subject input mechanism 318 enables the sender to input a subject for the message. The message input mechanism 319 enables the sender to input message content (e.g., the body of the message to the prospective recipient) by, for example, typing, copying and pasting, editing, or otherwise composing message content.

The active window 314 also includes a draft personalized message mechanism 317. The draft personalized message mechanism 317 enables the sender to utilize the generative message suggestion technologies described herein for assistance in composing a message. In the example of FIG. 3B, user selection of the draft personalized message mechanism 317 causes a transition from user interface 310 to user interface 330 shown in FIG. 3D.

Figure 3C:
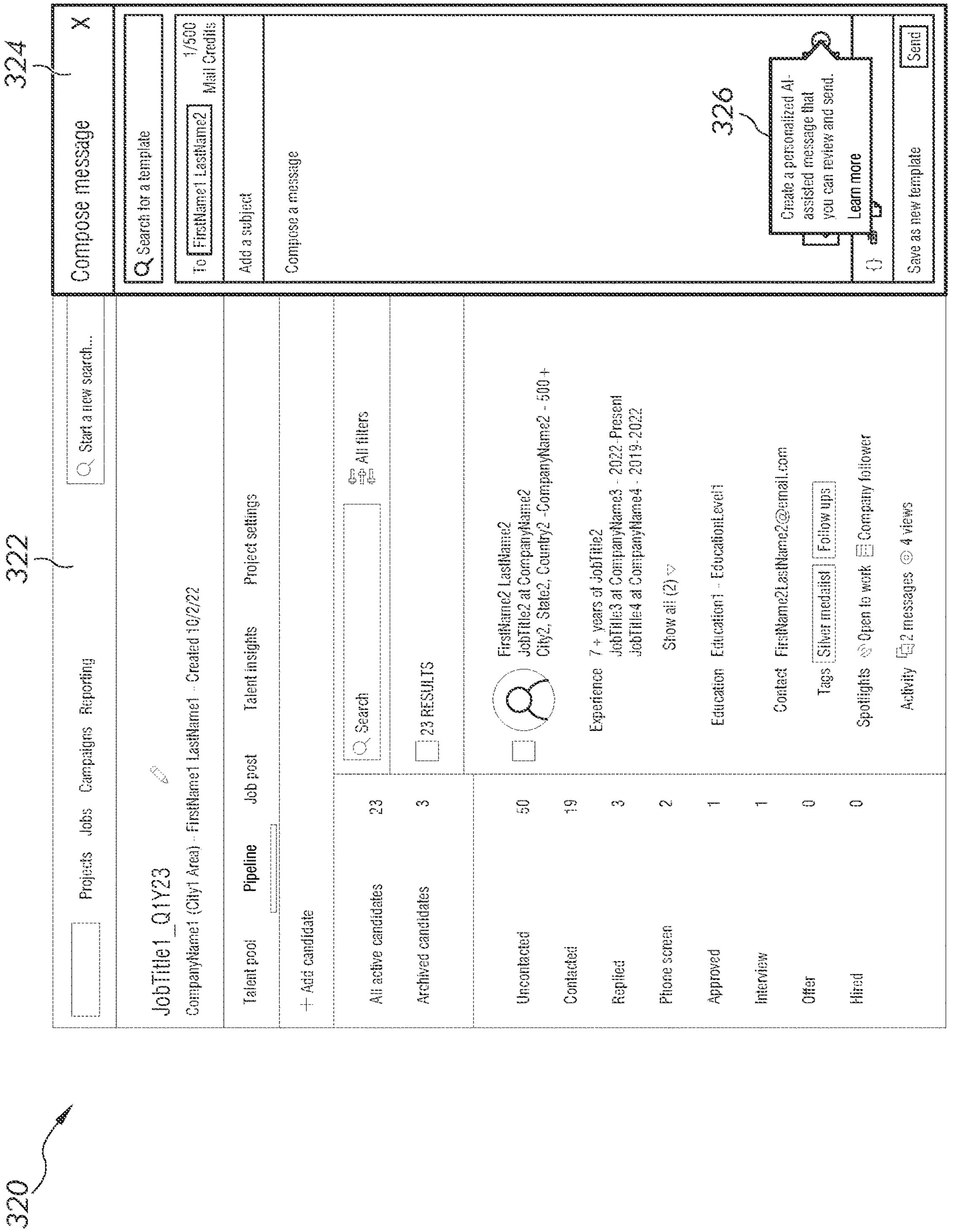

In FIG. 3C, a user interface 320 is shown. User interface 320 includes an inactive window 322, which continues to display the profile data for the sender's prospective recipient, and an active window 324. Selection of the "(i)" mechanism adjacent to the draft personalized message mechanism 317 in user interface 310 causes a transition from user interface 310 to user interface 320. In response to selection of the "(i)" mechanism in user interface 310, active window 324 displays a notification 326. Notification 326 informs the sender that selection of the draft personalized message mechanism 317 invokes artificial intelligence (AI)-based assistance with message creation.

Figure 3D:
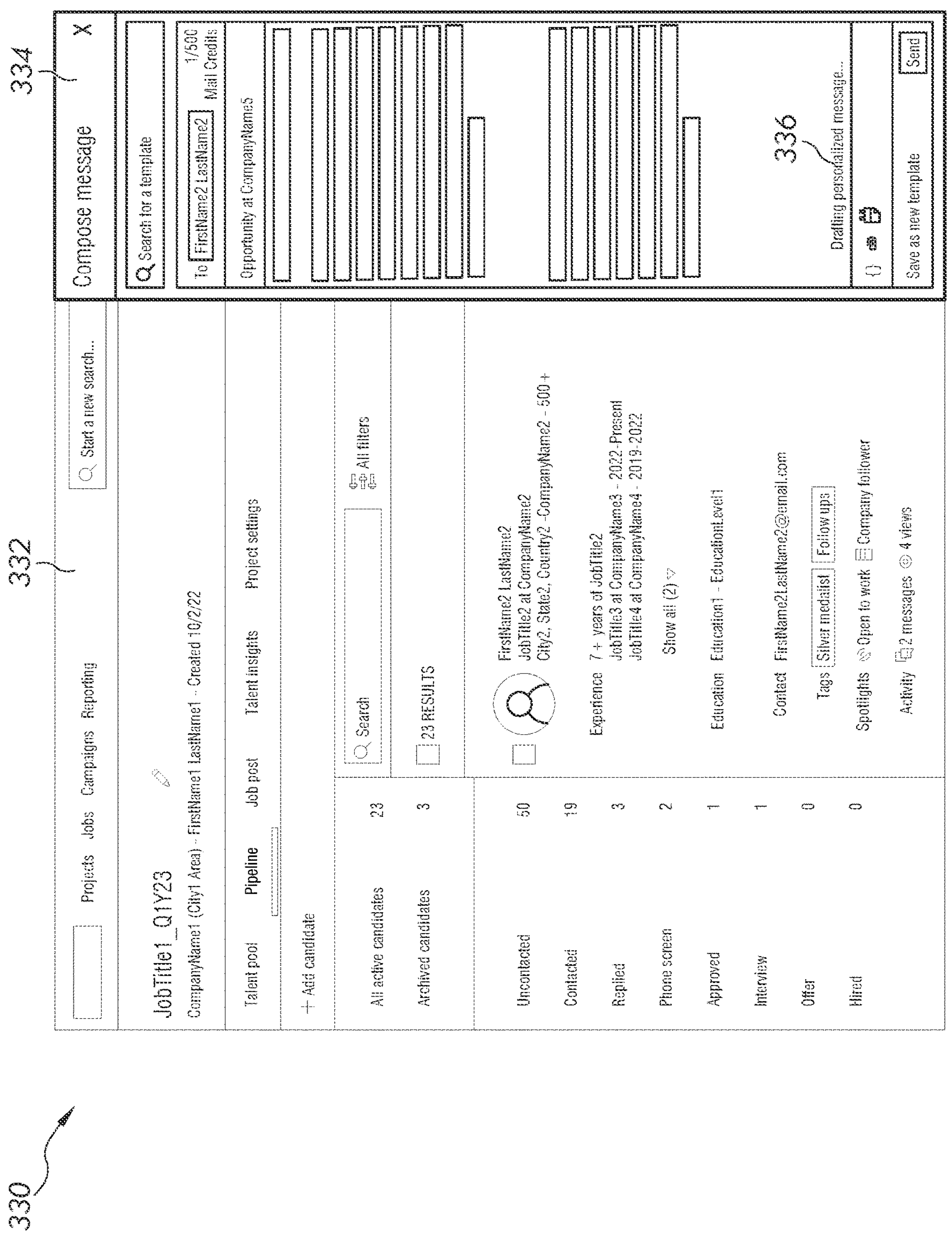

In FIG. 3D, user interface 330 is shown. User interface 330 includes an inactive window 332, which continues to display the profile data for the sender's prospective recipient, and an active window 334. In response to the user selection of the draft personalized message mechanism 317, the generative message suggestion system begins drafting a personalized message suggestion using the technologies described herein, and the active window 334 displays one or more indications that the generative message suggestion system has been invoked.

Figure 3E:
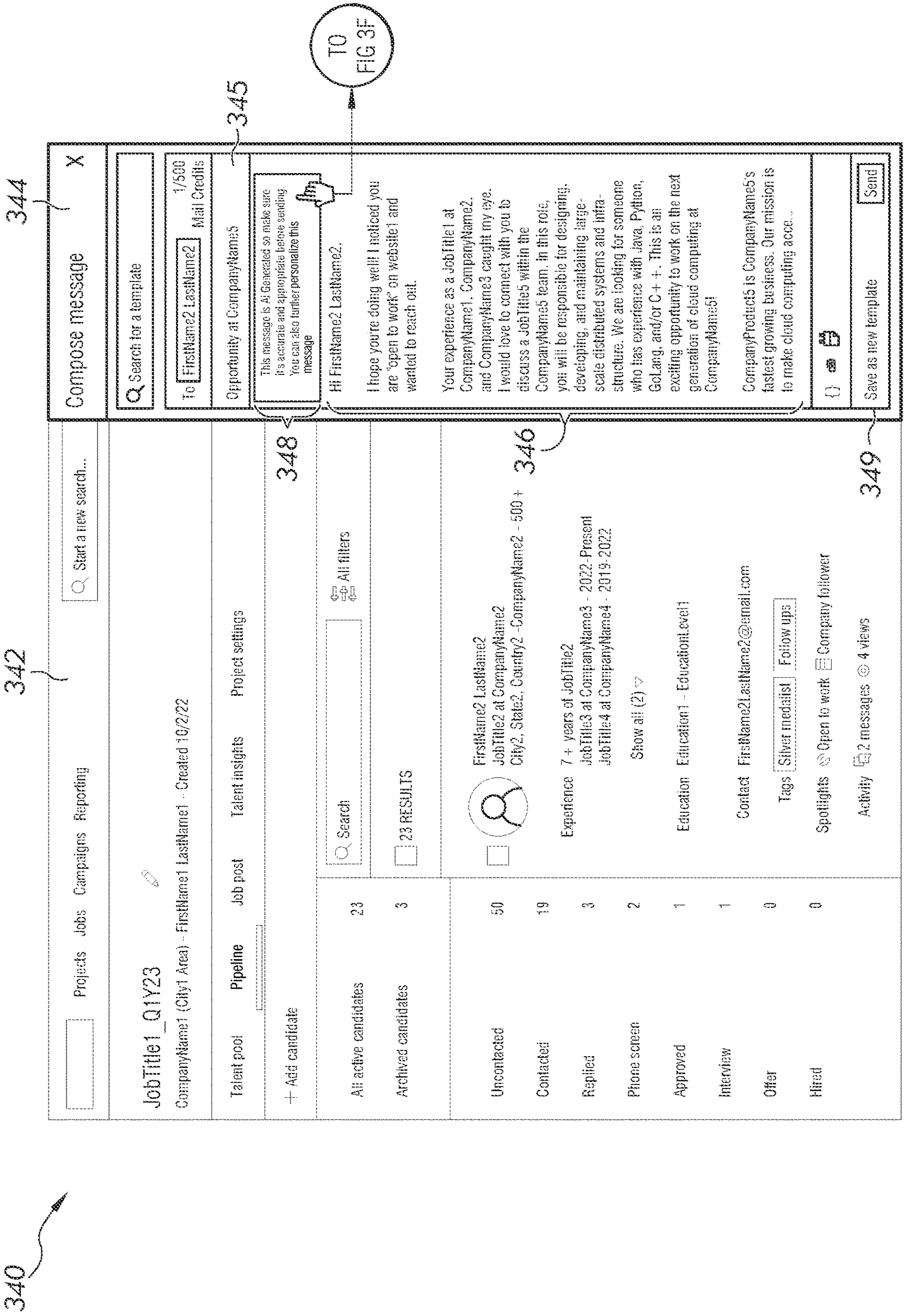

In FIG. 3E, a user interface 340 is shown. User interface 340 includes an inactive window 342, which continues to display the profile data for the sender's prospective recipient, and an active window 344. Active window 344 is populated in response to completion of a message suggestion generation by the generative message suggestion system in response to the user selection of the draft personalized message mechanism 317. Active window 344 includes a message header 345, an interactive notification 348, a message body 346, and a save mechanism 349.

In the example of FIG. 3E, message header 345 and message body 346 contain text that has been machine-generated by the generative message suggestion system using the technologies described herein. A generator model of the generative message suggestion system has generated and customized the message header 345 and the message body 346 based on the prospective recipient's profile data, the sender's profile data, and/or information about the subject of the message (e.g., a job opportunity) in addition to output of a scoring model of the generative message suggestion system including acceptance probability data.

The interactive notification 348 alerts the sender that the message header 345 and message body 346 contain AI-generated content. The interactive notification 348 includes a selectable element (e.g., "further personalize this message"). The save mechanism 349 enables the sender to store the message body 346 as a message template for future reuse.

Figure 3F:
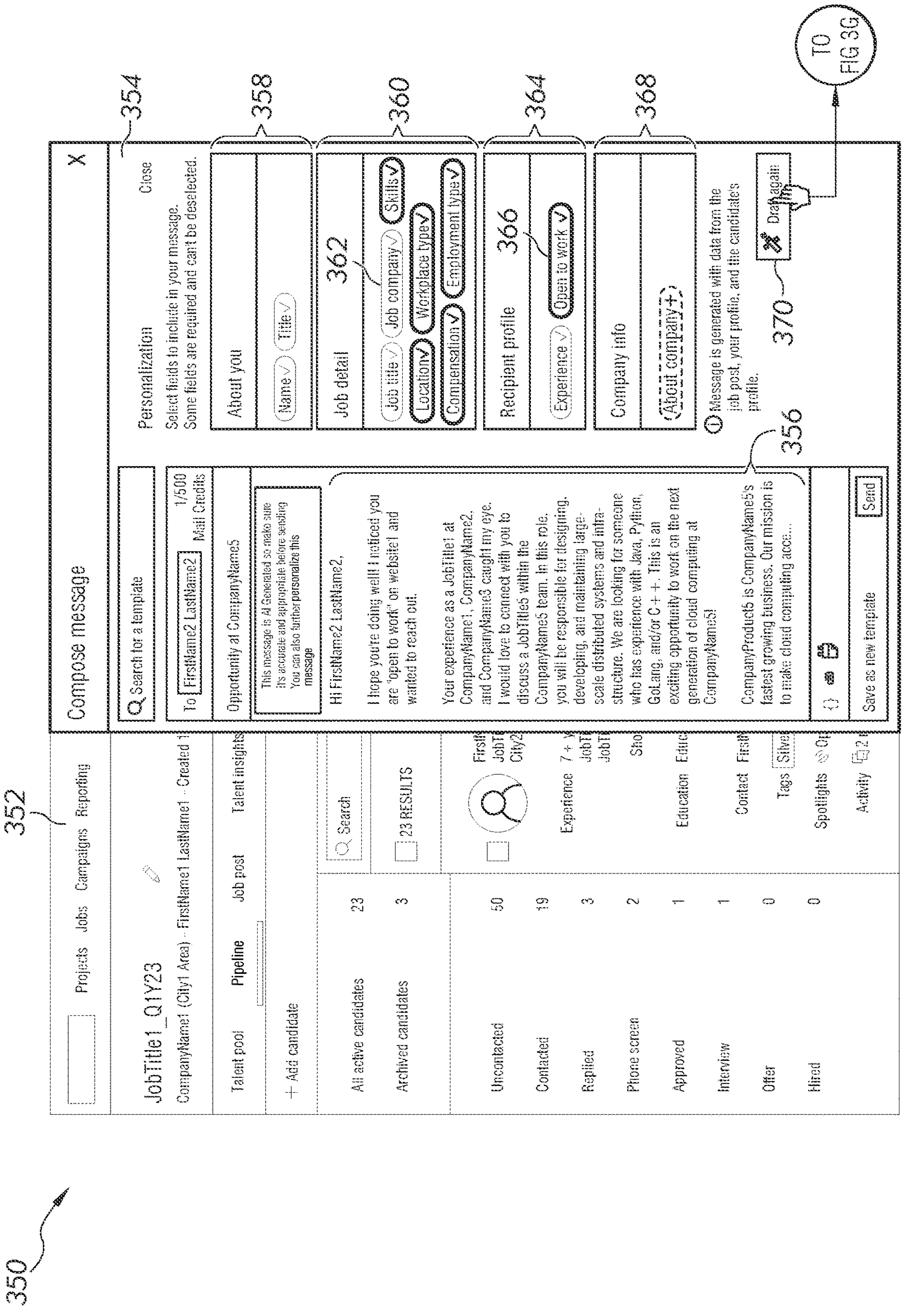

The selectable element of the interactive notification 348, if selected by the sender, causes a transition to user interface 350 of FIG. 3F. In the example of FIG. 3F, user interface 350 includes an inactive window 352, which continues to display the profile data for the sender's prospective recipient, and an active window 354. In response to user selection of the selectable element of the interactive notification 348, the active window 354 displays the previously generated message body 356, a number of further personalization suggestions 358, 360, 364, 368, and a draft again mechanism 370.

Further personalization suggestions 358 include suggested attributes related to the sender. These suggested attributes can be obtained, for example, by traversing an entity graph as described herein. In the example of FIG. 3F, the further personalization suggestions 358 are inactive because the generative message suggestion system requires these attributes for message generation and the sender is unable to unselect them.

Further personalization suggestions 360 include suggested attributes related to the subject of the message, e.g., job attributes. These suggested attributes can be obtained, for example, by traversing an entity graph as described herein. In the example of FIG. 3F, the further personalization suggestions 360 include some attributes, such as attribute 362, that are inactive because the generative message suggestion system requires these attributes for message generation and the sender is unable to unselect them. The further personalization suggestions 360 includes other attributes, such as skills, location, workplace type, compensation, and employment type, that are active such that the sender is able to select them for inclusion in a subsequent, further-personalized machine-generated message.

Further personalization suggestions 364 include suggested attributes related to the prospective recipient. These suggested attributes can be obtained, for example, by traversing an entity graph as described herein. In the example of FIG. 3F, the further personalization suggestions 364 include some attributes, such as the experience attribute, that are inactive because the generative message suggestion system requires these attributes for message generation and the sender is unable to unselect them. The further personalization suggestions 364 includes other attributes, such as open to work attribute 366, that are active such that the sender is able to select them for inclusion in a subsequent, further-personalized machine-generated message.

Further personalization suggestions 368 include suggested attributes related to an entity associated with the subject of the message, e.g., attributes related to the company that is hiring for the job described by the attribute 362. These suggested attributes can be obtained, for example, by traversing an entity graph as described herein. In the example of FIG. 3F, the further personalization suggestions 368 includes an attribute, such as the about company attribute, that is displayed in a selected mode because the attribute has been selected but is capable of being unselected by the sender. For example, the about company attribute has a toggle capability such that it can be alternately selected or unselected by the sender. Currently unselected attributes, such as attribute 366, can be implemented with a toggle capability in a similar manner.

Figure 3G:
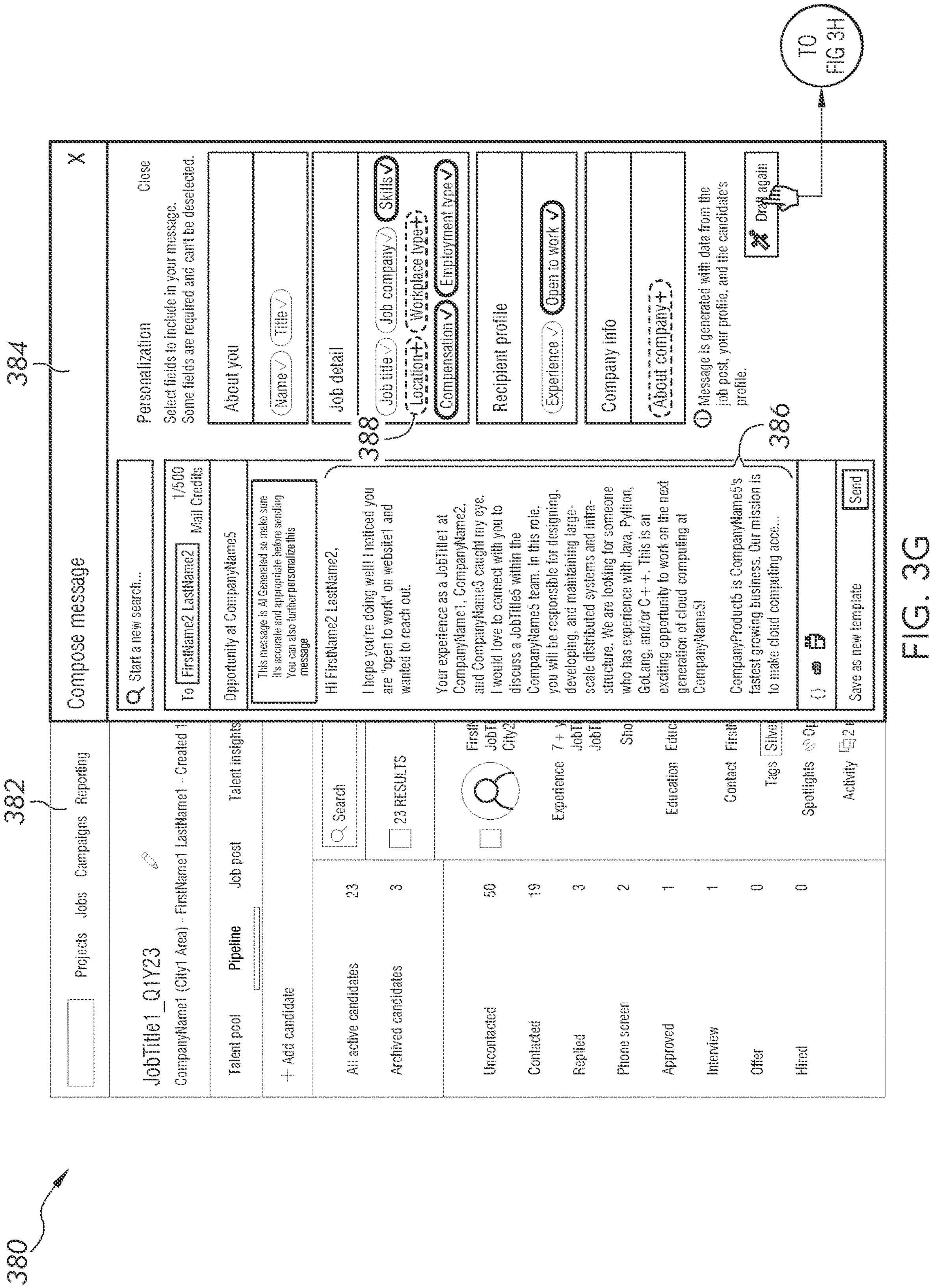

In FIG. 3F, user selection of the draft again mechanism 370 causes a transition to user interface 380 of FIG. 3G. In FIG. 3G, user interface 380 includes an inactive window 382, which continues to display the profile data for the sender's prospective recipient, and an active window 384. In the active window 384, the previously machine-generated message 386 is still displayed, but the active window 384 is updated to show the sender's revised attribute selections for further personalization. For example, the location attribute 388 is displayed as selected in the active window 384 whereas the same attribute was displayed as unselected in FIG. 3F.

Figure 3H:
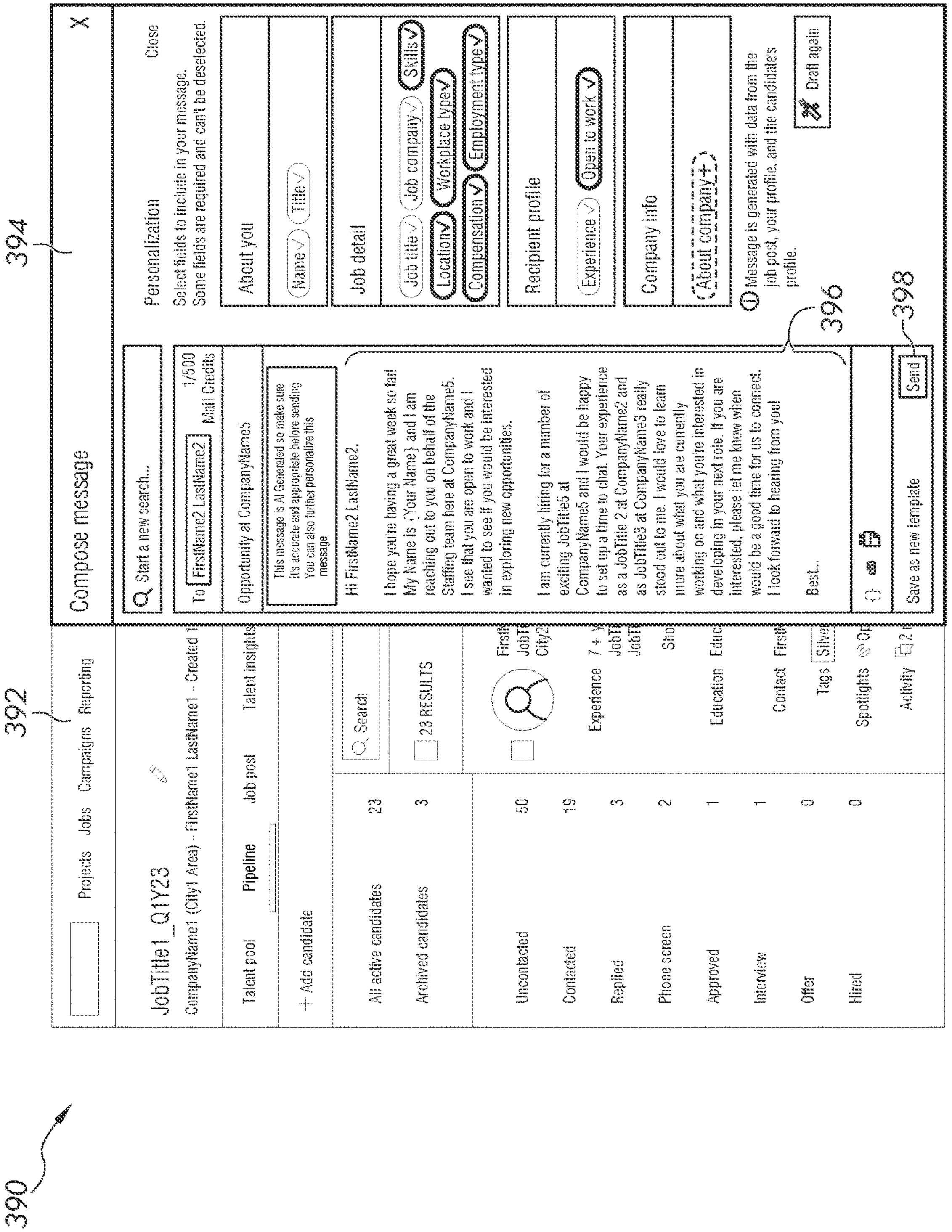

In FIG. 3G, user selection of the draft again mechanism causes a transition to user interface 390 of FIG. 3H. In FIG. 3H, user interface 390 includes an inactive window 392, which continues to display the profile data for the sender's prospective recipient, and an active window 394. In the active window 394, a machine-generated redrafted version of the message body 396 is displayed along with the status of the further personalization attribute options. In the example of FIG. 3G, the opening paragraph of the message has been revised (e.g., reworded or rephrased) by the generative message suggestion system using the technologies described herein to, for example, include more personalized information about the sender as an introduction. Additionally, the second paragraph has been revised by the generative message suggestion system using the technologies described herein. For example, the message body 396 has been redrafted according to a message tone, style and structure (e.g., based on the input context) preferred by the sender.

The examples shown in FIG. 3A, FIG. 3B, FIG. 3C, FIG. 3D, FIG. 3E, FIG. 3F, FIG. 3G, FIG. 3H, and the accompanying description, above, are provided for illustration purposes. For example, while the examples are illustrated as user interface screens for a larger form factor such as a desktop or laptop device, the user interfaces can be configured for other forms of electronic devices, such as smart phones, tablet computers, and wearable devices. This disclosure is not limited to the described examples. Additional or alternative details and implementations are described herein.

Figure 4:
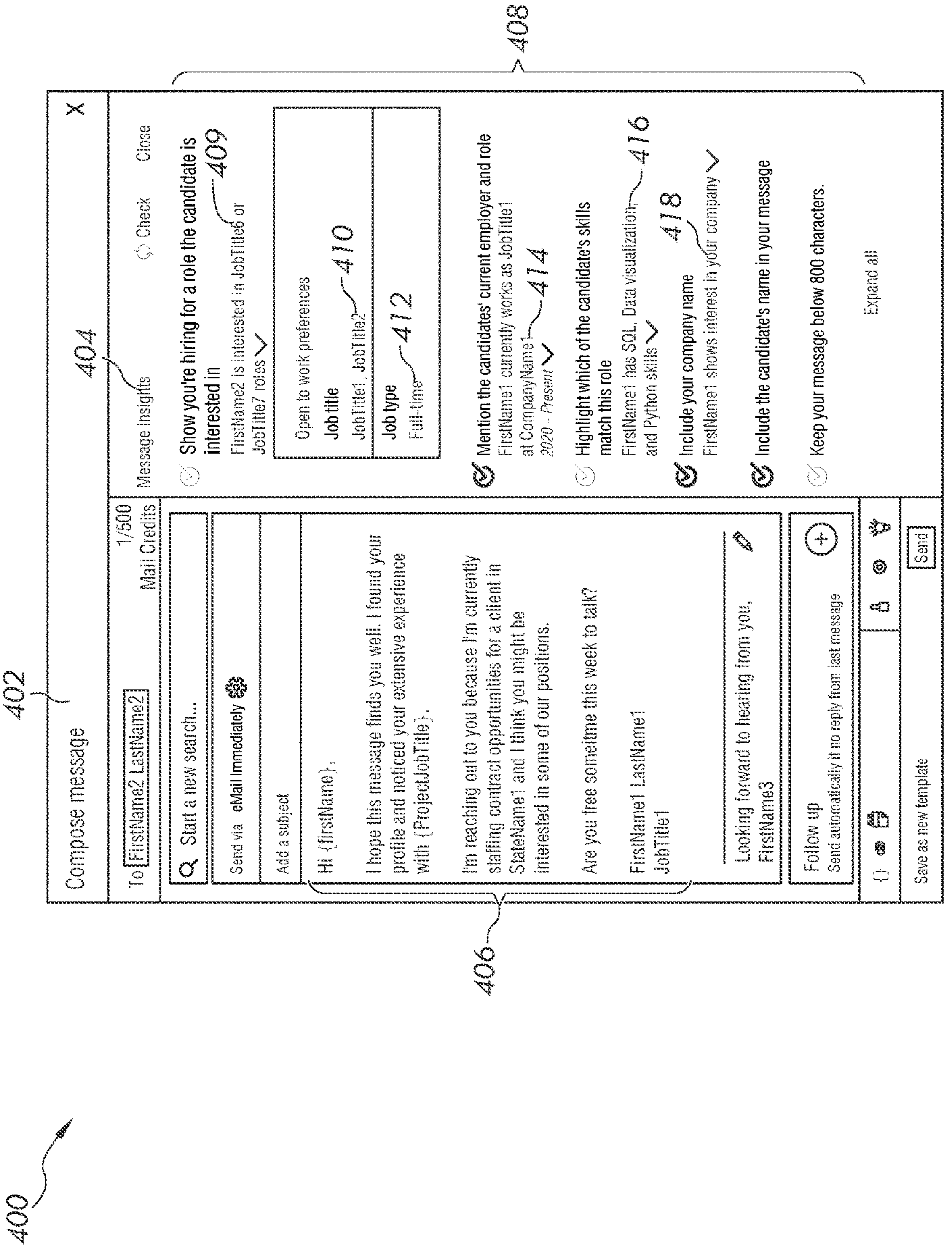
FIG. 4 illustrates an example of a screen capture of a user interface screen configured to compose a message based on at least one AI-generated message suggestion in accordance with some embodiments of the present disclosure.

FIG. 4 illustrates an example of a screen capture of a user interface screen configured to compose a message based on at least one AI-generated message suggestion in accordance with some embodiments of the present disclosure.

In FIG. 4, user interface 400 shows an example of a compose message window 402. The compose message window 402 includes a sample message 406 (e.g., a message template) and message insights panel 404. The message insights panel 404 includes a number of customized message suggestions 408 that have been machine-generated by a generative message suggestion system using the technologies described herein. For example, the message suggestions 408 include insights 409, 410, 412, 414, 416, 418. As an example, insight 409 is personalized to the prospective recipient based on the prospective recipient's recent activity data in the application software system (e.g., activities such as recent job searches). Similarly, insights 410, 412, 414, 416 are personalized to the prospective recipient based on the prospective recipient's profile data (e.g., current profile data and/or recent profile updates). Insight 418 is personalized to the prospective recipient based on the prospective recipient's recent activity data in the application software system (e.g., activities such as recent views of the company's profile page, follows of company employees, and/or likes of posts by company employees or posts about the company).

The examples shown in FIG. 4 and the accompanying description, above are provided for illustration purposes. For example, while the examples are illustrated as user interface screens for a larger form factor such as a desktop or laptop device, the user interface can be configured for other forms of electronic devices, such as smart phones, tablet computers, and wearable devices. This disclosure is not limited to the described examples. Additional or alternative details and implementations are described herein.

Figure 5:
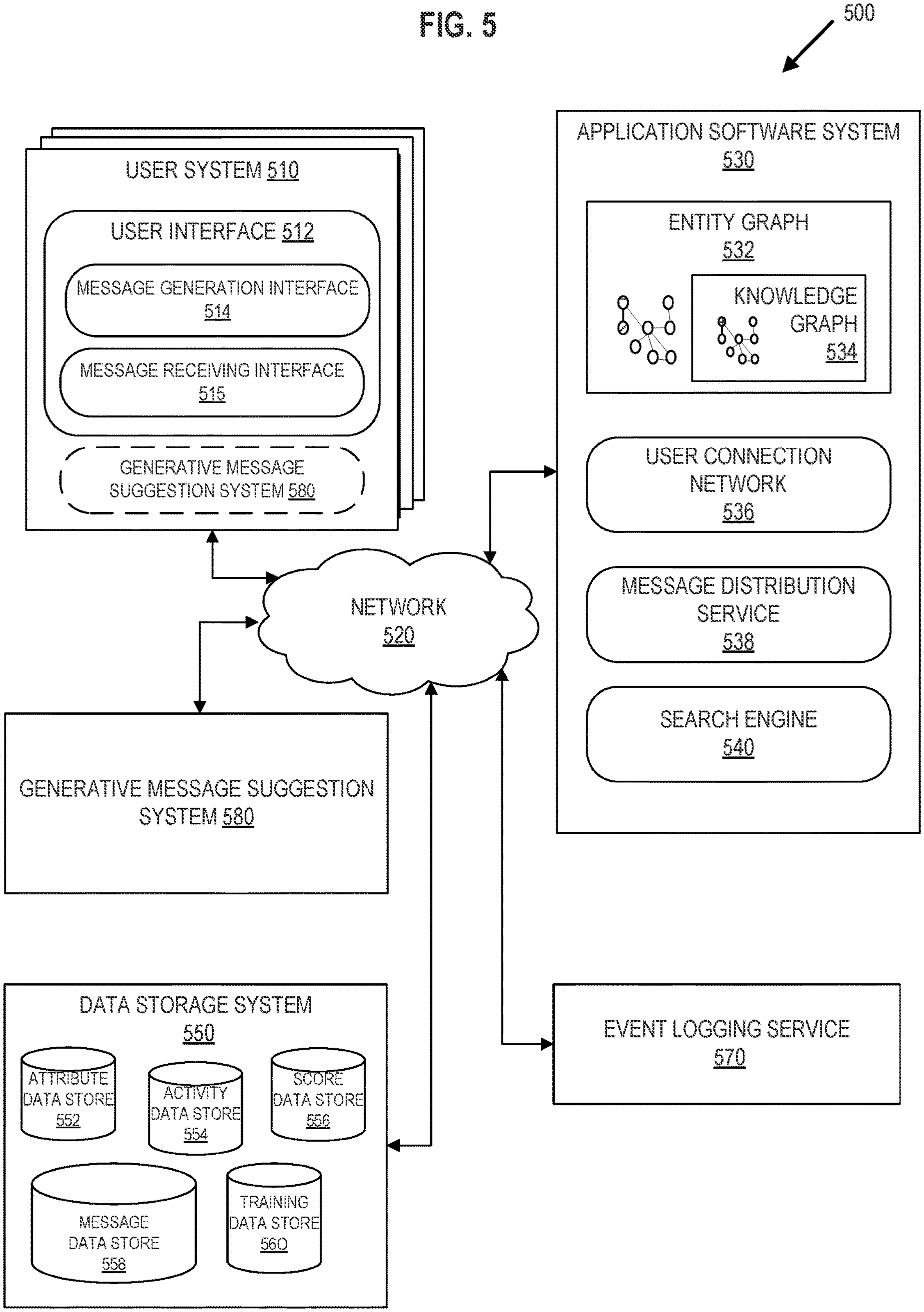
FIG. 5 is a block diagram of a computing system that includes a generative message suggestion system in accordance with some embodiments of the present disclosure.

FIG. 5 is a block diagram of a computing system that includes a generative message suggestion system in accordance with some embodiments of the present disclosure.

In the embodiment of FIG. 5, a computing system 500 includes one or more user systems 510, a network 520, an application software system 530, a generative message suggestion system 580, a data storage system 550, and an event logging service 570. All or at least some components of generative message suggestion system 580 are implemented at the user system 510, in some implementations. For example, either or both of message generation interface 514 and message receiving interface 515 as well as generative message suggestion system 580 are implemented directly upon a single client device such that communications between message generation interface 514 and/or message receiving interface 515 and generative message suggestion system 580 occur on-device without the need to communicate with, e.g., one or more servers over the Internet. Dashed lines are used in FIG. 5 to indicate that all or portions of generative message suggestion system 580 can be implemented directly on the user system 510, e.g., the user's client device. In other words, both user system 510 and generative message suggestion system 580 can be implemented on the same computing device.

Components of the computing system 500 including the generative message suggestion system 580 are described in more detail below.

A user system 510 includes at least one computing device, such as a personal computing device, a server, a mobile computing device, or a smart appliance, and at least one software application that the at least one computing device is capable of executing, such as an operating system or a front end of an online system. Many different user systems 510 can be connected to network 520 at the same time or at different times. Different user systems 510 can contain similar components as described in connection with the illustrated user system 510. For example, many different end users of computing system 500 can be interacting with many different instances of application software system 530 through their respective user systems 510, at the same time or at different times.

User system 510 includes a user interface 512. User interface 512 is installed on or accessible to user system 510 by network 520. Embodiments of user interface 512 include a message generation interface 514 and/or message receiving interface 515. Message generation interface 514 enables sender users of application software system 530 to create, edit, and send messages to other users, to view and process message suggestions, and to perform other interactions with application software system 530 associated with the creation, sending, and processing of messages created and sent between or among users. Message receiving interface 515 enables prospective recipients and recipients of messages sent by sender users of application software system 530 to receive, accept, reject, ignore, view, read, respond to, and process those messages, and to perform other interactions with application software system 530 associated with the receiving, viewing, reading, responding to, and processing of messages created and sent between or among users. Message generation interface 514 and message receiving interface 515 are part of the same interface, e.g., a messaging interface that enables the creation, sending, and receiving of messages, in some implementations. For example, messaging generation interface 514 and message receiving interface 515 are part of a front end of a messaging system portion of application software system 530, in some implementations.

Message generation interface 514 and message receiving interface 515 each include, for example, a graphical display screen that includes graphical user interface elements such as at least one input box or other input mechanism and at least one slot. A slot as used herein refers to a space on a graphical display such as a web page or mobile device screen, into which digital content such as message suggestions and messages can be loaded for display to the user. The locations and dimensions of a particular graphical user interface element on a screen are specified using, for example, a markup language such as HTML (Hypertext Markup Language). On a typical display screen, a graphical user interface element is defined by two-dimensional coordinates. In other implementations such as virtual reality or augmented reality implementations, a slot may be defined using a three-dimensional coordinate system. Examples of user interface screens that can be included in message generation interface 514 and/or message receiving interface 515 are shown in the screen capture figures shown in the drawings and described herein.

User interface 512 can be used to input data, create, edit, send, view, receive and process messages. In some implementations, user interface 512 enables the user to upload, download, receive, send, or share of other types of digital content items, including posts, articles, comments, and shares, to initiate user interface events, and to view or otherwise perceive output such as data and/or digital content produced by application software system 530, generative message suggestion system 580, and/or message distribution service 538. For example, user interface 512 can include a graphical user interface (GUI), a conversational voice/speech interface, a virtual reality, augmented reality, or mixed reality interface, and/or a haptic interface. User interface 512 includes a mechanism for logging in to application software system 530, clicking or tapping on GUI user input control elements, and interacting with message generation interface 514 and digital content items such as messages and machine-generated message suggestions. Examples of user interface 512 include web browsers, command line interfaces, and mobile app front ends. User interface 512 as used herein can include application programming interfaces (APIs).

In the example of FIG. 5, user interface 512 includes message generation interface 514 and message receiving interface 515. Message generation interface 514 and message receiving interface 515 each include a front end user interface component of generative message suggestion system 580, application software system 530, or a messaging component of application software system 530. Message generation interface 514 and message receiving interface 515 are shown as components of user interface 512 for ease of discussion, but access to message generation interface 514 and/or message receiving interface 515 each can be limited to specific user systems 510. For example, in some implementations, access to message generation interface 514 and message receiving interface 515 is limited to registered users of generative message suggestion system 580 or application software system 530 or to users who have been designated as message senders by the generative message suggestion system 580 or application software system 530.

Network 520 includes an electronic communications network. Network 520 can be implemented on any medium or mechanism that provides for the exchange of digital data, signals, and/or instructions between the various components of computing system 500. Examples of network 520 include, without limitation, a Local Area Network (LAN), a Wide Area Network (WAN), an Ethernet network or the Internet, or at least one terrestrial, satellite or wireless link, or a combination of any number of different networks and/or communication links.

Application software system 530 includes any type of application software system that provides or enables the creation, upload, and/or distribution of at least one form of digital content, including machine-generated message suggestions and messages, between or among user systems, such as user system 510, through user interface 512. In some implementations, portions of generative message suggestion system 580 are components of application software system 530. Components of application software system 530 can include an entity graph 532 and/or knowledge graph 534, a user connection network 536, a message distribution service 538, and a search engine 540.

In the example of FIG. 5, application software system 530 includes an entity graph 532 and/or a knowledge graph 534. Entity graph 532 and/or knowledge graph 534 include data organized according to graph-based data structures that can be traversed via queries and/or indexes to determine relationships between entities. An example of an entity graph is shown in FIG. 6, described herein. For example, as described in more detail with reference to FIG. 6, entity graph 532 and/or knowledge graph 534 can be used to compute various types of affinity scores, similarity measurements, and/or statistics between, among, or relating to entities.

Entity graph 532, 512 includes a graph-based representation of data stored in data storage system 550, described herein. For example, entity graph 532, 512 represents entities, such as users, organizations, and content items, such as posts, articles, comments, and shares, as nodes of a graph. Entity graph 532, 512 represents relationships, also referred to as mappings or links, between or among entities as edges, or combinations of edges, between the nodes of the graph. In some implementations, mappings between different pieces of data used by application software system 530 are represented by one or more entity graphs. In some implementations, the edges, mappings, or links indicate online interactions or activities relating to the entities connected by the edges, mappings, or links. For example, if a prospective recipient accepts a message from a sender, an edge may be created connecting the sender entity with the recipient entity in the entity graph, where the edge may be tagged with a label such as "message accepted."

Portions of entity graph 532, 512 can be automatically re-generated or updated from time to time based on changes and updates to the stored data, e.g., updates to entity data and/or activity data. Also, entity graph 532, 512 can refer to an entire system-wide entity graph or to only a portion of a system-wide graph. For instance, entity graph 532, 512 can refer to a subset of a system-wide graph, where the subset pertains to a particular user or group of users of application software system 530.

In some implementations, knowledge graph 534 is a subset or a superset of entity graph 532. For example, in some implementations, knowledge graph 534 includes multiple different entity graphs 532 that are joined by edges. For instance, knowledge graph 534 can join entity graphs 532 that have been created across multiple different databases or across different software products. In some implementations, the entity nodes of the knowledge graph 534 represent concepts, such as product surfaces, verticals, or application domains. In some implementations, knowledge graph 534 includes a platform that extracts and stores different concepts that can be used to establish links between data across multiple different software applications. Examples of concepts include topics, industries, and skills. The knowledge graph 534 can be used to generate and export content and entity-level embeddings that can be used to discover or infer new interrelationships between entities and/or concepts, which then can be used to identify related entities. As with other portions of entity graph 532, knowledge graph 534 can be used to compute various types of affinity scores, similarity measurements, and/or statistical correlations between or among entities and/or concepts.

Knowledge graph 534 includes a graph-based representation of data stored in data storage system 550, described herein. Knowledge graph 534 represents relationships, also referred to as links or mappings, between entities or concepts as edges, or combinations of edges, between the nodes of the graph. In some implementations, mappings between different pieces of data used by application software system 530 or across multiple different application software systems are represented by the knowledge graph 534.

User connection network 536 includes, for instance, a social network service, professional social network software and/or other social graph-based applications. Message distribution service 538 includes, for example, a messaging system, such as a peer-to-peer messaging system that enables the creation and public or non-public exchange of messages or among users of application software system 530. Search engine 540 includes a search engine that enables users of application software system 530 to input and execute search queries on user connection network 536 and/or entity graph 532, knowledge graph 534. Application software system 530 can include online systems that provide social network services, general-purpose search engines, specific-purpose search engines, messaging systems, content distribution platforms, e-commerce software, enterprise software, or any combination of any of the foregoing or other types of software.

A front end portion of application software system 530 can operate in user system 510, for example as a plugin or widget in a graphical user interface of a web application, mobile software application, or as a web browser executing user interface 512. In an embodiment, a mobile app or a web browser of a user system 510 can transmit a network communication such as an HTTP request over network 520 in response to user input that is received through a user interface provided by the web application, mobile app, or web browser, such as user interface 512. A server running application software system 530 can receive the input from the web application, mobile app, or browser executing user interface 512, perform at least one operation using the input, and return output to the user interface 512 using a network communication such as an HTTP response, which the web application, mobile app, or browser receives and processes at the user system 510.

In the example of FIG. 6, application software system 530 includes a message distribution service 538. The message distribution service 538 can include a data storage service, such as a web server, which stores messages and/or message suggestions generated by generative message suggestion system 580, and transmits messages that have been created based on message suggestions generated by generative message suggestion system 580 from the message creators/senders to the prospective recipients using network 520.

In some embodiments, message distribution service 538 processes requests from, for example, application software system 530, and distributes messages and message suggestions generated by generative message suggestion system 580, to user systems 510 in response to requests. A request includes, for example, a network message such as an HTTP (HyperText Transfer Protocol) request for a transfer of data from an application front end to the application's back end, or from the application's back end to the front end, or, more generally, a request for a transfer of data between two different devices or systems, such as data transfers between servers and user systems. A request is formulated, e.g., by a browser or mobile app at a user device, in connection with a user interface event such as a login, click on a graphical user interface element, or a page load. In some implementations, message distribution service 538 is part of application software system 530 or generative message suggestion system 580. In other implementations, message distribution service 538 interfaces with application software system 530 and/or generative message suggestion system 580, for example, via one or more application programming interfaces (APIs).

In the example of FIG. 6, application software system 530 includes a search engine 540. Search engine 540 is a software system designed to search for and retrieve information by executing queries on data stores, such as databases, connection networks, and/or graphs. The queries are designed to find information that matches specified criteria, such as keywords and phrases. For example, search engine 540 is used to retrieve data by executing queries on various data stores of data storage system 550 or by traversing entity graph 532, 534.

The generative message suggestion system 580 auto-generates user-specific and/or group-specific message suggestions, using one or more machine learning models, based on input received via message generation interface 514 and/or other data sources. In some implementations, generative message suggestion system 580 generates message suggestions based on various forms of input data, including user-selected and/or machine-suggested attribute data, and formulates one or more user-specific model inputs for a generator model based on the input data. The generator model outputs one or more message suggestions based on the one or more model inputs. The generative message suggestion system 580 sends one or more of the machine-generated message suggestions to message generation interface 514 for display to the message sender user. Additional or alternative features and functionality of generative message suggestion systems described herein are included in generative message suggestion system 580 in various embodiments.

Event logging service 570 captures and records network activity data generated during operation of application software system 530, including user interface events generated at user systems 510 via user interface 512, in real time, and formulates the user interface events into a data stream that can be consumed by, for example, a stream processing system. Examples of network activity data include page loads, clicks on messages or graphical user interface control elements, the creation, editing, sending, and viewing of messages, and social action data such as likes, shares, comments, and social reactions (e.g., "insightful," "curious," etc.). For instance, when a user of application software system 530 via a user system 510 clicks on a user interface element, such as a message, a link, or a user interface control element such as a view, comment, share, or reaction button, or uploads a file, or creates a message, loads a web page, or scrolls through a feed, etc., event logging service 570 fires an event to capture an identifier, such as a session identifier, an event type, a date/timestamp at which the user interface event occurred, and possibly other information about the user interface event, such as the impression portal and/or the impression channel involved in the user interface event. Examples of impression portals and channels include, for example, device types, operating systems, and software platforms, e.g., web or mobile.

For instance, when a sender user creates a message based on a message suggestion generated by generative message suggestion system 580, or reacts to a received message, event logging service 570 stores the corresponding event data in a log. Event logging service 570 generates a data stream that includes a record of real-time event data for each user interface event that has occurred. Event data logged by event logging service 570 can be pre-processed and anonymized as needed so that it can be used, for example, to generate affinity scores, similarity measurements, and/or to formulate training data for artificial intelligence models.

Data storage system 550 includes data stores and/or data services that store digital data received, used, manipulated, and produced by application software system 530 and/or generative message suggestion system 580, including message suggestions, messages, message metadata, attribute data, activity data, machine learning model training data, machine learning model parameters, and machine learning model inputs and outputs, such as machine-generated content and machine-generated score data.

In the example of FIG. 5, data storage system 550 includes an attribute data store 552, an activity data store 554, a score data store 556, a message data store 558, and a training data store 560. Attribute data store 552 stores data relating to users, and other entities, such as profile data, which are used by the generative message suggestion system 580 to, for example, generate message suggestions and/or compute statistics, similarity measurements, or scores. Activity data store 554 stores data relating to network activity, e.g., user interface event data extracted from application software system 530 by event logging service 570, which are used by the generative message suggestion system 580 to, for example, generate message suggestions and/or compute statistics, similarity measurements, or scores.

Score data store 556 stores scores generated and output by a scoring model of generative message suggestion system 580 and related metadata, which can used by a generator model of generative message suggestion system 580 to generate message suggestions or to tune the generator model. Message data store 558 stores messages and/or machine-generated message suggestions generated by the generator model of generative message suggestion system 580, related metadata, and related data, such as human-edited versions of machine-generated message suggestions. Training data store 560 stores data that can be used by or generated by a training data formulator of generative message suggestion system 580, which can be used to train or tune the generator model and/or the scoring model of the generative message suggestion system 580. For instance, portions of training data store 560 can include pre-send feedback data and/or post-send feedback data.

In some embodiments, data storage system 550 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine. Data stores of data storage system 550 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 550 resides on at least one persistent and/or volatile storage device that can reside within the same local network as at least one other device of computing system 500 and/or in a network that is remote relative to at least one other device of computing system 500. Thus, although depicted as being included in computing system 500, portions of data storage system 550 can be part of computing system 500 or accessed by computing system 500 over a network, such as network 520.

While not specifically shown, it should be understood that any of user system 510, application software system 530, generative message suggestion system 580, data storage system 550, and event logging service 570 includes an interface embodied as computer programming code stored in computer memory that when executed causes a computing device to enable bidirectional communication with any other of user system 510, application software system 530, generative message suggestion system 580, data storage system 550, or event logging service 570 using a communicative coupling mechanism. Examples of communicative coupling mechanisms include network interfaces, inter-process communication (IPC) interfaces and application program interfaces (APIs).

Each of user system 510, application software system 530, generative message suggestion system 580, data storage system 550, and event logging service 570 is implemented using at least one computing device that is communicatively coupled to electronic communications network 520. Any of user system 510, application software system 530, generative message suggestion system 580, data storage system 550, and event logging service 570 can be bidirectionally communicatively coupled by network 520. User system 510 as well as other different user systems (not shown) can be bidirectionally communicatively coupled to application software system 530 and/or generative message suggestion system 580.

A typical user of user system 510 can be an administrator or end user of application software system 530 or generative message suggestion system 580. User system 510 is configured to communicate bidirectionally with any of application software system 530, generative message suggestion system 580, data storage system 550, and event logging service 570 over network 520.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 510, application software system 530, generative message suggestion system 580, data storage system 550, and event logging service 570 are implemented using computer software, hardware, or software and hardware, and can include combinations of automated functionality, data structures, and digital data, which are represented schematically in the figures. User system 510, application software system 530, generative message suggestion system 580, data storage system 550, and event logging service 570 are shown as separate elements in FIG. 5 for ease of discussion but, except as otherwise described, the illustration is not meant to imply that separation of these elements is required. The illustrated systems, services, and data stores (or their functionality) of each of user system 510, application software system 530, generative message suggestion system 580, data storage system 550, and event logging service 570 can be divided over any number of physical systems, including a single physical computer system, and can communicate with each other in any appropriate manner.

Figure 13:
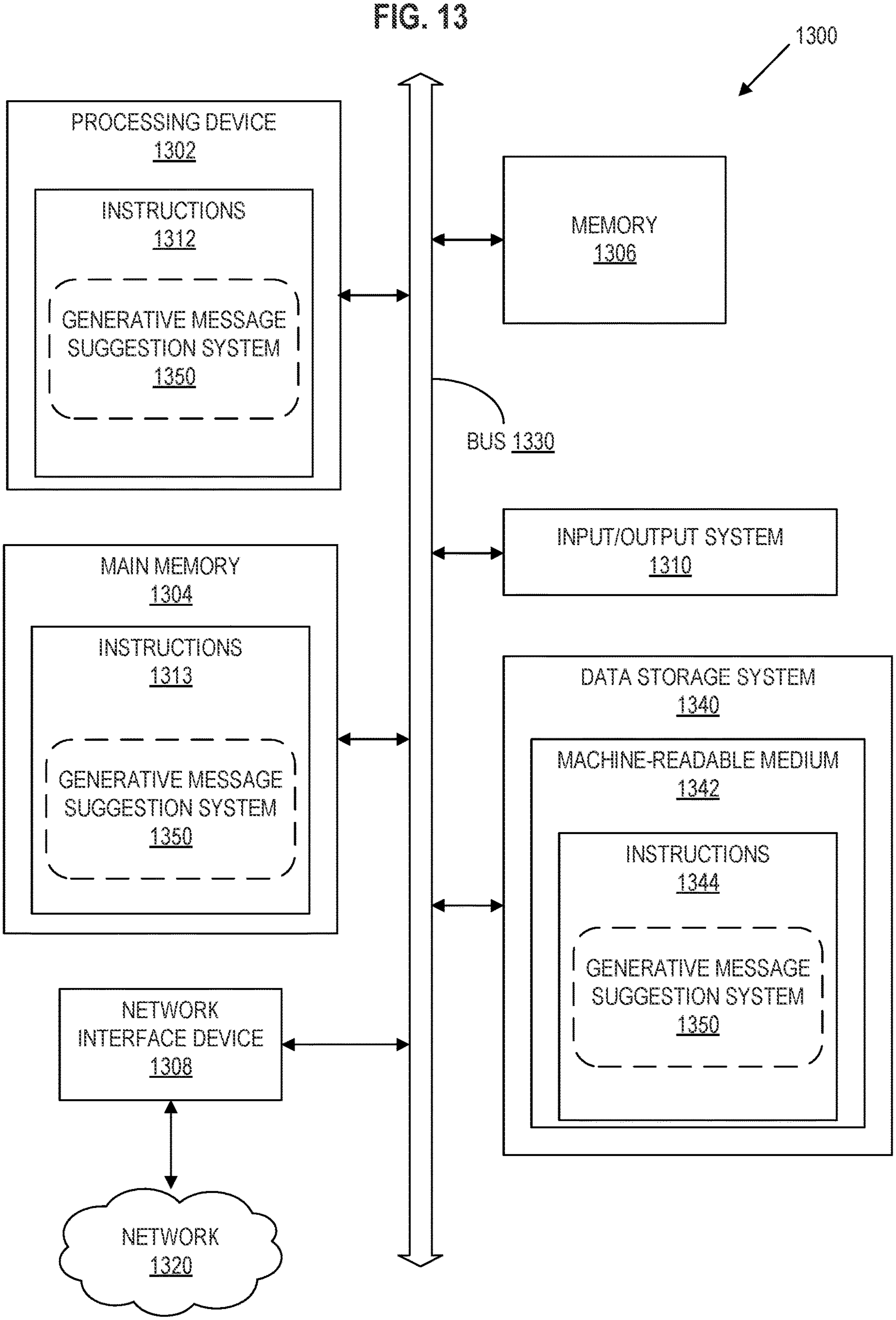
FIG. 13 is a block diagram of an example computer system including components of a generative message suggestion system in accordance with some embodiments of the present disclosure.

In FIG. 13, portions of message generation interface 514, message receiving interface 515, and generative message suggestion system 580 are collectively represented as generative message suggestion system 1350 for ease of discussion only. Message generation interface 514, message receiving interface 515, and generative message suggestion system 580 are not required to be implemented all on the same computing device, in the same memory, or loaded into the same memory at the same time. For example, access to any of message generation interface 514, message receiving interface 515, and generative message suggestion system 580 can be limited to different, mutually exclusive sets of user systems. For example, in some implementations, a separate, personalized version of generative message suggestion system 580 (such as user-specific versions of the generator model and scoring mode), is created for each user of the generative message suggestion system 580 such that data is not shared between or among the separate, personalized versions of the system. Additionally, while message generation interface 514 and message receiving interface 515 typically may be implemented on user systems, generative message suggestion system 580 typically may be implemented on a server computer or group of servers. Further details with regard to the operations of generative message suggestion system 1350 are described herein.

FIG. 6 is an example of an entity graph in accordance with some embodiments of the present disclosure. The entity graph 600 can be used by an application software system, e.g., to support a user connection network, in accordance with some embodiments of the present disclosure. The entity graph 600 can be used (e.g., queried or traversed) to obtain or generate input data, which are used to formulate model input for a generator model and/or a scoring model of a generative message suggestion system.

An entity graph includes nodes, edges, and data (such as labels, weights, or scores) associated with nodes and/or edges. Nodes can be weighted based on, for example, edge counts or other types of computations, and edges can be weighted based on, for example, affinities, relationships, activities, similarities, or commonalities between the nodes connected by the edges, such as common attribute values (e.g., two users have the same job title or employer, or two users are n-degree connections in a user connection network).

A graphing mechanism is used to create, update and maintain the entity graph. In some implementations, the graphing mechanism is a component of the database architecture used to implement the entity graph 600. For instance, the graphing mechanism can be a component of data storage system 550 and/or application software system 530, shown in FIG. 5, and the entity graphs created by the graphing mechanism can be stored in one or more data stores of data storage system 550.

The entity graph 600 is dynamic (e.g., continuously updated) in that it is updated in response to occurrences of interactions between entities in an online system (e.g., a user connection network) and/or computations of new relationships between or among nodes of the graph. These updates are accomplished by real-time data ingestion and storage technologies, or by offline data extraction, computation, and storage technologies, or a combination of real-time and offline technologies. For example, the entity graph 600 is updated in response to user updates of user profiles, user connections with other users, and user creations of new content items, such as messages, posts, articles, comments, and shares. As another example, the entity graph 600 is updated as new computations are computed, for example, as new relationships between nodes are inferred based on statistical correlations or machine learning model output.

The entity graph 600 includes a knowledge graph that contains cross-application links. For example, message activity data obtained from a messaging system can be linked with entities of the entity graph.

In the example of FIG. 6, entity graph 600 includes entity nodes, which represent entities, such as content item nodes (e.g., Post U21, Article 1), user nodes (e.g., User 1, User 2, User 3, User 4), and job nodes (e.g., Job 1, Job 2). Entity graph 600 also includes attribute nodes, which represent attributes (e.g., profile data, topic data) of entities. Examples of attribute nodes include title nodes (e.g., Title U1, Title A1), company nodes (e.g., Company 1), topic nodes (Topic 1, Topic 2), and skill nodes (e.g., Skill A1, Skill U11, Skill U31, Skill U41).

Entity graph 600 also includes edges. The edges individually and/or collectively represent various different types of relationships between or among the nodes. Data can be linked with both nodes and edges. For example, when stored in a data store, each node is assigned a unique node identifier and each edge is assigned a unique edge identifier. The edge identifier can be, for example, a combination of the node identifiers of the nodes connected by the edge and a timestamp that indicates the date and time at which the edge was created. For instance, in the graph 600, edges between user nodes can represent online social connections between the users represented by the nodes, such as 'friend' or 'follower' connections between the connected nodes. As an example, in the entity graph 600, User 3 is a first-degree connection of User 1 by virtue of the CONNECTED edge between the User 3 node and the User 1 node, while User 2 is a second-degree connection of User 3, although User 1 has a different type of connection, FOLLOWS, with User 2 than with User 3.

In the entity graph 600, edges can represent activities involving the entities represented by the nodes connected by the edges. For example, a POSTED edge between the User 2 node and the Post U21 node indicates that the user represented by the User 2 node posted the digital content item represented by the PostU21 node to the application software system (e.g., as job posting posted to a user connection network). As another example, a SHARED edge between the User 1 node and the Post U21 node indicates that the user represented by the User 1 node shared the content item represented by the Post U21 node. Similarly the CLICKED edge between the User 3 node and the Article 1 node indicates that the user represented by the User 3 node clicked on the article represented by the Article 1 node, and the LIKED edge between the User 3 node and the Comment U1 node indicates that the user represented by the User 3 node liked the content item represented by the Comment U1 node.

In some implementations, combinations of nodes and edges are used to compute various scores, and those scores are used by various components of the generative message suggestion system 580 to, for example, generate message suggestions, score message suggestions, and/or rank feedback. For example, a score that measures the affinity of the user represented by the User 1 node to the job represented by the Job 2 node can be computed using a path p1 that includes a sequence of edges between the nodes User 1, Post U21, and Job 2 and/or a path p2 that includes a sequence of edges between the nodes User 1, Comment U1, and Job 2 and/or a path p3 that includes a sequence of edges between the nodes User 1, User 2, Post U21, Job 2, and/or a path p4 that includes a sequence of edges between the nodes User 1, User 3, Job 1, Company 2, Job 2. Any one or more of the paths p1, p2, p3, p4 and/or other paths through the graph 600 can be used to compute scores that represent affinities, relationships, or statistical correlations between different nodes. For instance, based on relative edge counts, a user-job affinity score computed between User U1 and Job 2 might be higher than the user-job affinity score computed between User U4 and Job 2. Similarly, a user-skill affinity score computed between User 3 and Skill U31 might be higher than the user-skill affinity score computed between User 3 and Skill U11. As another example, a job-skill affinity score computed between Job 1 and Skill U31 might be higher than a job-skill affinity score computed between Job1 and Skill U41.

The examples shown in FIG. 6 and the accompanying description, above are provided for illustration purposes. This disclosure is not limited to the described examples.

FIG. 7 is a flow diagram of an example method for automated message suggestion generation using components of a generative message suggestion system in accordance with some embodiments of the present disclosure.

The method 700 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by components of generative message suggestion system 108 of FIG. 1 or generative message suggestion system 580 of FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In the example of FIG. 7, generative message suggestion system 740 includes an input data collection subsystem 702, a data anonymizer subsystem 705, a training data formulation subsystem 706, a generator model subsystem 710, a scoring model subsystem 711, a message suggestion generation subsystem 714, a message generation interface 718, a pre-send feedback subsystem 720, a message distribution service 724, and a post-send feedback subsystem 728. Other implementations of generative message suggestion system 740 include some or all of the components shown in FIG. 7 and/or other components. In some implementations, one or more components of generative message suggestion system 740 include functionality described herein with reference to the generative message suggestion system 108 of FIG. 1.

In some implementations, the method 700 includes both online and offline flows. For example, machine learning model training and/or tuning can be performed offline while use of the trained models can be performed online in response to user interaction with the message generation interface 718. Alternatively or in addition, model tuning can be performed in response to online use of the generative message suggestion system. For example, in online operation, message suggestions output by a pre-trained generator model of the generator model subsystem 710 can be input to a pre-trained scoring model of the scoring model subsystem 711, and corresponding output of the pre-trained scoring model subsystem 711 can be used to tune the generator model.

Input data collection subsystem 702 includes one or more computer programs or routines that collect input data from one or more data sources, such as activity logs, message data stores, profile data stores, and entity graphs of an application software system. Examples of input data are described herein, for example with reference to FIG. 1. To collect input data, input data collection subsystem 702 executes queries on one or more databases or data stores, including real-time data stores and/or interfaces with a stream processing or event logging services such as logging service 570 to obtain real-time input or updates. Input data collection subsystem 702 outputs input data 704 for use by data anonymizer subsystem 705.

Data anonymizer subsystem 705 includes one or more computer programs or routines that remove potentially sensitive information from the input data 704 before the input data 704 can be used by other components of generative message suggestion system 740. In some implementations, such as the implementation described herein with reference to FIG. 1, data anonymizer subsystem 705 executes a named entity recognition process on portions of the input data 704. The output of the named entity recognition includes attribute tags in place of potentially sensitive attribute data such as entity names, geographic locations, and user profile data such as job titles and experience. The input data collection subsystem 702 and data anonymizer subsystem 705 may be logically and/or physically isolated from other components of generative message suggestion system 740 to prevent leakage of potentially sensitive data. Data anonymizer subsystem 705 outputs anonymized input data 708 for use by training data formulation subsystem 706.

Training data formulation subsystem 706 includes one or more computer programs or routines that formulate training data for machine learning models of the generative message suggestion system 740. The training data formulated by training data formulation subsystem 706 can be sender-specific. For example, training data formulation subsystem 706 can produce sender-specific sets of training data such that the model training process produces sender-specific versions of the machine learning models of the generative message suggestion system 740 for each message creator/sender.

Training data formulation subsystem 706 generates and outputs generator model training data 707 and scoring model training data 709. In some implementations, generator model training data 707 and scoring model training data 709 contain different sets of training data. For example, in some implementations, training data formulation subsystem 706 formulates negative examples of training data that are not included in generator model training data 707 but are included in scoring model training data 709. Training data formulation subsystem 706 can also formulate positive examples of training data that are included in both generator model training data 707 and scoring model training data 709.

An example or instance of training data formulated by training data formulation subsystem 706 includes a historical example of message content created and sent by a particular sender to a particular prospective recipient, and a label that indicates whether the message containing the piece of message text was accepted, rejected, or ignored by the prospective recipient. For instance, an instance of training data includes a piece of message text that has been previously sent by a sender to a prospective recipient and a data value that indicates whether the message containing the piece of message text was accepted, rejected, or ignored by the prospective recipient. The data value can be, for example, a numerical value in a set of valid values, such as [−1, 0, 1], where −1 indicates a message rejection, 0 indicates that the message was ignored, and 1 indicates that the message was accepted. Alternatively, other methods for representing the message acceptance data, such as canonical text labels, can be used.

An instance of training data is considered to be a positive example if the message was accepted by the prospective recipient, and the instance of training data is considered to be a negative example if the message was rejected or ignored by the prospective recipient. In the training instances, attribute data or metadata that normally could be used to identify the particular sender and/or prospective recipient is excluded from the training instance because that data has been anonymized by the data anonymizer subsystem 705.

Training data formulation subsystem 706 outputs generator model training data 707 to generator model subsystem 710 and outputs scoring model training data 709 to scoring model subsystem 711.

Generator model subsystem 710 includes one or more computer programs or routines that, during model training or tuning, apply a generator model to the generator model training data 707 to produce a trained or tuned generator model based on the generator model training data 707. When the trained or tuned generator model is brought online, the trained or tuned generator model machine-generates message suggestions 712 in response to attribute data 717 received by message suggestion generation subsystem 714 via message generation interface 718. During online operation, the trained or tuned generator model also communicates message suggestions 712 to scoring model subsystem 711 and receives message suggestion scores 713 from scoring model subsystem 711. In some implementations, the online execution of the trained or tuned generator model subsystem 710 is initiated by an API call from message suggestion generation subsystem 714, and communications between the generator model subsystem 710 and the scoring model subsystem 711 are accomplished via API calls.

Scoring model subsystem 711 includes one or more computer programs or routines that, during model training or tuning, apply a scoring model to the scoring model training data 709 to produce a trained or tuned scoring model based on the scoring model training data 709. When the trained or tuned scoring model is brought online, the trained or tuned scoring model generates and outputs message suggestion scores 713 in response to messages created via a message generation interface and/or message suggestions 712 received from the generator model subsystem 710. In some implementations, the online execution of the trained or tuned scoring model subsystem 711 is initiated by an API call from message suggestion generation subsystem 714 or generator model subsystem 710.

In some implementations, both the generator model subsystem 710 and the scoring model subsystem 711 are implemented using an encoder-decoder model architecture. In other implementations, the generator model subsystem 710 and the scoring model subsystem 711 are implemented using one or more different model architectures. For example, in some implementations, a decoder-only or transformer-based architecture is used in one or both of the generator model subsystem 710 and the scoring model subsystem 711. In other implementations, an instance of a generative model, such as a large language model, is configured to generate and output message content in generator model subsystem 710 while another instance of the generative model is configured to generate and output message suggestion scores in scoring model subsystem 711. In still other implementations, a different model architecture is used for the scoring model than is used for the generator model.

A generative model uses artificial intelligence technology to machine-generate new digital content based on model inputs and the previously existing data with which the model has been trained. Whereas discriminative models are based on conditional probabilities P (y|x), that is, the probability of an output y given an input x (e.g., is this a photo of a dog?), generative models capture joint probabilities P (x, y), that is, the likelihood of x and y occurring together (e.g., given this photo of a dog and an unknown person, what is the likelihood that the person is the dog's owner, Sam?).

A generative language model is a particular type of generative model that generates new text in response to model input. The model input includes a task description, also referred to as a prompt. The task description can include instructions and/or examples of digital content. A task description can be in the form of natural language text, such as a question or a statement, and can include non-text forms of content, such as digital imagery and/or digital audio. In some implementations, an input layer of the generative language model converts the task description to an embedding or a set of embeddings. In other implementations, the embedding or embeddings are generated based on the task description by a pre-processor, and then the embeddings are input to the generative language model.

Given a task description, a generative model can generate a set of task description-output pairs, where each pair contains a different output. In some implementations, the generative model assigns a score to each of the generated task description-output pairs. The output in a given task description-output pair contains text that is generated by the model itself rather than provided to the model as an input.

The score associated by the model with a given task description-output pair represents a probabilistic or statistical likelihood of there being a relationship between the output and the corresponding task description in the task description-output pair. For example, given an image of an animal and an unknown person, a generative model could generate the following task description-output pairs and associated scores: [what is this a picture of?; this is a picture of a dog playing with a young boy near a lake; 0.9], [what is this a picture of?; this is a picture of a dog walking with an old woman on a beach; 0.1]. The higher score of 0.9 indicates a higher likelihood that the picture shows a dog playing with a young boy near a lake rather than a dog walking with an old woman on a beach. The score for a given task description-output pair is dependent upon the way the generative model has been trained and the data used to perform the model training. The generative model can sort the task description-output pairs by score and output only the pair or pairs with the top k scores, where k is a positive integer that represents the desired number of pairs to be returned for a particular design or implementation of the generative model. For example, the model could discard the lower-scoring pairs and only output the top-scoring pair as its final output.

In some implementations, one or more of generator model subsystem 710 and scoring model subsystem 711 are implemented using a graph neural. For example, a modified version of a Bidirectional Encoder Representation with Transformers (BERT) neural network is specifically configured, in one model instance, to generate and output message suggestions, and in another instance, to generate and output message suggestion scores. In some implementations, the modified BERT is trained with self-supervision, e.g., by masking some portions of the input data so that the BERT learns to predict the masked data. During scoring, a masked entity is associated with a portion of the input data and the model generates output at the position of the masked entity based on the input data.

In some implementations, one or more of generator model subsystem 710 and scoring model subsystem 711 are constructed using a neural network-based machine learning model architecture. In some implementations, the neural network-based architecture includes one or more input layers that receive model inputs, generate one or more embeddings based on the model inputs, and pass the one or more embeddings to one or more other layers of the neural network. In other implementations, the one or more embeddings are generated based on the model input by a preprocessor, the embeddings are input to the neural network model, and the neural network model generates output, e.g., message suggestions or message suggestion scores, based on the embeddings.

In some implementations, the neural network-based machine learning model architecture includes one or more self-attention layers that allow the model to assign different weights to portions of the model input. Alternatively or in addition, the neural network architecture includes feed-forward layers and residual connections that allow the model to machine-learn complex data patterns including relationships between different portions of the model input in multiple different contexts. In some implementations, the neural network-based machine learning model architecture is constructed using a transformer-based architecture that includes self-attention layers, feed-forward layers, and residual connections between the layers. The exact number and arrangement of layers of each type as well as the hyperparameter values used to configure the model are determined based on the requirements of a particular design or implementation of the generative message suggestion system.

In some examples, the neural network-based machine learning model architecture includes or is based on one or more generative transformer models, one or more generative pre-trained transformer (GPT) models, one or more bidirectional encoder representations from transformers (BERT) models, one or more large language models (LLMs), one or more XLNet models, and/or one or more other natural language processing (NL) models. In some examples, the neural network-based machine learning model architecture includes or is based on one or more predictive text neural models that can receive text input and generate one or more outputs based on processing the text with one or more neural network models. Examples of predictive neural models include, but are not limited to, Generative Pre-Trained Transformers (GPT), BERT, and/or Recurrent Neural Networks (RNNs). In some examples, one or more types of neural network-based machine learning model architectures include or are based on one or more multimodal neural networks capable of outputting different modalities (e.g., text, image, sound, etc.) separately and/or in combination based on textual input. Accordingly, in some examples, a multimodal neural network implemented in the generative message suggestion system is capable of outputting digital content that includes a combination of two or more of text, images, video or audio.

In some implementations, one or more of the models of generator model subsystem 710 and/or scoring model subsystem 711 is trained on a large dataset of digital content such as natural language text, images, videos, audio files, or multi-modal data sets. For example, training samples of digital content such as natural language text extracted from publicly available data sources are used to train one or more generative models of the generative message suggestion system. The size and composition of the datasets used to train one or more models of one or more of generator model subsystem 710 and scoring model subsystem 711 can vary according to the requirements of a particular design or implementation of the generative message suggestion system. In some implementations, one or more of the datasets used to train one or more models of the one or more of generator model subsystem 710 and scoring model subsystem 711 includes hundreds of thousands to millions or more different training samples.

In some embodiments, one or more models of one or more of generator model subsystem 710 and scoring model subsystem 711 includes multiple generative models trained on differently sized datasets. For example, a message suggestion generation system can include a comprehensive but low capacity generative model that is trained on a large data set and used for generating message suggestion examples, and the same generative model also can include a less comprehensive but high capacity model that is trained on a smaller data set, where the high capacity model is used to generate outputs based on examples obtained from the low capacity model. In some implementations, reinforcement learning is used to further improve the output of one or more models of one or more of generator model subsystem 710 and scoring model subsystem 711. In reinforcement learning, ground-truth examples of desired model output are paired with respective inputs, and these input-example output pairs are used to train or fine tune one or more models of one or more of generator model subsystem 710 and scoring model subsystem 711.

In online operation, message suggestion generation subsystem 714 includes one or more computer programs or routines (e.g., APIs) that receive attribute data 717 from message generation interface 718 and output one or more message suggestions 716 in response to the received attribute data 717. In response to the attribute data 717, the message suggestion generation subsystem 714 interfaces with the trained or tuned generator model subsystem 710 to obtain one or more message suggestions 712 produced by the trained or tuned generator model subsystem 710 and interfaces with the trained or tuned scoring model subsystem 711 to obtain one or more message suggestion scores 713 produced by the trained or tuned generator model subsystem 710. The one or more message suggestion scores 713 correspond to the message suggestions 712 obtained from the generator model subsystem 710. For example, a message suggestion score 713 is generated and output by scoring model subsystem 711 for each message suggestion 712 generated and output by generator model subsystem 710.

A message suggestion 712 includes, for example, a piece of machine-generated content, e.g., message text, an outline, or a summary, that the message sender can use to create a message that is customized for a particular prospective recipient. Examples of message suggestions include insights, such as helpful hints that the message sender can consider while the sender is creating a message. Other examples of message suggestions include suggested attributes that the message sender may include in a message to improve the acceptance probability with a particular prospective recipient. Still other examples of message suggestions include machine-generated message suggestion content (e.g., text and/or other content) to be included in the body of a message to improve the acceptance probability with a particular prospective recipient. A message suggestion can include one or multiple different forms of content, for example text, audio, video, a combination of text and an image or video, etc.

Message suggestion generation subsystem 714 selects one or more message suggestions from the message suggestions 712 based on the corresponding message suggestion scores 713. For example, message suggestion generation subsystem 714 sorts or ranks the message suggestions 712 in order based on the message suggestion scores 713 (e.g., from highest to lowest score), and selects the top k message suggestions from the sorted or ranked list of message suggestions 712, where k is a positive integer whose value is configurable based on the requirements or design of a particular implementation of the generative message suggestion system.

Message suggestion generation subsystem 714 outputs the one or more selected message suggestions 716 to message generation interface 718, in response to the attribute data 717. Message generation interface 718 presents the message suggestion(s) 716 to the message sender user, for example via a graphical user interface. In response to the message suggestion(s) 716, message generation interface 718 can receive pre-send signals 719, such as messages drafted by the sender, edits to the attribute data 717, selections of message suggestions, edits to message suggestions, requests to regenerate message suggestions, or other forms of user reaction to the message suggestion(s) 716 that occur before the sender sends the message to a prospective recipient. Message generation interface 716 sends the received pre-send signals 719 to message suggestion generation subsystem 714, which can use the received pre-send signals 719 to generate a new or modified version of the message suggestion(s) 716.

Message generation interface 718 can also provide the pre-send signals 719 to pre-send feedback subsystem 720. After one or more iterations of user interaction with message suggestion(s) 716, message generation interface 718 may output a message 722. In an example, a message 722 includes a message body created at least partly based on a machine-generated message suggestion and message metadata (e.g., sender identifier, prospective recipient identifier).

Pre-send feedback subsystem 720 includes one or more computer programs or routines that obtain pre-send signals 719 related to a message suggestion 716 produced by message suggestion generation subsystem 714 and formulate pre-send feedback 721, for example by mapping the pre-send signals 719 to the corresponding message or message suggestion 716 and retuning the pre-send feedback 721 to training data formulation subsystem 706 to be used to tune one or more models of the generator model subsystem 710 and/or scoring model subsystem 711.

Message distribution service 724 includes one or more computer programs or routines that formulate a transmittable version of the message 722 created based on a message suggestion 716, and causes the transmittable version of the message 722 to be distributed to the prospective recipient via a network, such as a user connection network, for example. In some implementations, the execution of message distribution service 724 is initiated by an API call from the generative message suggestion system 740. Transmitting a message as described herein includes transmitting a message created by a sender based on a machine-generated message suggestion from the sender's user account to the prospective recipient's user account in an online system such as application software system 530, over a network.

Message distribution service 724 may interface with, e.g., logging service 570, to collect and log post-send signals 726 received from the prospective recipient's user account. Post-send signals 726 include data that indicates whether the sender's message was delivered to the prospective recipient and whether and how the prospective recipient reacted to receipt of the sender's message. For example, post-send signals include data values that indicate whether the prospective recipient accepted the sender's message, rejected the message, or ignored the message.

Post-send feedback subsystem 728 includes one or more computer programs or routines that receive and track the prospective recipient's post-send feedback 729 relating to the sender's message 722. In some implementations, post-send feedback subsystem 728 returns post-send feedback 729 to training data formulation subsystem 706 to be used to tune one or more models of generator model subsystem 710 and/or scoring model subsystem 711.

To generate pre-send feedback 721 or post-send feedback 729, a reference to the message suggestion 716 used to create the message 722 is persisted in a data store, for example by logging service 570. For example, each message suggestion 712 is assigned a unique message suggestion identifier by generator model subsystem 710. The message suggestion identifier associated with a message suggestion 716 is passed by message suggestion generation subsystem 714 to message generation interface 718.

When the sender interacts with a message suggestion 716, the message generation interface 718 links the pre-send signals 719 with the corresponding message suggestion identifier and potentially also with the attribute data 717 that gave rise to the message suggestion 716. When the sender sends a message 722 based on a message suggestion 716, the message generation interface 718 generates a unique message identifier for the message 722 and links it with the corresponding message suggestion identifier and causes the message suggestion identifier-message identifier pair to be persisted in a data store that is accessible by message distribution service 724. When message distribution service 724 receives post-send signals 726 relating to the message 722, message distribution service 724 links the post-send signals 726 with the message suggestion identifier-message identifier pair and passes the linked data to post-send feedback subsystem 728.

The examples shown in FIG. 7 and the accompanying description, above are provided for illustration purposes. This disclosure is not limited to the described examples.

Figure 8:
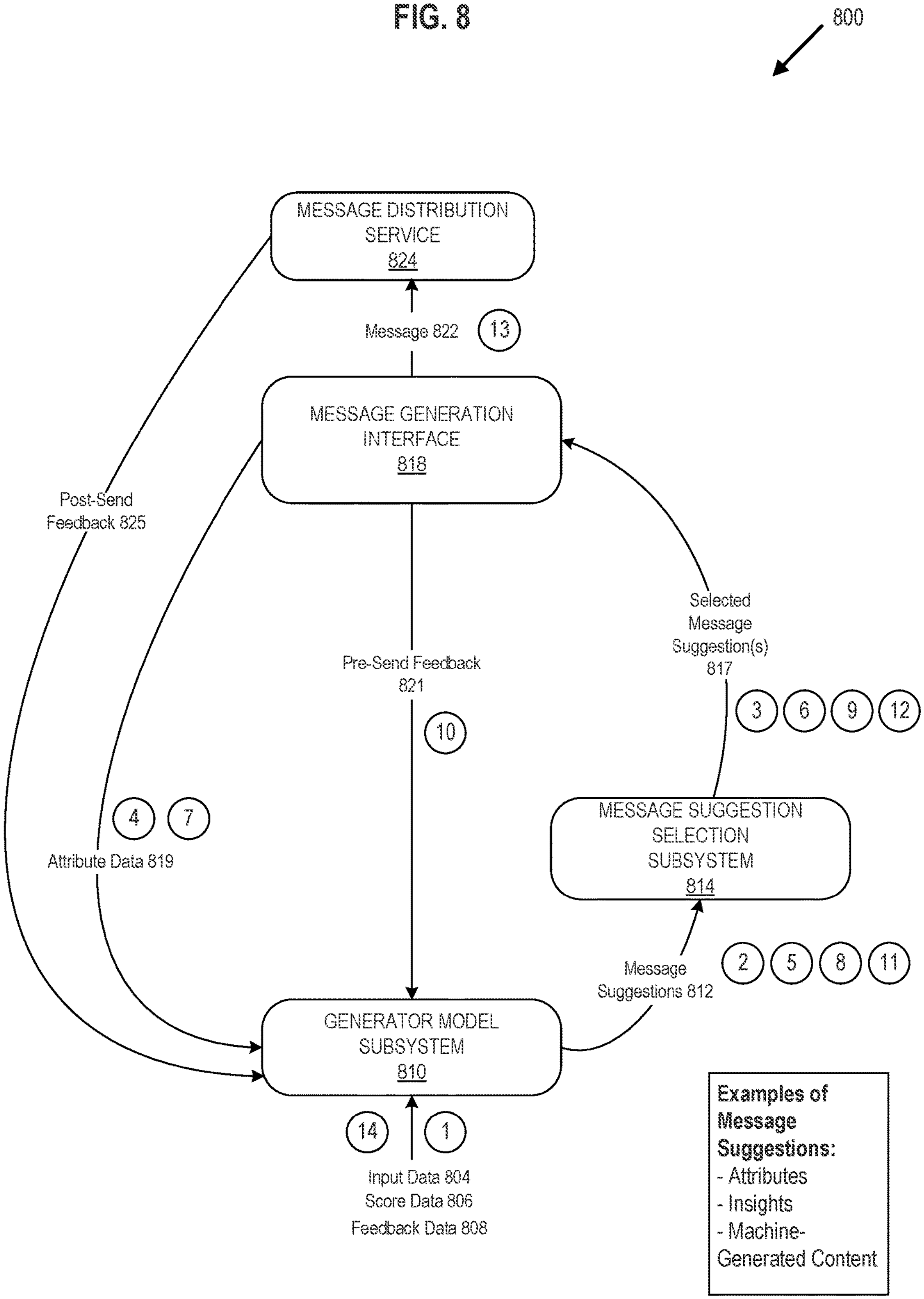
FIG. 8 is a flow diagram of an example method for automated message suggestion generation using components of a generative message suggestion system in accordance with some embodiments of the present disclosure.

FIG. 8 is a flow diagram of an example method for automated message suggestion generation using components of a generative message suggestion system in accordance with some embodiments of the present disclosure.

The method 800 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by one or more components of generative message suggestion system 108 of FIG. 1 or generative message suggestion system 580 of FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

FIG. 8 shows an example of an online flow in which the models of generator model subsystem 810 and the corresponding scoring model subsystem (not shown in FIG. 8) are pre-trained based on input data 804 or tuned based on score data 806 and/or feedback data 808 (e.g., pre-send or post-send feedback data) at action (1). At action (2), generator model subsystem 810 machine-generates and sends one or more machine-generated message suggestions 812 to a message suggestion selection subsystem 814, which may be implemented as a component of the message suggestion generation subsystem 714. For example, generator model subsystem 810 machine-generates a list of suggested attributes based on data extracted from the sender's profile and/or data extracted from a prospective recipient's profile. Action (2) can be triggered by, for example, the sender loading a page of message generation interface 818 at the sender's device while also viewing the prospective recipient's profile page. At action (3), the message suggestion selection subsystem 814 sends one or more selected message suggestions 817 to message generation interface 818. For example, the message suggestion selection subsystem 814 sends a subset of the list of suggested attributes output by generator model subsystem 810 based on the sender's profile data to message generation interface 818 as the selected message suggestions 817.

At action (4), message generation interface 818 sends attribute data 819 to generator model subsystem 810. For example, the message generation interface 818 presents the suggested attributes received from message suggestion selection subsystem 814 to the sender, and the sender selects the attribute data 819.

At action (5), generator model subsystem 810 machine-generates and outputs a second set of message suggestions 812 to message suggestion selection subsystem 814, based on the attribute data 819. For example, generator model subsystem 810 machine-generates and outputs insights based on the attribute data 819. At action (6), message suggestion selection subsystem 814 sends a subset of the second set of message suggestions 812 (e.g., the top-ranked insights) to message generation interface 818 as selected message suggestions 817.

At action (7), message generation interface 818 sends a second set of attribute data 819 to generator model subsystem 810. For example, message generation interface 818 presents the top-ranked insights (based on output of the scoring model) to the sender and the sender revises the selected attribute data based on one or more of the insights, e.g., to add or delete one or more attributes from the attribute data 819.

At action (8), generator model subsystem 810 machine-generates a third set of message suggestions 812 based on the second set of attribute data 819 and sends the third set of message suggestions 812 to message suggestion selection subsystem 814. For example, the generator model subsystem 810 machine-generates and outputs one or more examples of suggested message content based on the revised list of attributes received from message generation interface 818.

At action (9), message suggestion selection subsystem 814 selects from among the third set of message suggestions 812 and provides the message suggestions selected from the third set of message suggestions to message generation interface 818. For example, message suggestion selection subsystem 814 sends the top ranked (based on output of the scoring model) examples of suggested message content to message generation interface 818.

At action (10), message generation interface 818 generates and sends pre-send feedback 821 to generator model subsystem 810. For example, the message generation interface 818 presents one or more of the top ranked examples of suggested message content to the sender and the sender requests that the message suggestions be regenerated based on a different set of attribute data, or using a different tone or style.

At action (11), generator model subsystem 810 machine-generates and outputs, to the message suggestion selection subsystem 814, a fourth set of message suggestions 812. For example, the generator model subsystem 810 machine-generates and outputs a second set of examples of suggested message content based on the pre-send feedback 619.

At action (12), message suggestion selection subsystem 814 selects one or more message suggestions from the fourth set of message suggestions 812 and sends the selected suggestions to message generation interface 818. For example, message suggestion selection subsystem 814 sends the second set of examples of suggested message content generated based on the pre-send feedback 619 to message generation interface 818.

At action (13), message generation interface 818 sends message 822 including at least one of the machine-generated message suggestions to message distribution service 824. For example, the sender reviews the second set of examples of suggested message content, includes one of the examples in a message to the prospective recipient, and initiates the sending of the message to the prospective recipient.

At action (14), message distribution service 824 generates and send post-send feedback 825 to generator model subsystem 810. For example, message distribution service 824 receives user interface event data from the prospective recipient's login session to a message receiving interface, where the user interface event data indicates that the prospective recipient accepted the message 822. The message acceptance data is formulated into post-send feedback 825, and used to tune one or more models of generator model subsystem 810 and/or the scoring model subsystem.

The examples shown in FIG. 8 and the accompanying description, above are provided for illustration purposes. This disclosure is not limited to the described examples.

Figure 9:
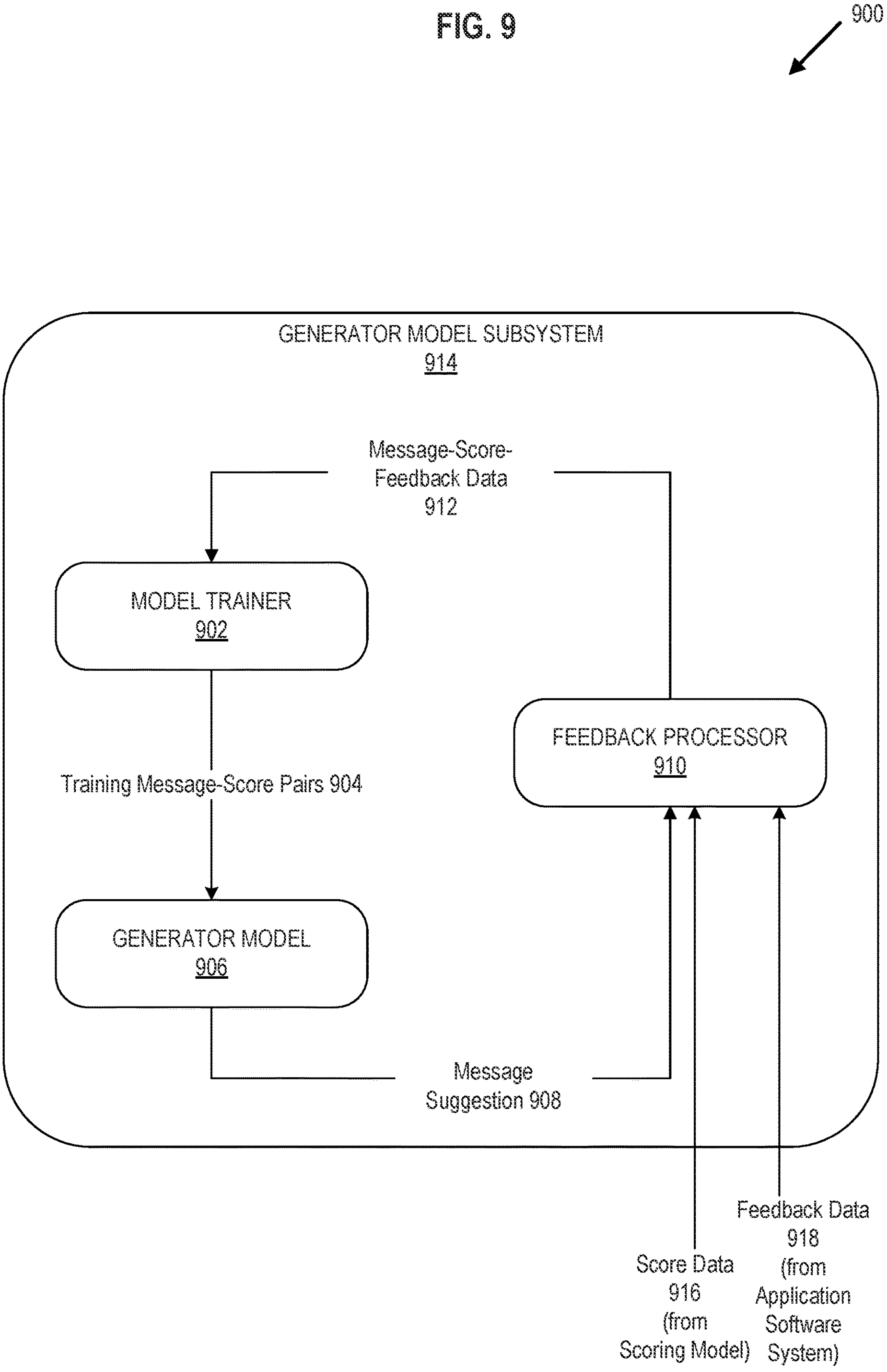
FIG. 9 is a flow diagram of an example method for configuring a generator model for automated message suggestion generation using components of a generator model subsystem in accordance with some embodiments of the present disclosure.

FIG. 9 is a flow diagram of an example method for configuring a generator model for automated message suggestion generation using components of a generator model subsystem in accordance with some embodiments of the present disclosure.

The method 900 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 900 is performed by one or more components of generative message suggestion system 108 of FIG. 1 or generative message suggestion system 580 of FIG. 5, such as message suggestion generation subsystem 714, shown in FIG. 7, described herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 9, generator model subsystem 914 includes one or more computer programs or routines that train or tune a generator model 906 for message suggestion generation tasks, e.g., to configure the generator model 906 to machine-generate and output message suggestions. In some implementations, the execution of generator model subsystem 914 or more specifically the generator model 906 is initiated by an API call from, e.g., generative message suggestion system 580.

In the example of FIG. 9, generator model subsystem 914 includes a model trainer 902, a generative model 906, and a feedback processor 910 operatively coupled together in a closed loop. Model trainer 902 receives score data 916 from a scoring model subsystem described herein and/or feedback data 918 resulting from a previous iteration of generative model 906. The message-score-feedback data 912 is generated by feedback processor 910 in response to the output of a previous iteration of the generator model 906.

To create message-score-feedback data 912, in some implementations, feedback processor 910 computes a score, such as a reward score, based on the score data 916 and/or feedback data 918 related to a particular message or message suggestion. For instance, given an instance of message suggestions 908, feedback processor 910 computes a reward score for the message suggestion 908 by applying a reinforcement learning model to the feedback 916, 918 associated with the message suggestion 908.

In some implementations, the generator model 906 is pre-trained on a large corpus (e.g., millions of training examples) and can be re-trained or tuned for particular applications or domains. For example, user-specific versions of the generator model 906 can be created by tuning the generator model 906 based on a particular sender's historical message activity data.

Model trainer 902 creates training data based on the message-score-feedback data 912 received from feedback processor 910. The training data created by model trainer 902, e.g., training message-score pairs 904, is used to train or tune the generator model 906 using, for example, supervised machine learning or semi-supervised machine learning. An instance of training data includes ground-truth data for a given message-score pair, where the ground-truth data includes, for example, a reward score, a classification, or a label generated by feedback processor 910 in communication with one or more feedback subsystems such as pre-send feedback subsystem 720 or post-send feedback subsystem 728. For instance, the ground-truth data includes historical message acceptance data. In a training or fine tuning mode, the generator model 906 is applied to the training message-score pairs 904 and one or more model parameters of the generator model 906 are updated based on the training or fine tuning. Alternatively or in addition, the architecture of the generator model 906 can be re-engineered based on new instances of training data or based on a new application or domain. In an operational mode, the generator model 906 generates message suggestions in response to model inputs. Message suggestions 908 generated by the generator model 906 are processed by feedback processor 910 to create message-score-feedback data 912.

In some implementations, feedback processor 910 includes a reinforcement learning component such as a reinforcement learning model that machine-learns a reward function based on feedback associated with message suggestions. For example, given a message suggestion 908, feedback processor 910 receives or identifies feedback 916, 918 that pertains to the message suggestion 908. The feedback can include pre-send feedback and/or post-send feedback received from one or more other components of the generative message suggestion system. The feedback processor 910 applies the reward function to the received or identified feedback to generate a reward score for the corresponding message suggestion based on the feedback associated with the message suggestion. The reward scores are incorporated into the message-score-feedback data 912, which are then used to train or tune the generator model 906 using, for example, supervised or semi-supervised machine learning. The examples shown in FIG. 9 and the accompanying description, above are provided for illustration purposes. This disclosure is not limited to the described examples.

Figure 10:
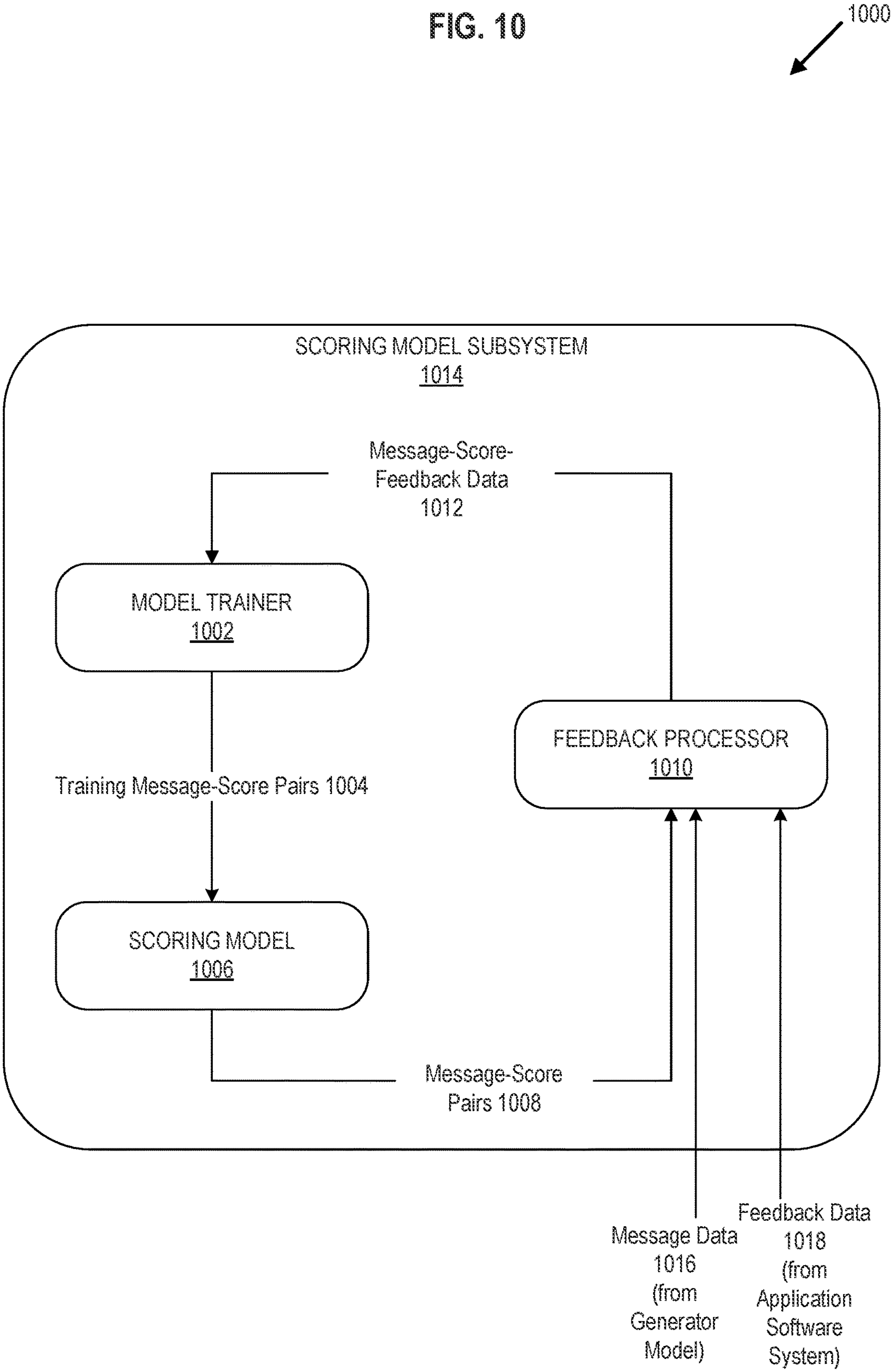
FIG. 10 is a flow diagram of an example method for configuring a scoring model for automated message suggestion generation using components of a scoring model subsystem in accordance with some embodiments of the present disclosure.

FIG. 10 is a flow diagram of an example method for configuring a scoring model for automated message suggestion generation using components of a scoring model subsystem in accordance with some embodiments of the present disclosure.

The method 1000 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 is performed by one or more components of generative message suggestion system 108 of FIG. 1 or generative message suggestion system 580 of FIG. 5, such as message suggestion generation subsystem 714, shown in FIG. 7, described herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

In FIG. 10, scoring model subsystem 1014 includes one or more computer programs or routines that train or tune a scoring model 1006 for message suggestion scoring tasks, e.g., to configure the scoring model 1006 to machine-generate and output message suggestion scores that indicate the acceptance probabilities for message suggestions generated by the generator model subsystem. In some implementations, the execution of scoring model subsystem 1014 or more specifically the scoring model 1006 is initiated by an API call from, e.g., generative message suggestion system 580.

In the example of FIG. 10, scoring model subsystem 1014 includes a model trainer 1002, a generative model 1006, and a feedback processor 1010 operatively coupled together in a closed loop. Model trainer 1002 receives feedback data 1018 from a previous iteration of scoring model 1006. The message-score-feedback data 1012 is generated by feedback processor 1010 in response to the message data 1016 output of the previous iteration of the generator model. For example, the message-score-feedback data 1012 can indicate, for a particular message suggestion generated by the generator model, whether the corresponding score output by the scoring model 1006 correlates with the feedback data 1018 (e.g., pre-send feedback or post-send feedback).

To create message-score-feedback data 1012, in some implementations, feedback processor 1010 computes a score, such as a reward score, based on feedback 1018 related to a particular message-score pair. For instance, given a message-score pair 1008, feedback processor 1010 computes a score for the message-score pair 1008 by applying a reinforcement learning model to the feedback 1018 associated with the message-score pair.

In some implementations, the scoring model 1006 is pre-trained on a large corpus (e.g., millions of training examples) and can be re-trained or fine-tuned for particular users, applications or domains. Model trainer 1002 creates training data based on the message-score-feedback data 1012 received from feedback processor 1010. The training data created by model trainer 1002, e.g., training message-score pairs 1004, is used to train or fine tune the scoring model 1006 using, for example, supervised machine learning or semi-supervised machine learning. An instance of training data includes ground-truth data for a given message-score pair, where the ground-truth data includes, for example, a reward score, a classification, or a label generated by feedback processor 1010 in communication with one or more feedback subsystems such as pre-send feedback subsystem 720 or post-send feedback subsystem 728. In a training or fine tuning mode, the scoring model 1006 is applied to the training message-score pairs 1004 and one or more model parameters of the scoring model 1006 are updated based on the training or fine tuning. Alternatively or in addition, the architecture of the scoring model 1006 can be re-engineered based on new instances of training data or based on a new user, application or domain. In an operational mode, the scoring model 1006 generates scores in response to message suggestions produced by the generator model. The message-score pairs 1008 generated by the scoring model 1006 are processed by feedback processor 1010 to create message-score-feedback data 1012 when the feedback processor 1010 receives feedback related to the respective message-score pairs 1008.

In some implementations, feedback processor 1010 includes a reinforcement learning component such as a reinforcement learning model that machine-learns a reward function based on feedback associated with message-score pairs. For example, given a message-score pair 1008, feedback processor 1010 receives or identifies feedback that pertains to the message-score pair 1008. The feedback can include pre-send feedback and/or post-send feedback received from one or more other components of the generative message suggestion system. The feedback processor 1010 applies the reward function to the received or identified feedback to generate a reward score for the corresponding message-score pair based on the feedback associated with the message-score pair. The reward scores are incorporated into the message-score-feedback data 1012, which are then used to train or fine tune the scoring model 1006 using, for example, supervised or semi-supervised machine learning. The examples shown in FIG. 10 and the accompanying description, above are provided for illustration purposes. This disclosure is not limited to the described examples.

Figure 11:
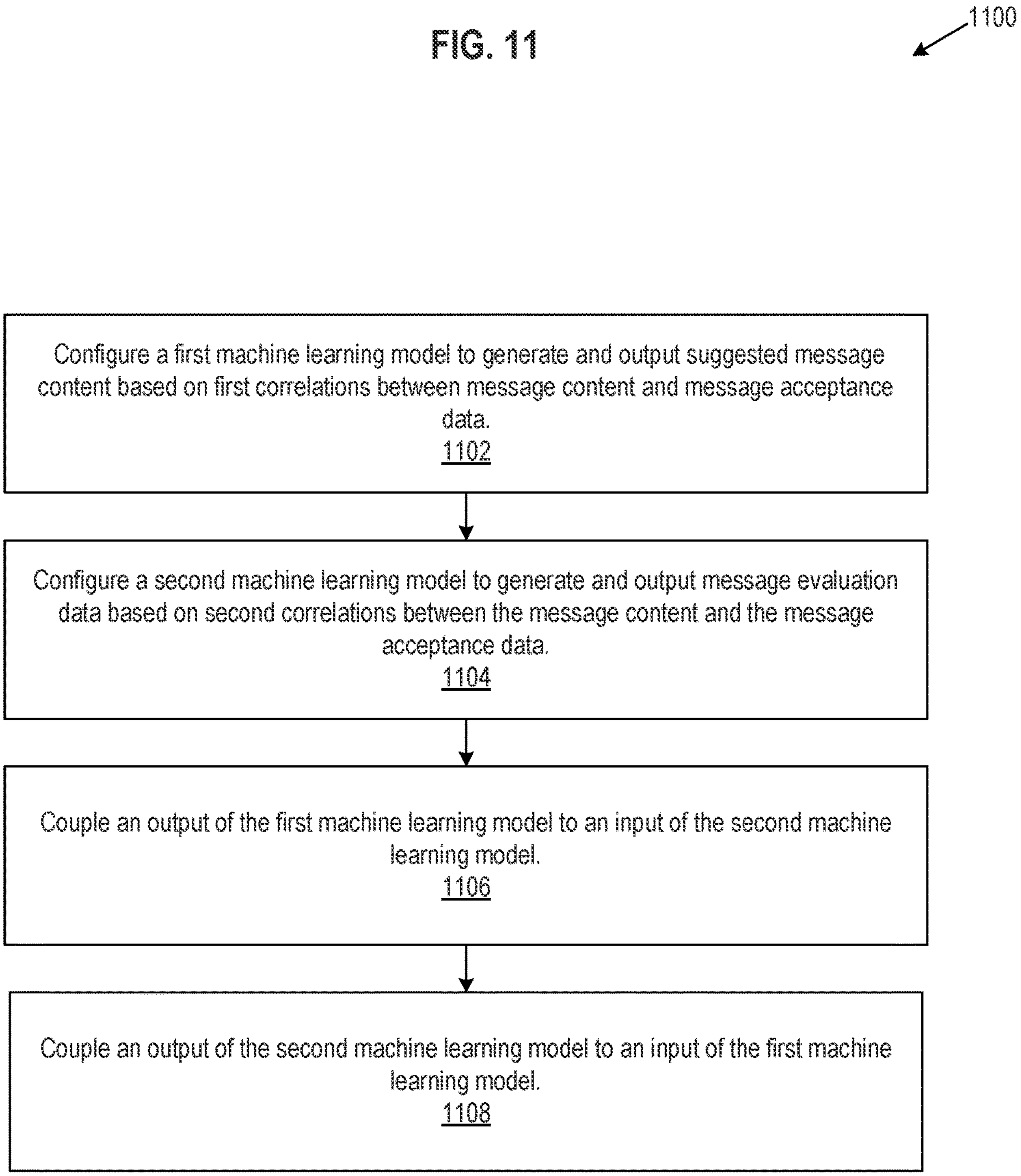
FIG. 11 is a flow diagram of an example method for automated message suggestion generation in accordance with some embodiments of the present disclosure.

FIG. 11 is a flow diagram of an example method for automated message suggestion generation in accordance with some embodiments of the present disclosure.

The method 1100 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1100 is performed by one or more components of generative message suggestion system 108 of FIG. 1 or generative message suggestion system 580 of FIG. 5. For example, in some implementations, portions of the method 1100 are performed by one or more components of a generative message suggestion system shown in FIG. 1 and/or FIG. 5, described herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 1102, the processing device configures a first machine learning model to generate and output suggested message content based on first correlations between message content and message acceptance data. The first machine learning model includes a first encoder-decoder model architecture, in some implementations.

In some implementations, the processing device trains the first machine learning model based on first training data. The first training data includes positive examples of the message acceptance data. In some implementations, the processing device formulates an instance of the first training data to include message content, sender metadata associated with the message content, recipient metadata associated with the message content, and an acceptance label associated with the recipient metadata. The acceptance label includes an indicator of (i) an acceptance, by a recipient, of a message comprising the message content sent by a sender to the recipient, (ii) a rejection of the message, by the recipient, or (iii) no response to the message, by the recipient.

In some implementations, the processing device anonymizes at least one of the message content, the sender metadata, or the recipient metadata, and uses the anonymized at least one of the message content, the sender metadata, or the recipient metadata to formulate the instance of the first training data.

In some implementations, the processing device determines, for an instance of suggested message content, a model input to which the first machine learning model is applied to generate the instance of suggested message content, determines a difference between the instance of suggested message content and the model input, and tunes the first machine learning model based on the difference between the instance of suggested message content and the model input.

At operation 1104, the processing device configures a second machine learning model to generate and output message evaluation data based on second correlations between the message content and the message acceptance data. The second machine learning model includes a second encoder-decoder model architecture, in some implementations.

In some implementations, the processing device trains the second machine learning model based on the first training data and second training data. The second training data includes negative examples of the message acceptance data.

At operation 1106, the processing device couples an output of the first machine learning model to an input of the second machine learning model. In some implementations, the processing device inputs the suggested message content output by the first machine learning model to the second machine learning model.

At operation 1108, the processing device couples an output of the second machine learning model to an input of the first machine learning model. In some implementations, the processing device inputs the message evaluation data output by the second machine learning model to the first machine learning model.

In some implementations, the processing device receives, via a message generation interface, pre-send feedback data relating to the suggested message content, and tunes at least one of the first machine learning model or the second machine learning model based on the received pre-send feedback data. In some implementations, the pre-send feedback data is based on at least one interaction of a prospective message sender with the message generation interface in response to a presentation by the message generation interface of the suggested message content prior to a sending of a message comprising the suggested message content by the prospective message sender to at least one recipient.

In some implementations, the processing device receives, via a message receiving interface, post-send feedback data relating to the suggested message content, and tunes at least one of the first machine learning model or the second machine learning model based on the received post-send feedback data. In some implementations, the post-send feedback data is based on at least one interaction of a prospective message recipient with the message receiving interface in response to a presentation by the message receiving interface of a message comprising the suggested message content to the prospective message recipient.

In some implementations, the suggested message content generated and output by the first machine learning model includes any of video, audio, and/or one or more digital images.

In some implementations, the processing device presents the generative message suggestion to a user at a messaging interface and receives user input in response to the generative message suggestion, where the user input includes any of: one or more modifications of the generative message suggestion, one or more requests for a new generative message suggestion, an action that incorporates the generative message suggestion into a new piece of digital content and causes the new piece of digital content to be distributed in a user network, e.g., via a social network service.

In some implementations, the technical problem of scalability is addressed by the processing device selecting the generative message suggestion from a set of generative message suggestions, where the size of the set of generative message suggestions is at least one order of magnitude smaller than the number of users of the messaging system.

In some implementations, the technical problem of efficient distribution of message suggestions is addressed by the processing device converting the generative message suggestion from a first size to a second size, prior to distribution, where the second size is more efficient than the first size for presentation to the user or for distribution in the user network.

In some implementations, the processing device configures the generative message suggestions based on one or more interaction parameters of the sending user; for example, the one or more interaction parameters are input to a machine learning model to cause the machine learning model to formulate the generative message suggestions to be suitable for rendering at end user devices with different screen sizes or resolutions and/or different device capabilities so as to facilitate interaction between the users and the message suggestions resulting in improved message creation and distribution.

In some implementations, the technical problem of dealing with latency is addressed by the processing device detecting an increase in latency of outputting a generative message suggestion and in response to detecting the increase in latency, performing one or more of the following actions: reducing a number of the model inputs; or using a machine learning model with a reduced size; or reducing a size of the message suggestions (e.g., reducing the maximum text length or byte size).

The examples shown in FIG. 11 and the accompanying description, above are provided for illustration purposes. This disclosure is not limited to the described examples.

Figure 12:
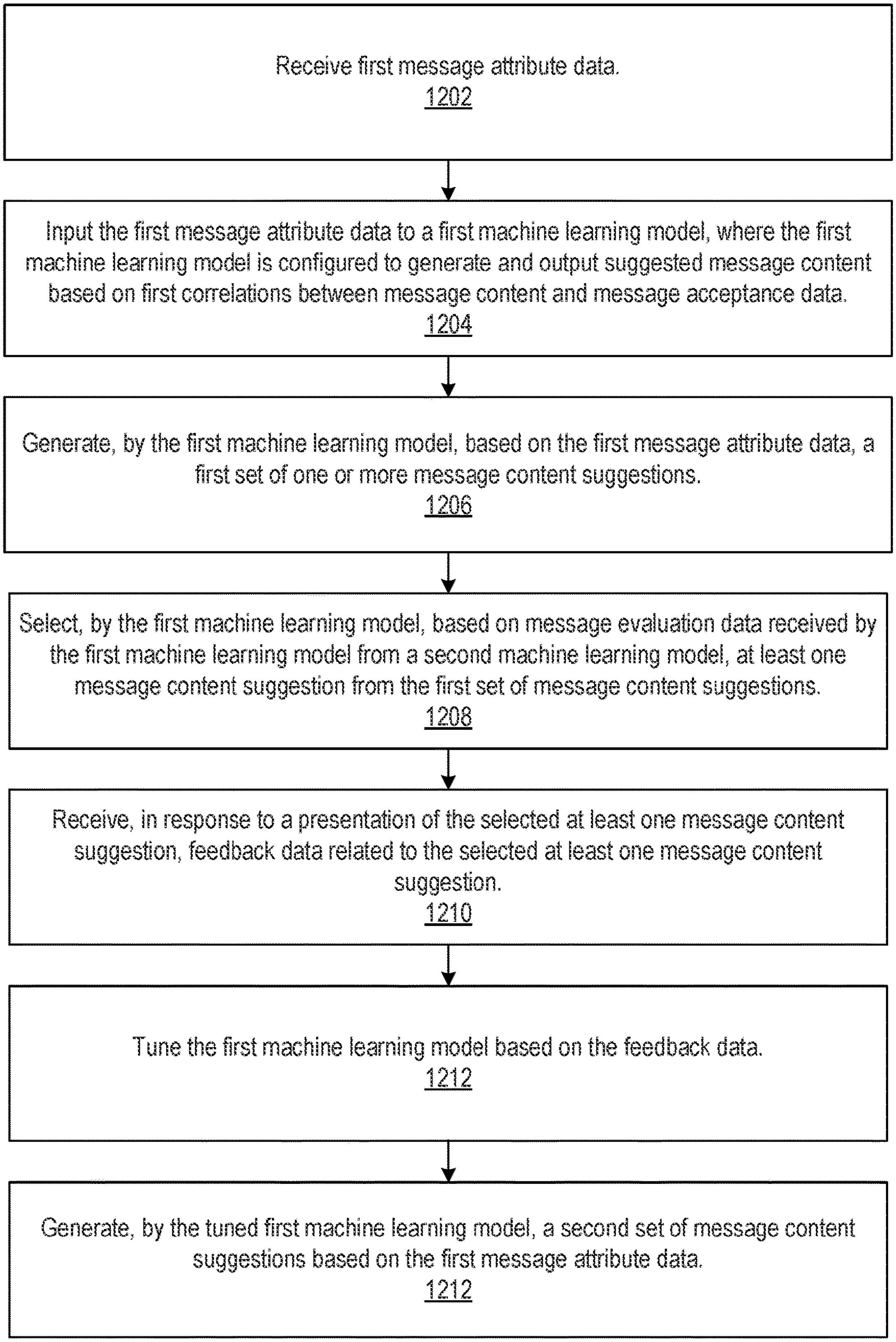
FIG. 12 is a flow diagram of an example method for automated message suggestion generation in accordance with some embodiments of the present disclosure.

FIG. 12 is a flow diagram of an example method for automated message suggestion generation in accordance with some embodiments of the present disclosure.

The method 1200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1200 is performed by one or more components of generative message suggestion system 108 of FIG. 1 or generative message suggestion system 580 of FIG. 5. For example, in some implementations, portions of the method 1200 are performed by one or more components of a generative message suggestion system shown in FIG. 1 and/or FIG. 5, described herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 1202, the processing device receives, via a message generation interface, first message attribute data. In some implementations, the processing device determines, based on a social graph, a link between a first entity and a second entity, where at least one of the first entity or the second entity represents, in the social graph, a prospective message recipient, and based on the link, determines the first message attribute data.

At operation 1204, the processing device inputs the first message attribute data to a first machine learning model. The first machine learning model is configured to generate and output suggested message content based on first correlations between message content and message acceptance data. The first machine learning model includes a first encoder-decoder model architecture, in some implementations.

At operation 1206, the processing device generates, by the first machine learning model, based on the first message attribute data, a first set of message content suggestions. At operation 1208, the processing device selects, by the first machine learning model, based on message evaluation data received by the first machine learning model from a second machine learning model, at least one message content suggestion from the first set of message content suggestions. The second machine learning model includes a second encoder-decoder model architecture, in some implementations.

At operation 1210, the processing device receives, via the message generation interface, in response to a presentation at the message generation interface of the selected at least one message content suggestion, feedback data related to the selected at least one message content suggestion.

In some implementations, the feedback data is based on at least one interaction of a prospective message sender with the message generation interface in response to a presentation by the message generation interface of the at least one message content suggestion prior to a sending of a message comprising the at least one message content suggestion by the prospective message sender to at least one prospective message recipient. In some implementations, the feedback data is based on at least one interaction of a prospective message recipient with a message receiving interface in response to a presentation by the message receiving interface of a message comprising the at least one message content suggestion to the prospective message recipient. In some implementations, the processing device tunes the second machine learning model based on the feedback data.

At operation 1212, the processing device tunes the first machine learning model based on the feedback data. At operation 1214, the processing device generates, by the tuned first machine learning model, a second set of message content suggestions based on the first message attribute data. In some implementations, the second set of message content suggestions comprises at least one of a reworded version of a message content suggestion of the first set of message content suggestions, a rephrasing of the message content suggestion, or an alternative version of the message content suggestion. In some implementations, the processing device receives, via the message generation interface, second message attribute data, and based on the second message attribute data, generates, by the first machine learning model, at least one of a reworded version of a message content suggestion of the first set of message content suggestions, a rephrasing of the message content suggestion, or an alternative version of the message content suggestion. In some implementations, the processing device outputs, by the second machine learning model, estimated recipient acceptance data associated with the message content suggestion, and presents the estimated recipient acceptance data to a prospective message sender via the message generation interface.

In some implementations, the suggested message content generated and output by the first machine learning model includes any of video, audio, and/or one or more digital images. In some implementations, the processing device presents the suggested message content to a user at a messaging interface and receives user input in response to the generative message suggestion, where the user input includes any of: one or more modifications of the generative message suggestion, one or more requests for a new generative message suggestion, an action that incorporates the generative message suggestion into a new piece of digital content and causes the new piece of digital content to be distributed in a user network, e.g., via a social network service.

In some implementations, the technical problem of scalability is addressed by the processing device selecting the generative message suggestion from a set of generative message suggestions, where the size of the set of generative message suggestions is at least one order of magnitude smaller than the number of users of the messaging system.

In some implementations, the technical problem of efficient distribution of message suggestions is addressed by the processing device converting the generative message suggestion from a first size to a second size, prior to distribution, where the second size is more efficient than the first size for distribution in the user network.

In some implementations, the processing device configures the generative message suggestions based on one or more interaction parameters of the sending user; for example, the one or more interaction parameters are input to a machine learning model to cause the machine learning model to formulate the generative message suggestions to be suitable for rendering at end user devices with different screen sizes or resolutions and/or different device capabilities so as to facilitate interaction between the users and the message suggestions resulting in improved message creation and distribution.

In some implementations, the technical problem of dealing with latency is addressed by the processing device detecting an increase in latency of outputting a generative message suggestion and in response to detecting the increase in latency, performing one or more of the following actions: reducing a number of the model inputs; or using a machine learning model with a reduced size; or reducing a size of the message suggestions (e.g., reducing the maximum text length or byte size).

The examples shown in FIG. 12 and the accompanying description, above are provided for illustration purposes. This disclosure is not limited to the described examples.

FIG. 13 is a block diagram of an example computer system including components of a generative message suggestion system in accordance with some embodiments of the present disclosure. In FIG. 13, an example machine of a computer system 1300 is shown, within which a set of instructions for causing the machine to perform any of the methodologies discussed herein can be executed. In some embodiments, the computer system 1300 can correspond to a component of a networked computer system (e.g., as a component of the computing system 100 of FIG. 1 or the computer system 500 of FIG. 5) that includes, is coupled to, or utilizes a machine to execute an operating system to perform operations corresponding to one or more components of the generative message suggestion system 108 of FIG. 1 or the generative message suggestion system 580 of FIG. 5. For example, computer system 1300 corresponds to a portion of computing system 500 when the computing system is executing a portion of generative message suggestion system 580.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 1300 includes a processing device 1302, a main memory 1304 (e.g., read-only memory (ROM), flash memory, dynamic random access memory (DRAM) such as synchronous DRAM (SDRAM) or Rambus DRAM (RDRAM), etc.), a memory 1303 (e.g., flash memory, static random access memory (SRAM), etc.), an input/output system 1310, and a data storage system 1340, which communicate with each other via a bus 1330.

Processing device 1302 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1302 can also be at least one special-purpose processing device such as an application specific integrated circuit (ASIC), a field programmable gate array (FPGA), a digital signal processor (DSP), network processor, or the like. The processing device 1302 is configured to execute instructions 1312 for performing the operations and steps discussed herein.

In FIG. 13, generative message suggestion system 1350 represents portions of generative message suggestion system 580 when the computer system 1300 is executing those portions of generative message suggestion system 580. Instructions 1312 include portions of generative message suggestion system 1350 when those portions of the generative message suggestion system 1350 are being executed by processing device 1302. Thus, the generative message suggestion system 1350 is shown in dashed lines as part of instructions 1312 to illustrate that, at times, portions of the generative message suggestion system 1350 are executed by processing device 1302. For example, when at least some portion of the generative message suggestion system 1350 is embodied in instructions to cause processing device 1302 to perform the method(s) described herein, some of those instructions can be read into processing device 1302 (e.g., into an internal cache or other memory) from main memory 1304 and/or data storage system 1340. However, it is not required that all of the generative message suggestion system 1350 be included in instructions 1312 at the same time and portions of the generative message suggestion system 1350 are stored in at least one other component of computer system 1300 at other times, e.g., when at least one portion of the generative message suggestion system 1350 are not being executed by processing device 1302.

The computer system 1300 further includes a network interface device 1308 to communicate over the network 1320. Network interface device 1308 provides a two-way data communication coupling to a network. For example, network interface device 1308 can be an integrated-services digital network (ISDN) card, cable modem, satellite modem, or a modem to provide a data communication connection to a corresponding type of telephone line. As another example, network interface device 1308 can be a local area network (LAN) card to provide a data communication connection to a compatible LAN. Wireless links can also be implemented. In any such implementation network interface device 1308 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 1300.

Computer system 1300 can send messages and receive data, including program code, through the network(s) and network interface device 1308. In the Internet example, a server can transmit a requested code for an application program through the Internet and network interface device 1308. The received code can be executed by processing device 1302 as it is received, and/or stored in data storage system 1340, or other non-volatile storage for later execution.

The input/output system 1310 includes an output device, such as a display, for example a liquid crystal display (LCD) or a touchscreen display, for displaying information to a computer user, or a speaker, a haptic device, or another form of output device. The input/output system 1310 can include an input device, for example, alphanumeric keys and other keys configured for communicating information and command selections to processing device 1302. An input device can, alternatively or in addition, include a cursor control, such as a mouse, a trackball, or cursor direction keys for communicating direction information and command selections to processing device 1302 and for controlling cursor movement on a display. An input device can, alternatively or in addition, include a microphone, a sensor, or an array of sensors, for communicating sensed information to processing device 1302. Sensed information can include voice commands, audio signals, geographic location information, and/or digital imagery, for example.

The data storage system 1340 includes a machine-readable storage medium 1342 (also known as a computer-readable medium) on which is stored at least one set of instructions 1344 or software embodying any of the methodologies or functions described herein. The instructions 1344 can also reside, completely or at least partially, within the main memory 1304 and/or within the processing device 1302 during execution thereof by the computer system 1300, the main memory 1304 and the processing device 1302 also constituting machine-readable storage media.

In one embodiment, the instructions 1344 include instructions to implement functionality corresponding to a generative message suggestion system (e.g., the generative message suggestion system 108 of FIG. 1 or generative message suggestion system 580 of FIG. 5).

Dashed lines are used in FIG. 13 to indicate that it is not required that the generative message suggestion system be embodied entirely in instructions 1312, 1313, and 1344 at the same time. In one example, portions of the generative message suggestion system are embodied in instructions 1344, which are read into main memory 1304 as instructions 1313, and portions of instructions 1313 are read into processing device 1302 as instructions 1312 for execution. In another example, some portions of the generative message suggestion system are embodied in instructions 1344 while other portions are embodied in instructions 1313 and still other portions are embodied in instructions 1312.

While the machine-readable storage medium 1342 is shown in an example embodiment to be a single medium, the term "machine-readable storage medium" should be taken to include a single medium or multiple media that store the instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media. The examples shown in FIG. 13 and the accompanying description, above are provided for illustration purposes. This disclosure is not limited to the described examples.

Some portions of the preceding detailed description have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100 or the computing system 500, can carry out the above-described computer-implemented methods in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples described herein, or any combination of any of the examples described herein, or any combination of any portions of the examples described herein.

In an example 1, a method includes configuring a first machine learning model to generate and output suggested message content based on first correlations between message content and message acceptance data, where the first machine learning model includes a first encoder-decoder model architecture; configuring a second machine learning model to generate and output message evaluation data based on second correlations between the message content and the message acceptance data, where the second machine learning model includes a second encoder-decoder model architecture; coupling an output of the first machine learning model to an input of the second machine learning model; and coupling an output of the second machine learning model to an input of the first machine learning model.

An example 2 includes the subject matter of example 1, further including inputting the suggested message content output by the first machine learning model to the second machine learning model. An example 3 includes the subject matter of example 2, further including inputting the message evaluation data output by the second machine learning model to the first machine learning model. An example 4 includes the subject matter of any of examples 1-3, further including: training the first machine learning model based on first training data, where the first training data includes positive examples of the message acceptance data. An example 5 includes the subject matter of example 4, further including: training the second machine learning model based on the first training data and second training data, where the second training data includes negative examples of the message acceptance data. An example 6 includes the subject matter of example 4, further including: formulating an instance of the first training data to include message content, sender metadata associated with the message content, recipient metadata associated with the message content, and an acceptance label associated with the recipient metadata, where the acceptance label includes an indicator of (i) an acceptance, by a recipient, of a message including the message content sent by a sender to the recipient, (ii) a rejection of the message, by the recipient, or (iii) no response to the message, by the recipient. An example 7 includes the subject matter of example 6, further including: anonymizing at least one of the message content, the sender metadata, or the recipient metadata; and using the anonymized at least one of the message content, the sender metadata, or the recipient metadata to formulate the instance of the first training data. An example 8 includes the subject matter of any of examples 1-7, further including: receiving, via a message generation interface, pre-send feedback data relating to the suggested message content; and tuning at least one of the first machine learning model or the second machine learning model based on the received pre-send feedback data. An example 9 includes the subject matter of example 8, where the pre-send feedback data is based on at least one interaction of a prospective message sender with the message generation interface in response to a presentation by the message generation interface of the suggested message content prior to a sending of a message including the suggested message content by the prospective message sender to at least one recipient. An example 10 includes the subject matter of any of examples 1-9, further including: receiving, via a message receiving interface, post-send feedback data relating to the suggested message content; and tuning at least one of the first machine learning model or the second machine learning model based on the received post-send feedback data. An example 11 includes the subject matter of any of examples 1-10, where the post-send feedback data is based on at least one interaction of a prospective message recipient with the message receiving interface in response to a presentation by the message receiving interface of a message including the suggested message content to the prospective message recipient. An example 12 includes the subject matter of any of examples 1-11, further including: determining, for an instance of suggested message content, a model input to which the first machine learning model is applied to generate the instance of suggested message content; determining a difference between the instance of suggested message content and the model input; and tuning the first machine learning model based on the difference between the instance of suggested message content and the model input.

An example 13 includes a method including any one or more steps, operations or processes shown in any of the figures or described in the specification and performed by any one or more of the systems, devices, components, subsystems, or elements shown in any of the figures or described in the specification.

An example 14 includes a system, including: at least one processor; and at least one memory coupled to the at least one processor; where the at least one memory includes instructions that, when executed by the at least one processor, cause the at least one processor to perform operations including any one or more of examples 1-13. An example 15 includes a non-transitory computer readable medium including at least one memory capable of being coupled to at least one processor, where the at least one memory includes instructions that, when executed by the at least one processor, cause the at least one processor to perform operations including any one or more of examples 1-13.

In an example 21, a method includes receiving, via a message generation interface, first message attribute data; inputting the first message attribute data to a first machine learning model, where the first machine learning model is configured to generate and output suggested message content based on first correlations between message content and message acceptance data; generating, by the first machine learning model, based on the first message attribute data, a first set of message content suggestions; selecting, by the first machine learning model, based on message evaluation data received by the first machine learning model from a second machine learning model, at least one message content suggestion from the first set of message content suggestions; receiving, via the message generation interface, in response to a presentation at the message generation interface of the selected at least one message content suggestion, feedback data related to the selected at least one message content suggestion; tuning the first machine learning model based on the feedback data; and generating, by the tuned first machine learning model, a second set of message content suggestions based on the first message attribute data.

An example 22 includes the subject matter of example 21, where the second set of message content suggestions includes at least one of a reworded version of a message content suggestion of the first set of message content suggestions, a rephrasing of the message content suggestion, or an alternative version of the message content suggestion. An example 23 includes the subject matter of example 22, further including: receiving, via the message generation interface, second message attribute data; and based on the second message attribute data, generating, by the first machine learning model, at least one of a reworded version of a message content suggestion of the first set of message content suggestions, a rephrasing of the message content suggestion, or an alternative version of the message content suggestion. An example 24 includes the subject matter of any of examples 21-23, further including: outputting, by the second machine learning model, estimated recipient acceptance data associated with the message content suggestion; and presenting the estimated recipient acceptance data to a prospective message sender via the message generation interface. An example 25 includes the subject matter of any of examples 21-24, further including: determining, based on a social graph, a link between a first entity and a second entity, where at least one of the first entity or the second entity represents, in the social graph, a prospective message recipient; and based on the link, determining the first message attribute data. An example 26 includes the subject matter of any of examples 21-25, further including: tuning the second machine learning model based on the feedback data. An example 27 includes the subject matter of any of examples 21-26, where the feedback data is based on at least one interaction of a prospective message sender with the message generation interface in response to a presentation by the message generation interface of the at least one message content suggestion prior to a sending of a message including the at least one message content suggestion by the prospective message sender to at least one prospective message recipient. An example 28 includes the subject matter of any of examples 21-27, where the feedback data is based on at least one interaction of a prospective message recipient with a message receiving interface in response to a presentation by the message receiving interface of a message including the at least one message content suggestion to the prospective message recipient. An example 29 includes the subject matter of any of examples 21-28, where the first machine learning model includes a first encoder-decoder model architecture. An example 30 includes the subject matter of example 29, where the second machine learning model includes a second encoder-decoder model architecture.

An example 31 includes a method including any one or more steps, operations or processes shown in any of the figures or described in the specification and performed by any one or more of the systems, devices, components, subsystems, or elements shown in any of the figures or described in the specification. An example 32 includes a system, including: at least one processor; and at least one memory coupled to the at least one processor; where the at least one memory includes instructions that, when executed by the at least one processor, cause the at least one processor to perform operations including any one or more of examples 21-31. An example 33 includes a non-transitory computer readable medium including at least one memory capable of being coupled to at least one processor, where the at least one memory includes instructions that, when executed by the at least one processor, cause the at least one processor to perform operations including any one or more of examples 21-31.

An example 41 includes the subject matter of any of the preceding examples, where the suggested message content generated and output by the first machine learning model (e.g., generative message suggestion) includes any of video, audio, and/or one or more digital images.

An example 42 includes the subject matter of any of the preceding examples, where the processing device presents the generative message suggestion to a user at a messaging interface and receives user input in response to the generative message suggestion, where the user input includes any of: one or more modifications of the generative message suggestion, one or more requests for a new generative message suggestion, an action that incorporates the generative message suggestion into a new piece of digital content and causes the new piece of digital content to be distributed in a user network, e.g., via a social network service.

An example 43 includes the subject matter of any of the preceding examples, where the processing device selects the generative message suggestion from a set of generative message suggestions, where the size of the set of generative message suggestions is at least one order of magnitude smaller than the number of users of the messaging system.

An example 44 includes the subject matter of any of the preceding examples, where the processing device converts the generative message suggestion from a first size to a second size, prior to distribution, where the second size is more efficient than the first size for presentation to the user or for distribution in the user network.

An example 45 includes the subject matter of any of the preceding examples, where the processing device configures the generative message suggestions based on one or more interaction parameters of the sending user; for example, the one or more interaction parameters are input to a machine learning model to cause the machine learning model to formulate the generative message suggestions to be suitable for rendering at end user devices with different screen sizes or resolutions and/or different device capabilities so as to facilitate interaction between the users and the message suggestions, resulting in improved message creation and distribution.

An example 46 includes the subject matter of any of the preceding examples, where the processing device detects an increase in latency of outputting a generative message suggestion and in response to detecting the increase in latency, performs one or more of the following actions: reducing a number of the model inputs; or using a machine learning model with a reduced size; or reducing a size of the message suggestions (e.g., reducing the maximum text length or byte size).

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

formulating an instance of first training data to include message content, sender metadata associated with the message content, recipient metadata associated with the message content, and message acceptance data comprising an acceptance label associated with the recipient metadata, wherein the acceptance label comprises an indicator of (i) an acceptance, by a recipient, of a message comprising the message content sent by a sender to the recipient, (ii) a rejection of the message, by the recipient, or (iii) no response to the message, by the recipient;

training a first machine learning model based on the first training data, wherein the first training data comprises positive examples of the message acceptance data;

configuring the first machine learning model to generate and output suggested message content based on first correlations between the message content and the message acceptance data, wherein the first machine learning model comprises a first encoder-decoder model architecture;

configuring a second machine learning model to generate and output message evaluation data based on second correlations between the message content and the message acceptance data, wherein the second machine learning model comprises a second encoder-decoder model architecture;

coupling an output of the first machine learning model to an input of the second machine learning model; and coupling an output of the second machine learning model to an input of the first machine learning model.

2. The method of claim 1, further comprising:

inputting the suggested message content output by the first machine learning model to the second machine learning model.

3. The method of claim 2, further comprising:

inputting the message evaluation data output by the second machine learning model to the first machine learning model.

4. The method of claim 1, further comprising:

training the second machine learning model based on the first training data and second training data, wherein the second training data comprises negative examples of the message acceptance data.

5. The method of claim 1, further comprising:

anonymizing at least one of the message content, the sender metadata, or the recipient metadata; and using the anonymized at least one of the message content, the sender metadata, or the recipient metadata to formulate the instance of the first training data.

6. The method of claim 1, further comprising:

receiving, via a message generation interface, pre-send feedback data relating to the suggested message content; and tuning at least one of the first machine learning model or the second machine learning model based on the received pre-send feedback data.

7. The method of claim 6, wherein the pre-send feedback data is based on at least one interaction of a prospective message sender with the message generation interface in response to a presentation by the message generation interface of the suggested message content prior to a sending of a message comprising the suggested message content by the prospective message sender to at least one recipient.

8. The method of claim 1, further comprising:

receiving, via a message receiving interface, post-send feedback data relating to the suggested message content; and tuning at least one of the first machine learning model or the second machine learning model based on the received post-send feedback data.

9. The method of claim 8, wherein the post-send feedback data is based on at least one interaction of a prospective message recipient with the message receiving interface in response to a presentation by the message receiving interface of a message comprising the suggested message content to the prospective message recipient.

10. The method of claim 1, further comprising:

determining, for an instance of suggested message content, a model input to which the first machine learning model is applied to generate the instance of suggested message content;

determining a difference between the instance of suggested message content and the model input; and tuning the first machine learning model based on the difference between the instance of suggested message content and the model input.

11. A system, comprising: at least one processor; and at least one memory coupled to the at least one processor; wherein the at least one memory includes instructions that, when executed by the at least one processor, cause the at least one processor to perform at least one operation comprising:

formulating an instance of first training data to include message content, sender metadata associated with the message content, recipient metadata associated with the message content, and message acceptance data comprising an acceptance label associated with the recipient metadata, wherein the acceptance label comprises an indicator of (i) an acceptance, by a recipient, of a message comprising the message content sent by a sender to the recipient, (ii) a rejection of the message, by the recipient, or (iii) no response to the message, by the recipient;

training a first machine learning model based on the first training data, wherein the first training data comprises positive examples of the message acceptance data;

configuring the first machine learning model to generate and output suggested message content based on first correlations between the message content and the message acceptance data, wherein the first machine learning model comprises a first encoder-decoder model architecture;

configuring a second machine learning model to generate and output message evaluation data based on second correlations between the message content and the message acceptance data, wherein the second machine learning model comprises a second encoder-decoder model architecture;

coupling an output of the first machine learning model to an input of the second machine learning model; and coupling an output of the second machine learning model to an input of the first machine learning model.

12. The system of claim 11, wherein the instructions, when executed by the at least one processor, cause the at least one processor to perform at least one operation further comprising:

inputting the suggested message content output by the first machine learning model to the second machine learning model; and inputting the message evaluation data output by the second machine learning model to the first machine learning model.

13. The system of claim 11, wherein the instructions, when executed by the at least one processor, cause the at least one processor to perform at least one operation further comprising:

training the second machine learning model based on the first training data and second training data, wherein the second training data comprises negative examples of the message acceptance data.

14. The system of claim 11, wherein the instructions, when executed by the at least one processor, cause the at least one processor to perform at least one operation further comprising:

determining, for an instance of suggested message content, a model input to which the first machine learning model is applied to generate the instance of suggested message content;

determining a difference between the instance of suggested message content and the model input; and tuning the first machine learning model based on the difference between the instance of suggested message content and the model input.

15. At least one non-transitory computer readable medium comprising at least one memory capable of being coupled to at least one processor, wherein the at least one memory comprises instructions that, when executed by the at least one processor, cause the at least one processor to perform at least one operation comprising:

formulating an instance of first training data to include message content, sender metadata associated with the message content, recipient metadata associated with the message content, and message acceptance data comprising an acceptance label associated with the recipient metadata, wherein the acceptance label comprises an indicator of (i) an acceptance, by a recipient, of a message comprising the message content sent by a sender to the recipient, (ii) a rejection of the message, by the recipient, or (iii) no response to the message, by the recipient;

training a first machine learning model based on the first training data, wherein the first training data comprises positive examples of the message acceptance data;

configuring the first machine learning model to generate and output suggested message content based on first correlations between the message content and the message acceptance data, wherein the first machine learning model comprises a first encoder-decoder model architecture;

configuring a second machine learning model to generate and output message evaluation data based on second correlations between the message content and the message acceptance data, wherein the second machine learning model comprises a second encoder-decoder model architecture;

coupling an output of the first machine learning model to an input of the second machine learning model; and coupling an output of the second machine learning model to an input of the first machine learning model.

16. The at least one non-transitory computer readable medium of claim 15, wherein the instructions, when executed by the at least one processor, cause the at least one processor to perform at least one operation further comprising:

inputting the suggested message content output by the first machine learning model to the second machine learning model; and inputting the message evaluation data output by the second machine learning model to the first machine learning model.

17. The at least one non-transitory computer readable medium of claim 15, wherein the instructions, when executed by the at least one processor, cause the at least one processor to perform at least one operation further comprising:

training the second machine learning model based on the first training data and second training data, wherein the second training data comprises negative examples of the message acceptance data.

18. The at least one non-transitory computer readable medium of claim 15, wherein the instructions, when executed by the at least one processor, cause the at least one processor to perform at least one operation further comprising:

determining, for an instance of suggested message content, a model input to which the first machine learning model is applied to generate the instance of suggested message content;

determining a difference between the instance of suggested message content and the model input; and tuning the first machine learning model based on the difference between the instance of suggested message content and the model input.

* * * * *